United States Patent
Kwon et al.

(10) Patent No.: US 9,913,106 B2
(45) Date of Patent: Mar. 6, 2018

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Woosuk Kwon, Seoul (KR); Woosuk Ko, Seoul (KR); Sungryong Hong, Seoul (KR); Sejin Oh, Seoul (KR); Kyoungsoo Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 14/906,796

(22) PCT Filed: Jan. 14, 2015

(86) PCT No.: PCT/KR2015/000367
§ 371 (c)(1),
(2) Date: Jan. 21, 2016

(87) PCT Pub. No.: WO2015/108326
PCT Pub. Date: Jul. 23, 2015

(65) Prior Publication Data
US 2016/0198311 A1    Jul. 7, 2016

Related U.S. Application Data

(60) Provisional application No. 61/927,453, filed on Jan. 14, 2014, provisional application No. 61/926,958, (Continued)

(51) Int. Cl.
*H04W 4/06* (2009.01)
*H04L 1/00* (2006.01)
(Continued)

(52) U.S. Cl.
CPC .............. *H04W 4/06* (2013.01); *H04H 20/00* (2013.01); *H04L 1/0041* (2013.01); *H04L 69/22* (2013.01);
(Continued)

(58) Field of Classification Search
None
See application file for complete search history.

(56) References Cited

U.S. PATENT DOCUMENTS 6,430,155 B1* 8/2002 Davie ............... H04L 45/00
370/232
6,690,881 B1* 2/2004 Tomita ............... H04N 5/225
348/E5.024
(Continued)

FOREIGN PATENT DOCUMENTS

EP    0662760 A2    7/1995
EP    2 533 529 A2   12/2012
(Continued)

OTHER PUBLICATIONS

DVB, "Digital Video Broadcast (DVB); Generic Stream Encapsulation (GSE); Part 3: Robust Header Compression (ROHC) for IP," DVB Document A116-3, Dec. 2013, pp. 1-10.
(Continued)

*Primary Examiner* — Bunjob Jaroenchonwanit
(74) *Attorney, Agent, or Firm* — Birch, Stewart, Kolasch & Birch, LLP

(57) ABSTRACT

The present invention provides a method of transmitting broadcast signals. The method includes, generating plural input streams, wherein each of the plural input streams include plural input packets; link layer processing the input packets in the plural input streams to generate link layer packets; physical layer processing the link layer packets in
(Continued)

| 8 bits | 1 bit | 1 bit | 1 bit | 13 bits | 2 bits | 2 bits | 4 bits |
|---|---|---|---|---|---|---|---|
| Sync Byte | Transport Error Indicator | Payload Unit Start Indicator | Transport Priority | PID | Transport Scrambling Control | Adaptation Field Control | Continuity Counter | physical layer, to generate the broadcast signals; and transmitting the generated broadcast signals.

6 Claims, 75 Drawing Sheets

Related U.S. Application Data filed on Jan. 14, 2014, provisional application No. 61/935,863, filed on Feb. 5, 2014.

(51) Int. Cl.
*H04H 20/00* (2009.01)
*H04L 29/06* (2006.01)
*H04B 7/0413* (2017.01)
*H04H 60/07* (2008.01)
*H04N 21/2362* (2011.01)
*H04N 21/2383* (2011.01)
*H04N 21/643* (2011.01)

(52) U.S. Cl.
CPC .......... *H04B 7/0413* (2013.01); *H04H 60/07* (2013.01); *H04N 21/2362* (2013.01); *H04N 21/2383* (2013.01); *H04N 21/64322* (2013.01)

(56) References Cited

U.S. PATENT DOCUMENTS

| | | | | |
|---|---|---|---|---|
| 6,967,964 B1* | 11/2005 | Svanbro | ................. | H04L 69/04 370/230.1 |
| 7,496,109 B1* | 2/2009 | Gupta | ................... | H04L 47/22 370/413 |
| 8,711,883 B2* | 4/2014 | Kang | ................... | H04L 65/605 370/389 |
| 2004/0078494 A1 | 4/2004 | Lennox et al. | | |
| 2004/0181811 A1* | 9/2004 | Rakib | .................. | H04L 63/062 725/122 |
| 2004/0249903 A1 | 12/2004 | Ha et al. | | |
| 2005/0165950 A1* | 7/2005 | Takagi | ................. | H04L 12/413 709/236 |
| 2007/0070995 A1* | 3/2007 | Pelletier | ................ | H04L 69/04 370/389 |
| 2007/0253383 A1* | 11/2007 | Yang | ................. | H04L 29/12839 370/338 |
| 2008/0310339 A1* | 12/2008 | Kano | ................... | H04L 1/0083 370/315 |
| 2009/0041115 A1* | 2/2009 | Ramesh | ............... | H04N 21/235 375/240.01 |
| 2009/0141715 A1* | 6/2009 | Yi | ......................... | H04W 28/06 370/389 |
| 2010/0142556 A1* | 6/2010 | Wang | ................... | H04W 28/06 370/474 |
| 2010/0166017 A1* | 7/2010 | Na | ..................... | H04L 12/4633 370/474 |
| 2010/0195712 A1 | 8/2010 | Yu et al. | | |
| 2010/0309886 A1* | 12/2010 | Vikberg | ............ | H04W 36/0066 370/332 |
| 2013/0279380 A1 | 10/2013 | Hong et al. | | |
| 2013/0308505 A1 | 11/2013 | Hong et al. | | |
| 2014/0064280 A1* | 3/2014 | Qin | .................... | H04B 7/18582 370/392 |
| 2017/0127317 A1* | 5/2017 | Nishibayashi | ........ | H04L 12/413 |

FOREIGN PATENT DOCUMENTS

| | | |
|---|---|---|
| KR | 10-2005-0059065 A | 6/2005 |
| KR | 10-2013-0127990 A | 11/2013 |
| WO | WO 2011/096727 A2 | 8/2011 |

OTHER PUBLICATIONS

DVB, "Digital Video Broadcasting (DVB); Generic Stream Encapsulation (GSE); Part 1: Protocol," DVB Document A116-1, Dec. 2013, pp. 1-35.

* cited by examiner

[Fig. 1]
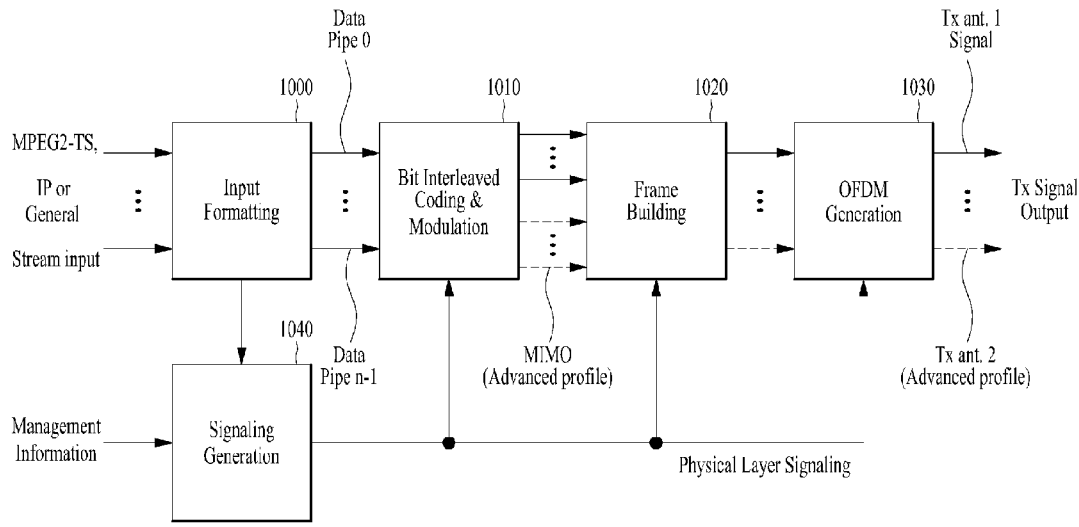
[Fig. 2]
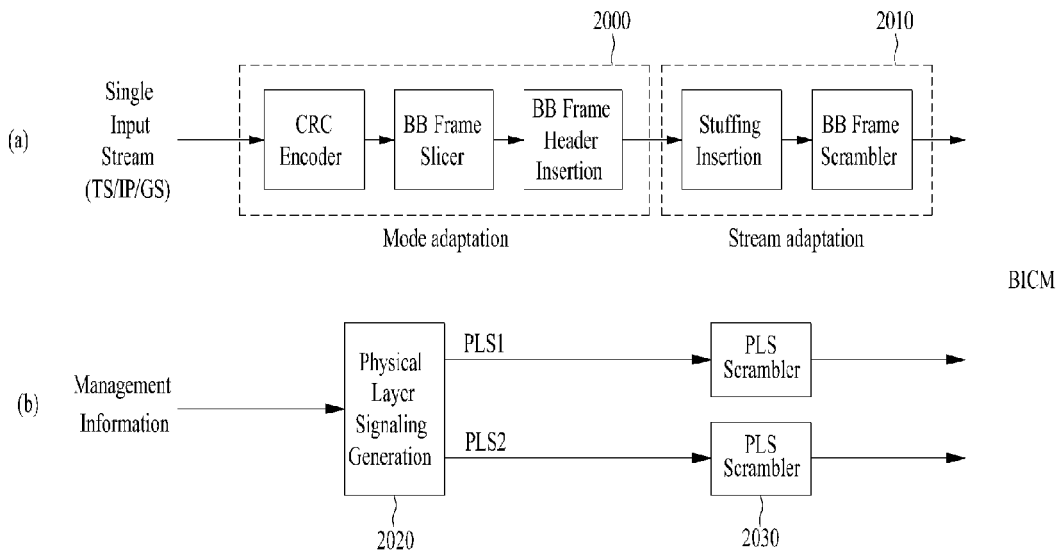
[Fig. 3]
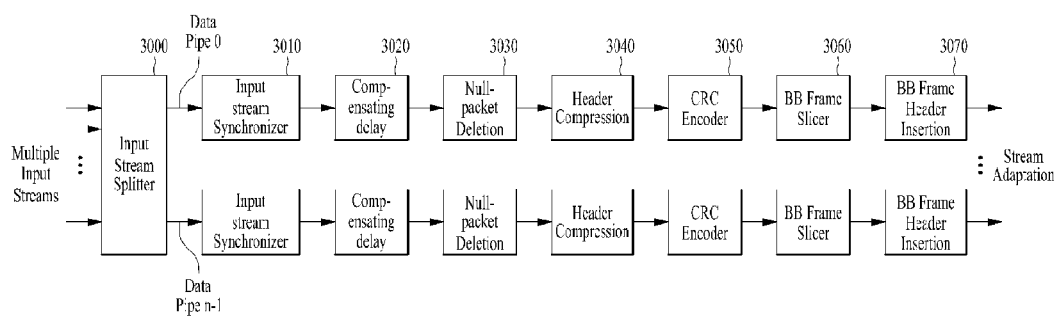

[Fig. 4]
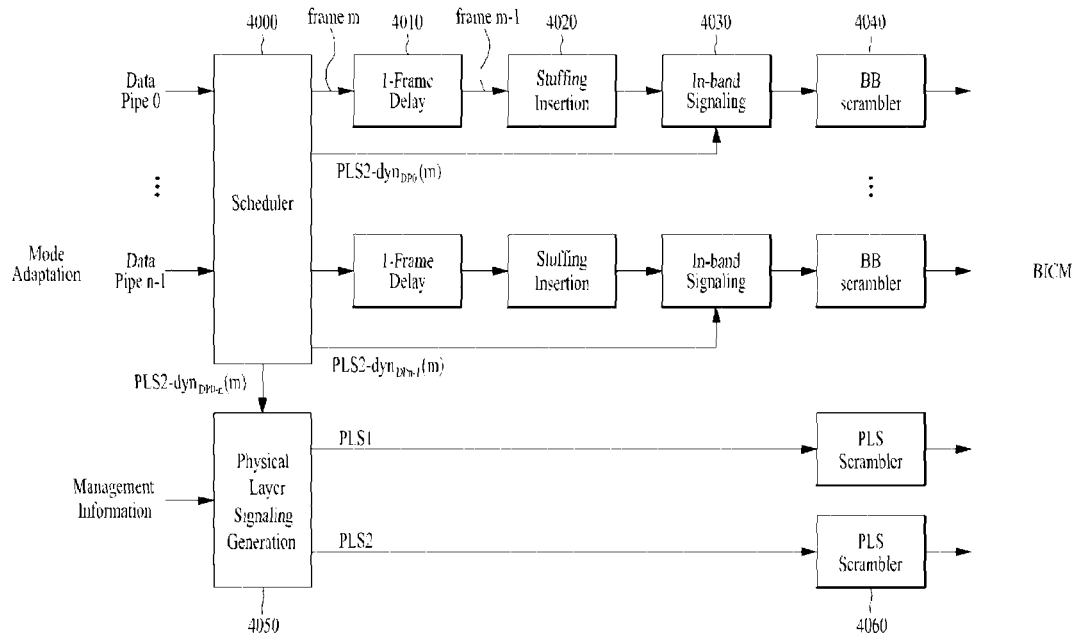
[Fig. 5]
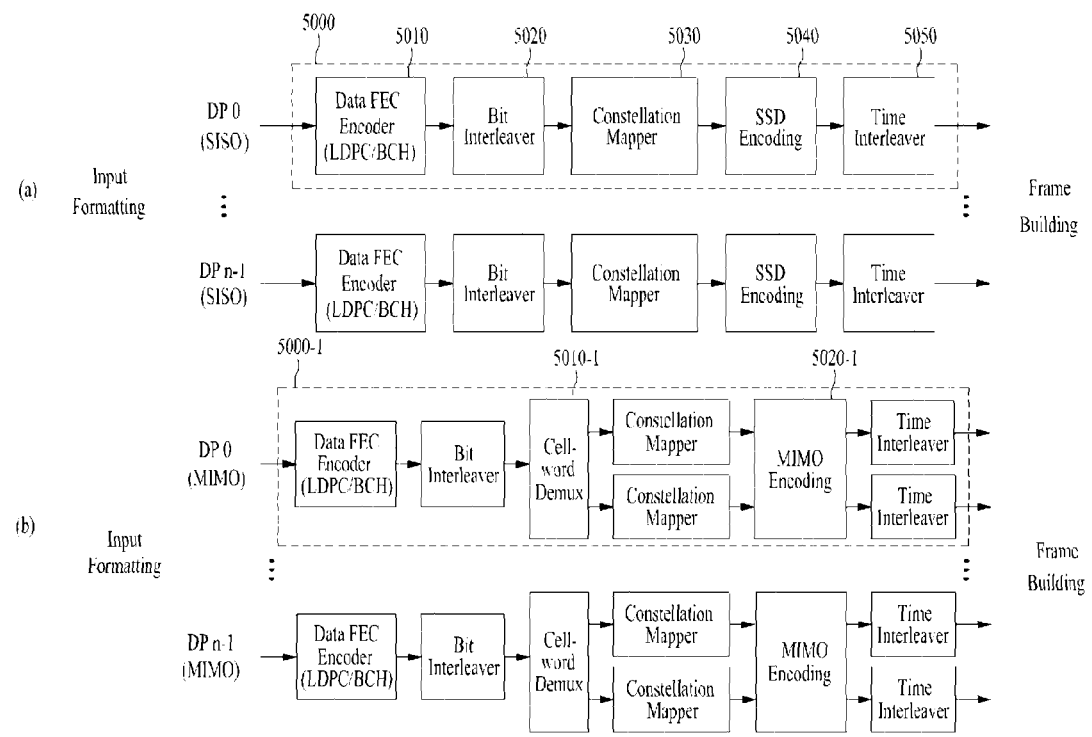

[Fig. 6]
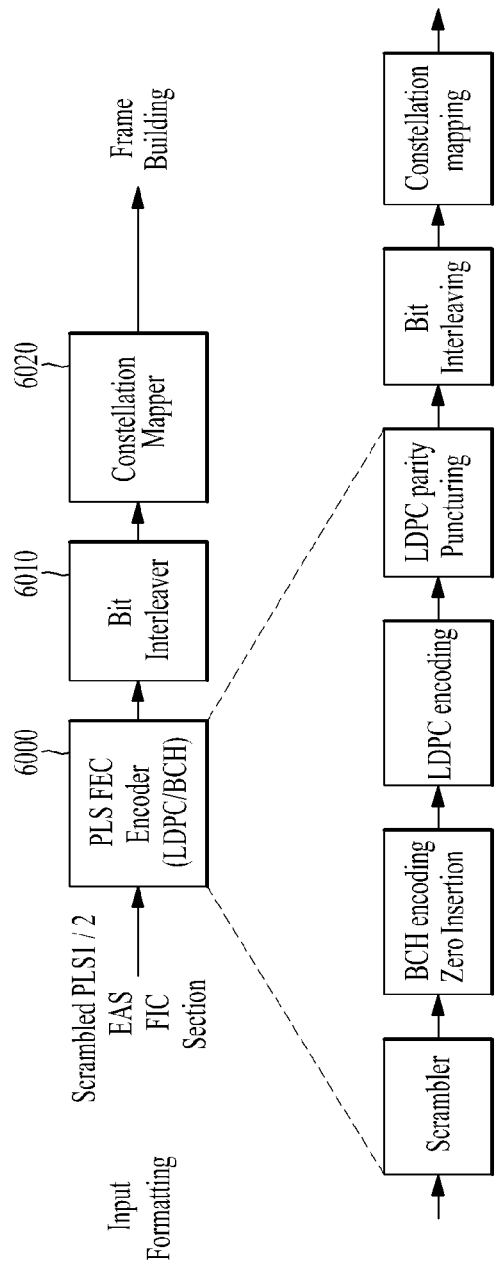

[Fig. 7]
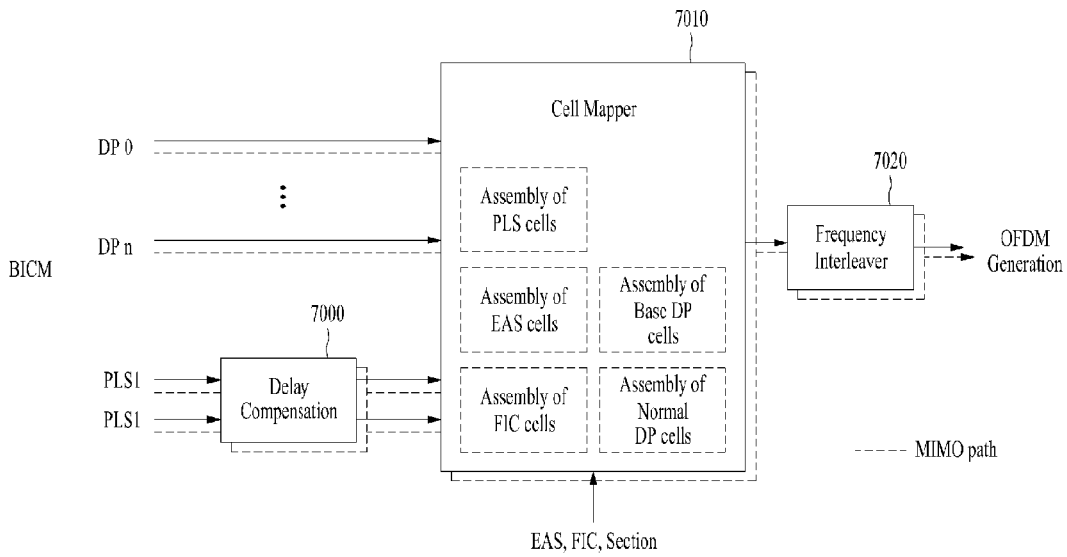
[Fig. 8]
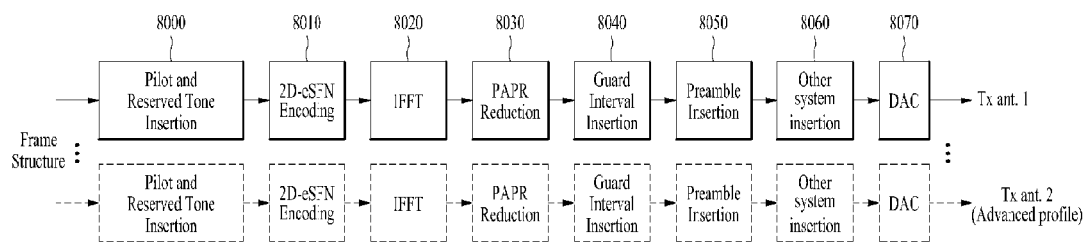
[Fig. 9]
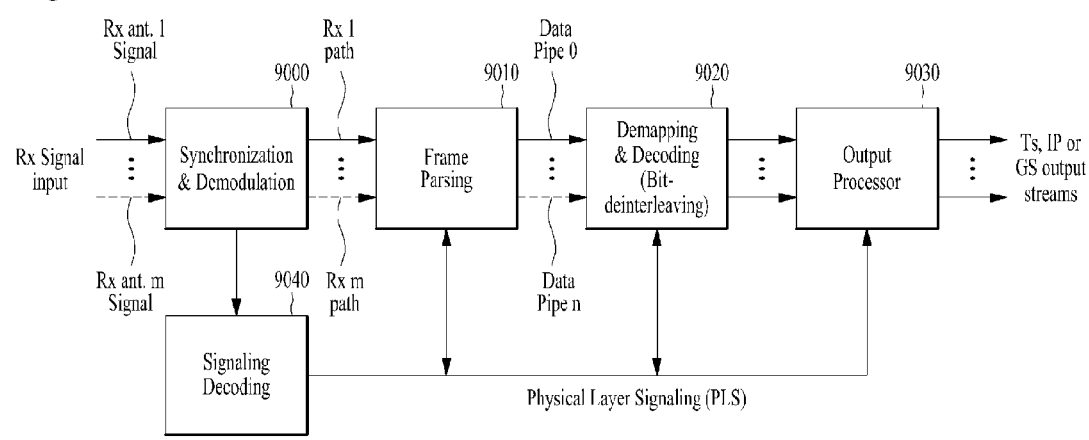

[Fig. 10]
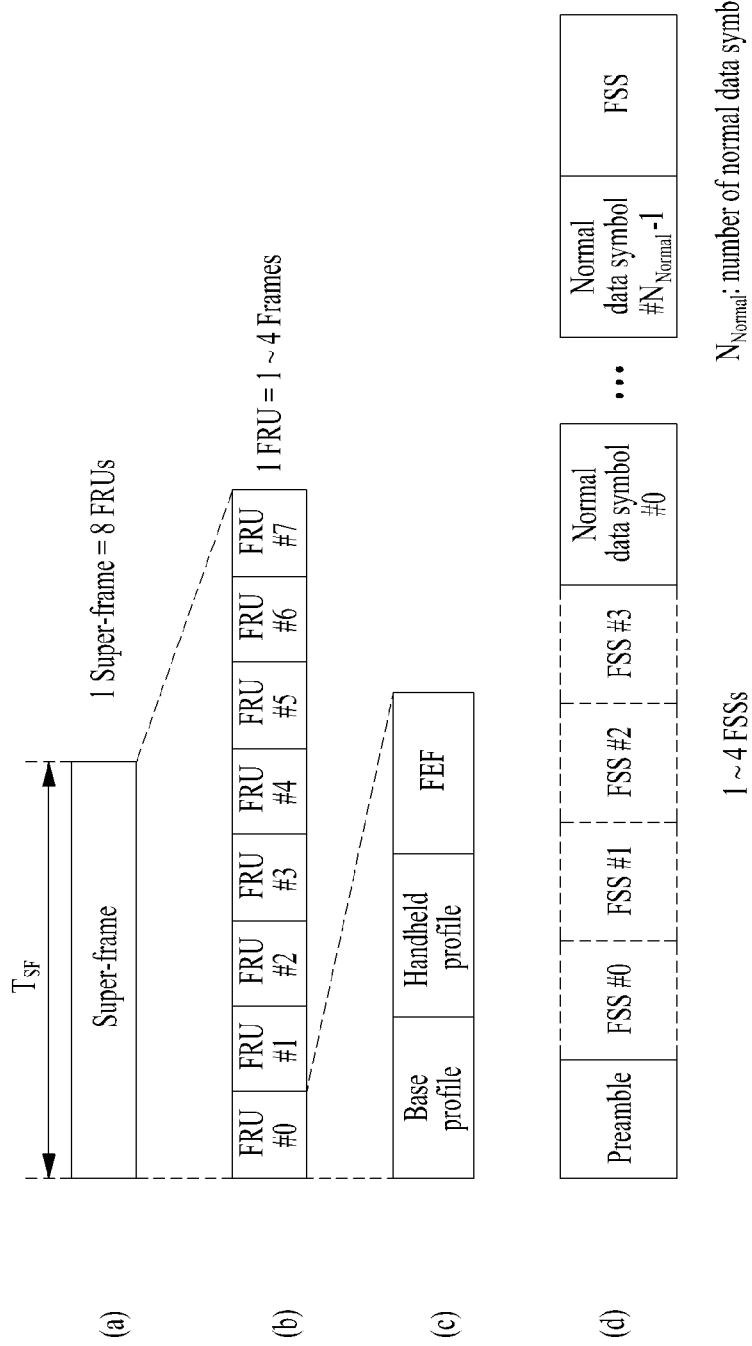

[Fig. 11]
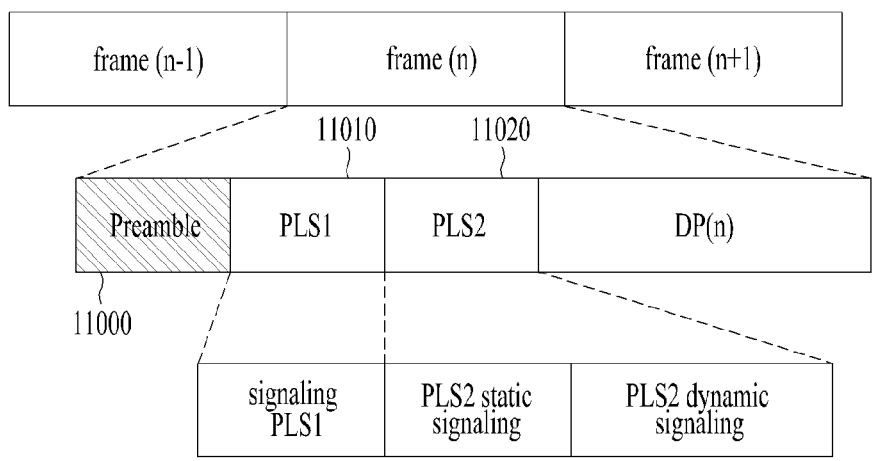
[Fig. 12]
| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Fig. 13]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Fig. 14]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for -1: NUM_AUX | |
|         AUX_STREAM_TYPE | 4 |
|         AUX_PRIVATE_CONF | 28 |
|     end | |
| end | |

[Fig. 15]
| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
| DP_ID | 6 |
| DP_START | 15 (or13) |
| DP_NUM_BLOCK | 10 |
| end RESERVED | 8 |
| EAC_FLAG | 1 |
| EAS_WAKE_UP_VERSION_NUM | 8 |
| if EAC_FLAG == 1 | |
| EAC_LENGTH_BYTE | 12 |
| else | |
| EAC_COUNTER | 12 |
| end | |
| for i=1:NUM_AUX | |
| AUX_PRIVATE_DYN | 48 |
| end | |
| CRC 32 | 32 |
[Fig. 16]

[Fig. 17]
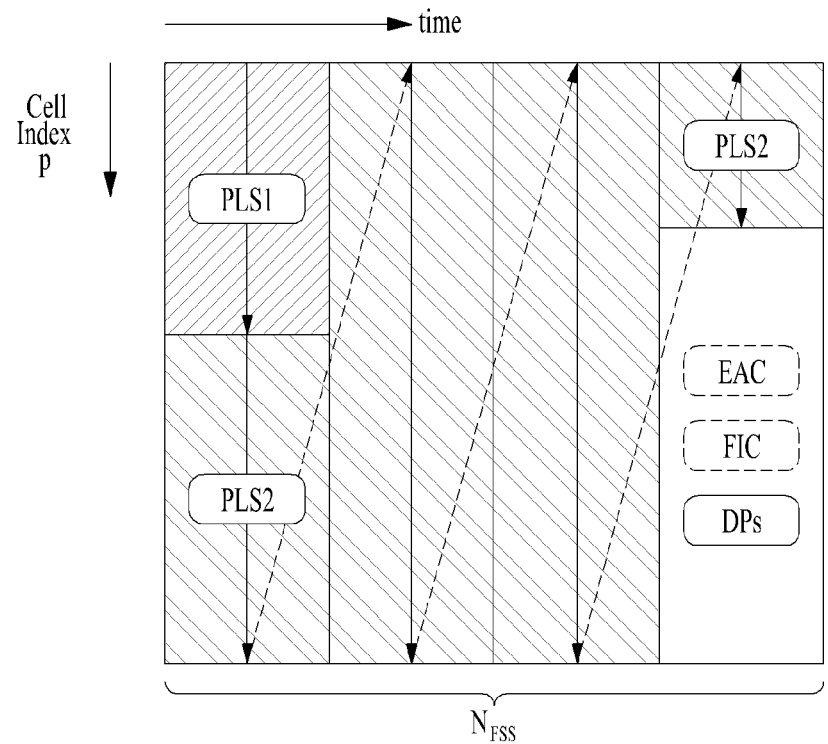
[Fig. 18]
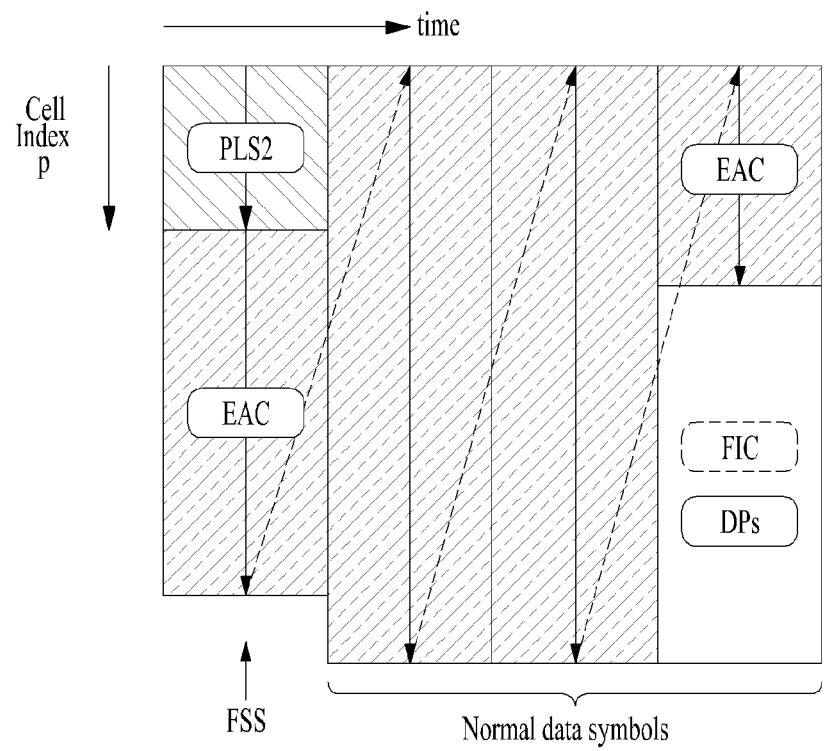

[Fig. 19]
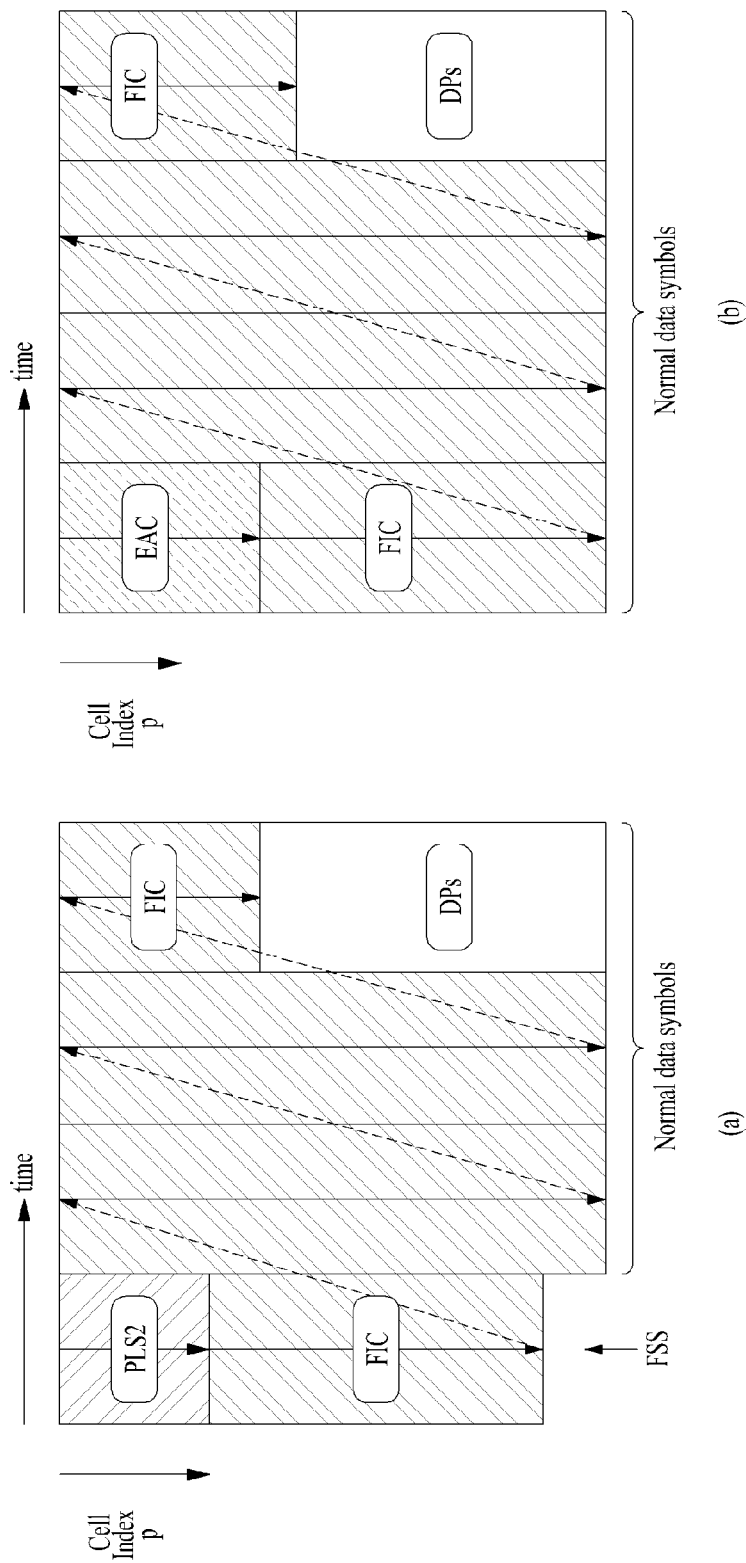

[Fig. 20]
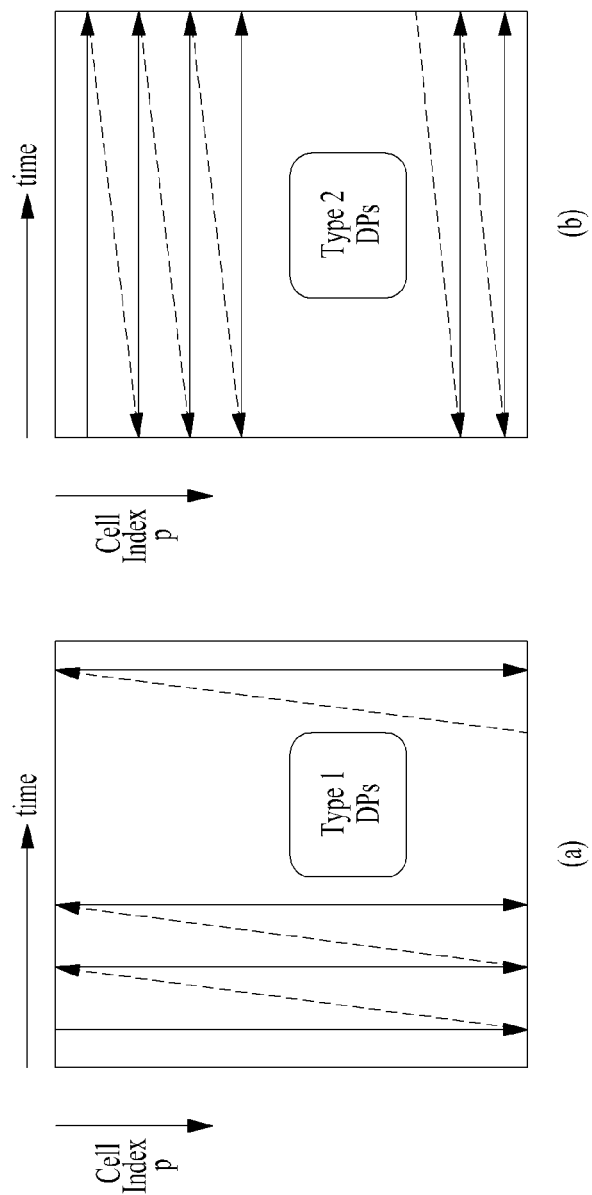

[Fig. 21]
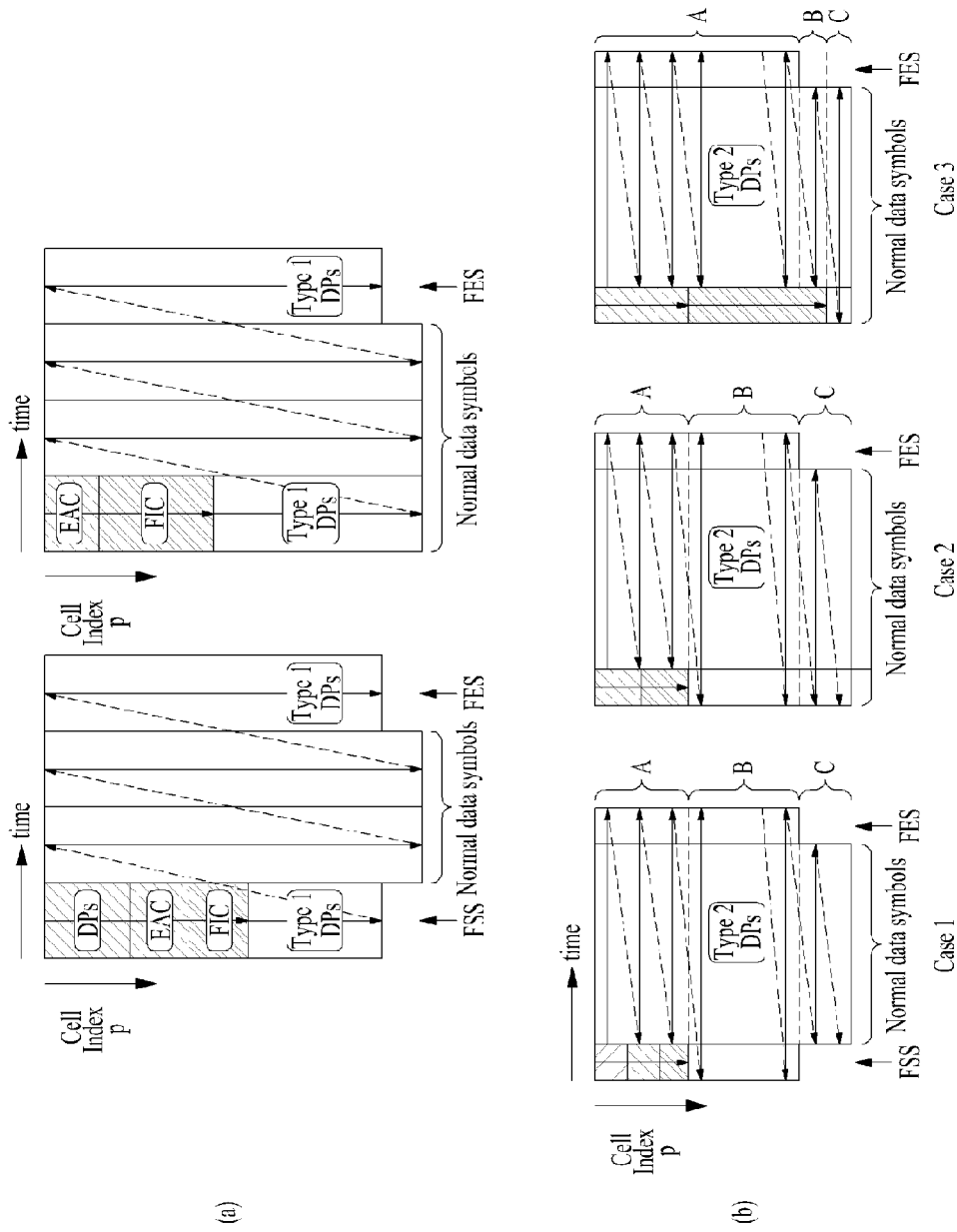
[Fig. 22]
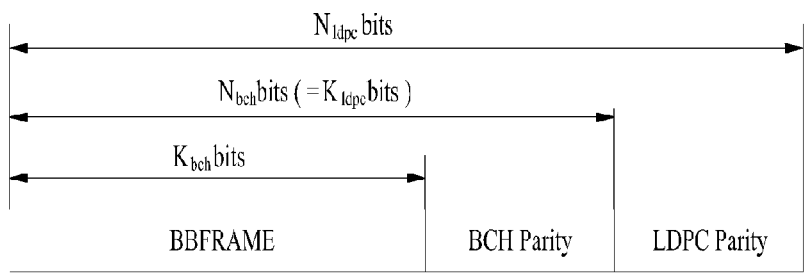

[Fig. 23]
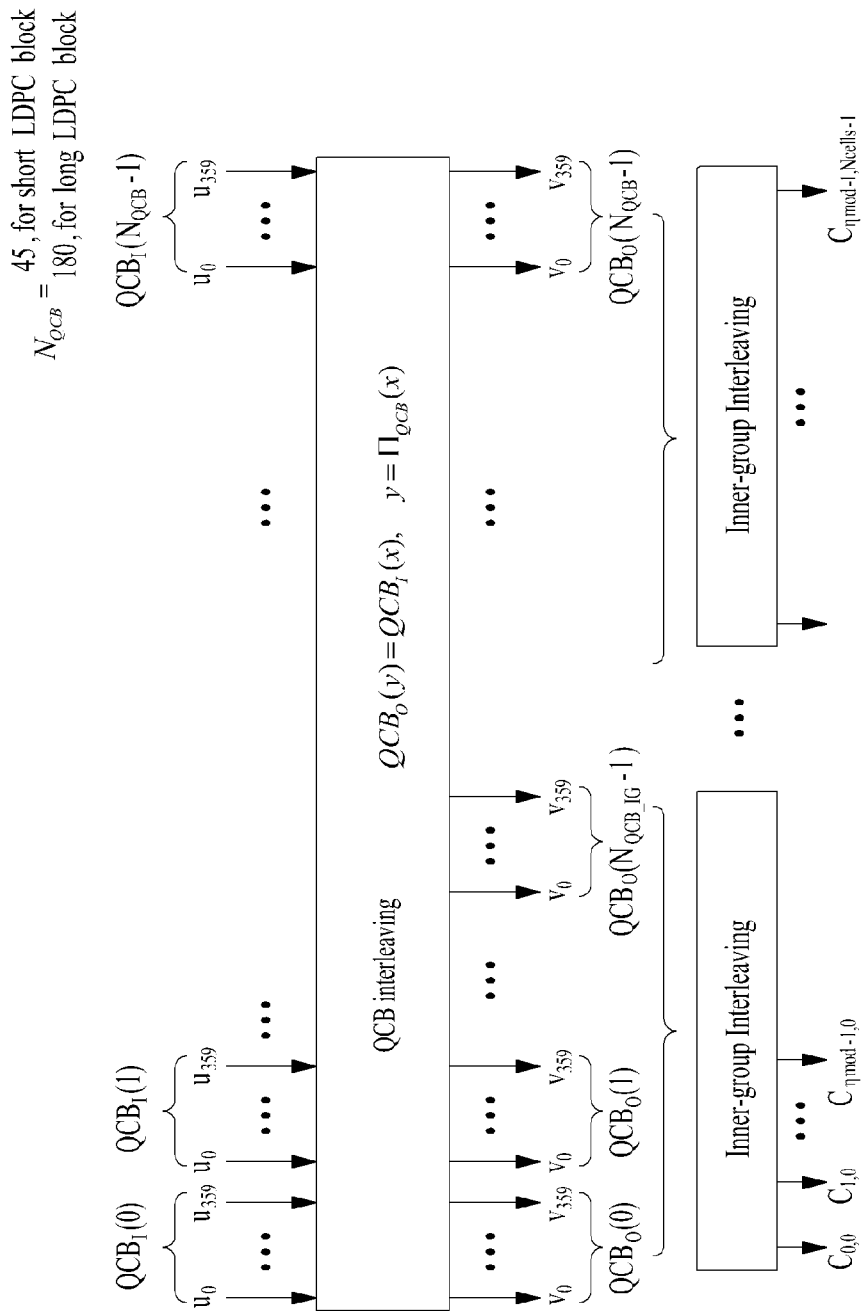

[Fig. 24]
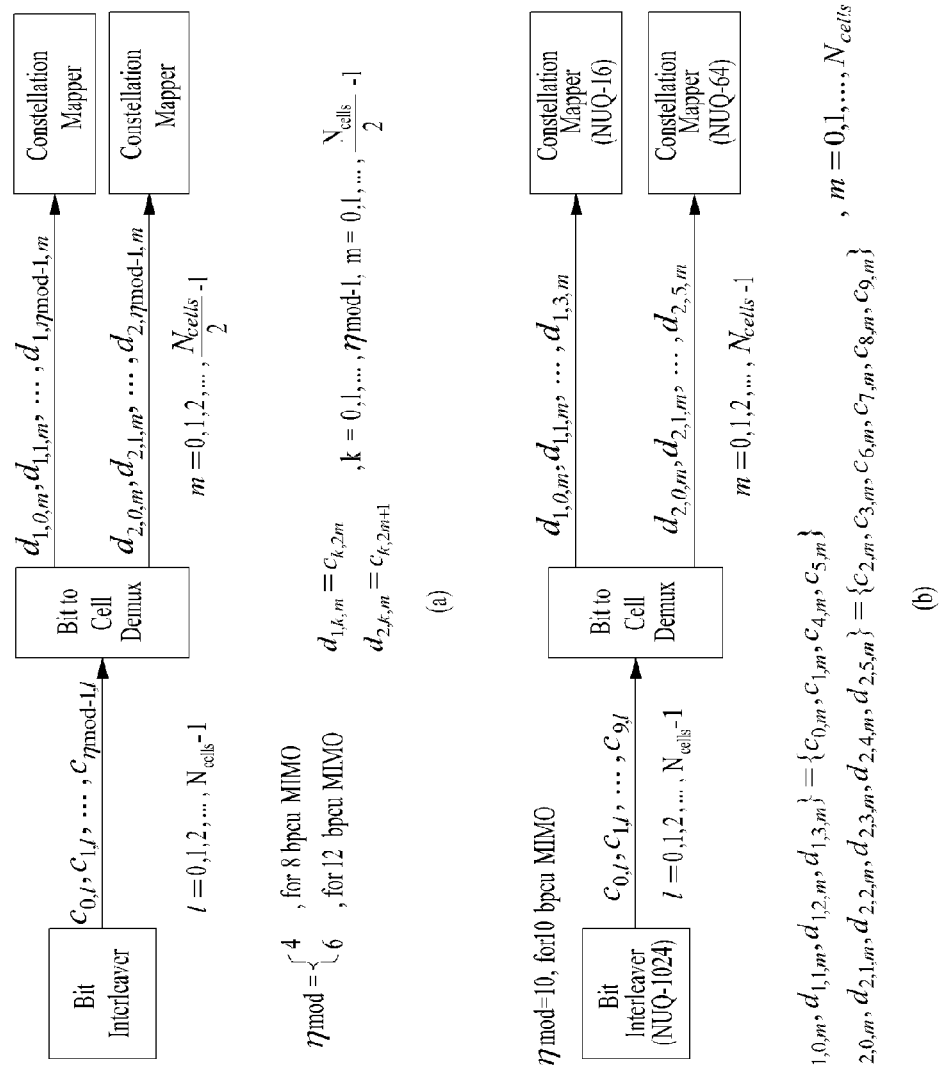

[Fig. 25]
(a) 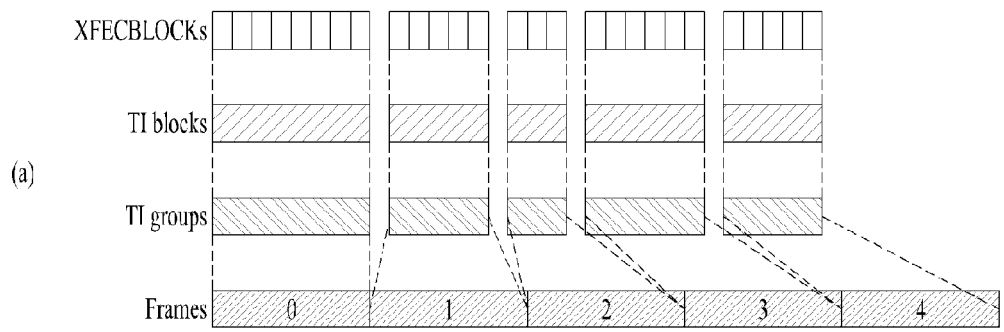
(b) 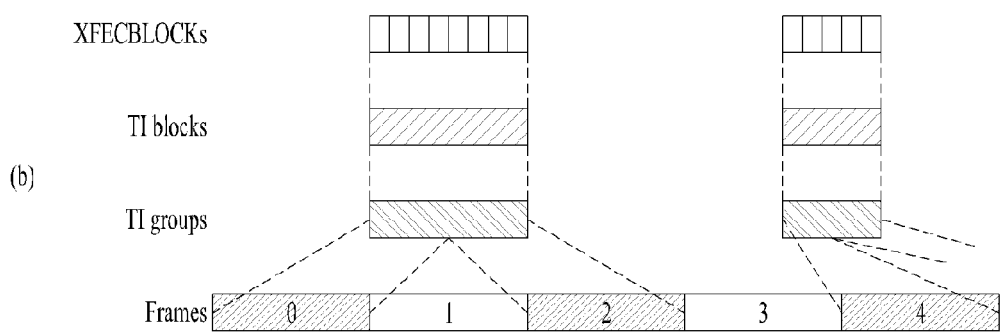
(c) 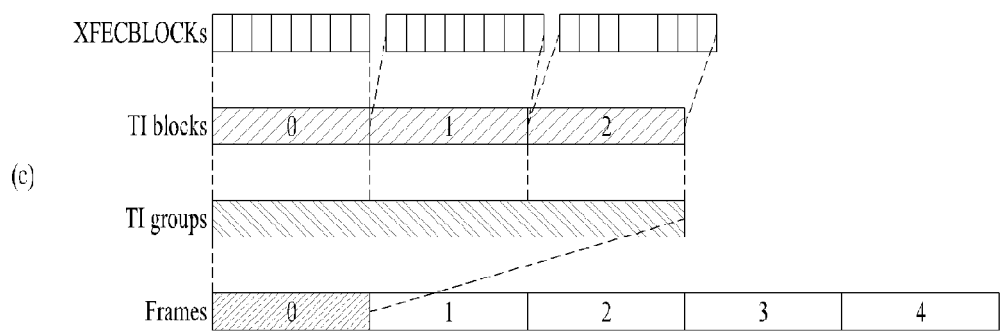

[Fig. 26]
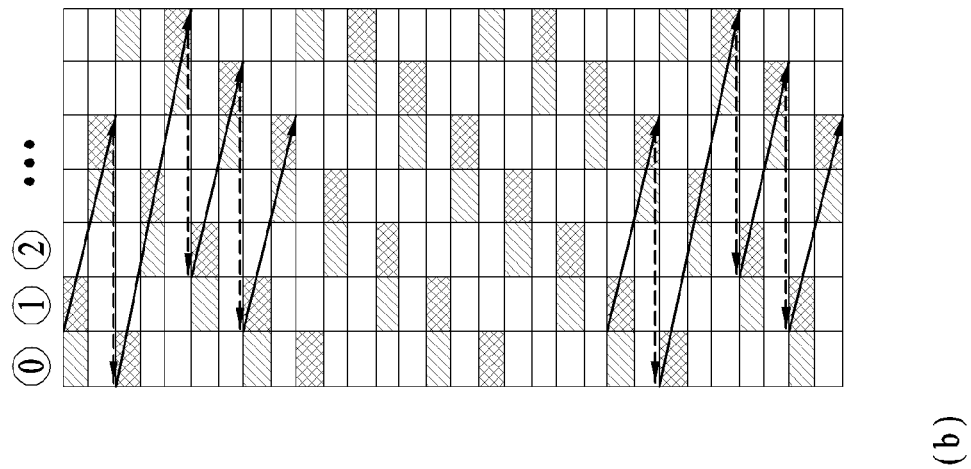
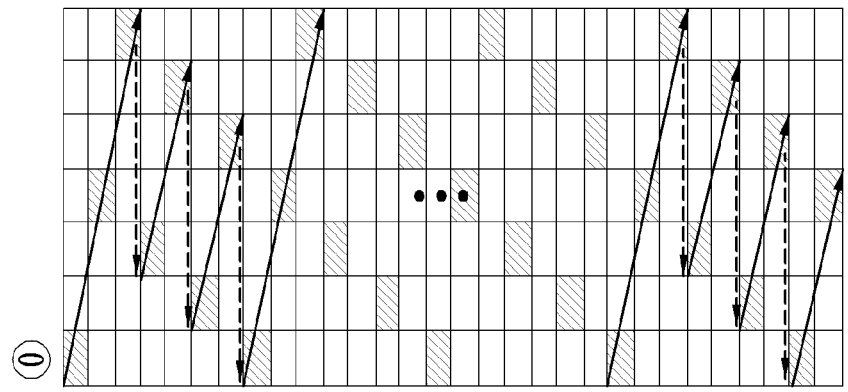
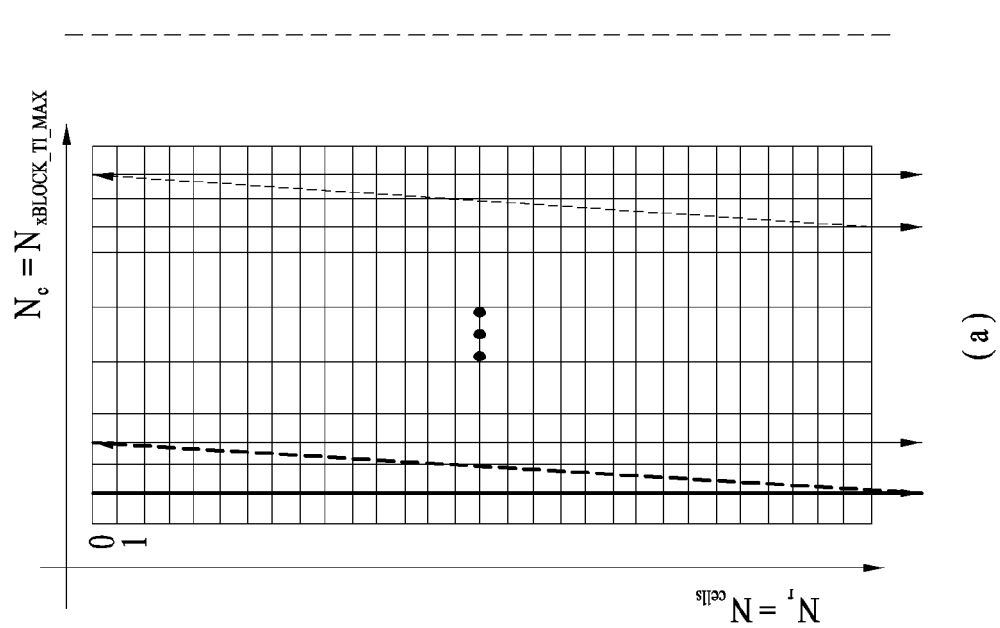

[Fig. 27]
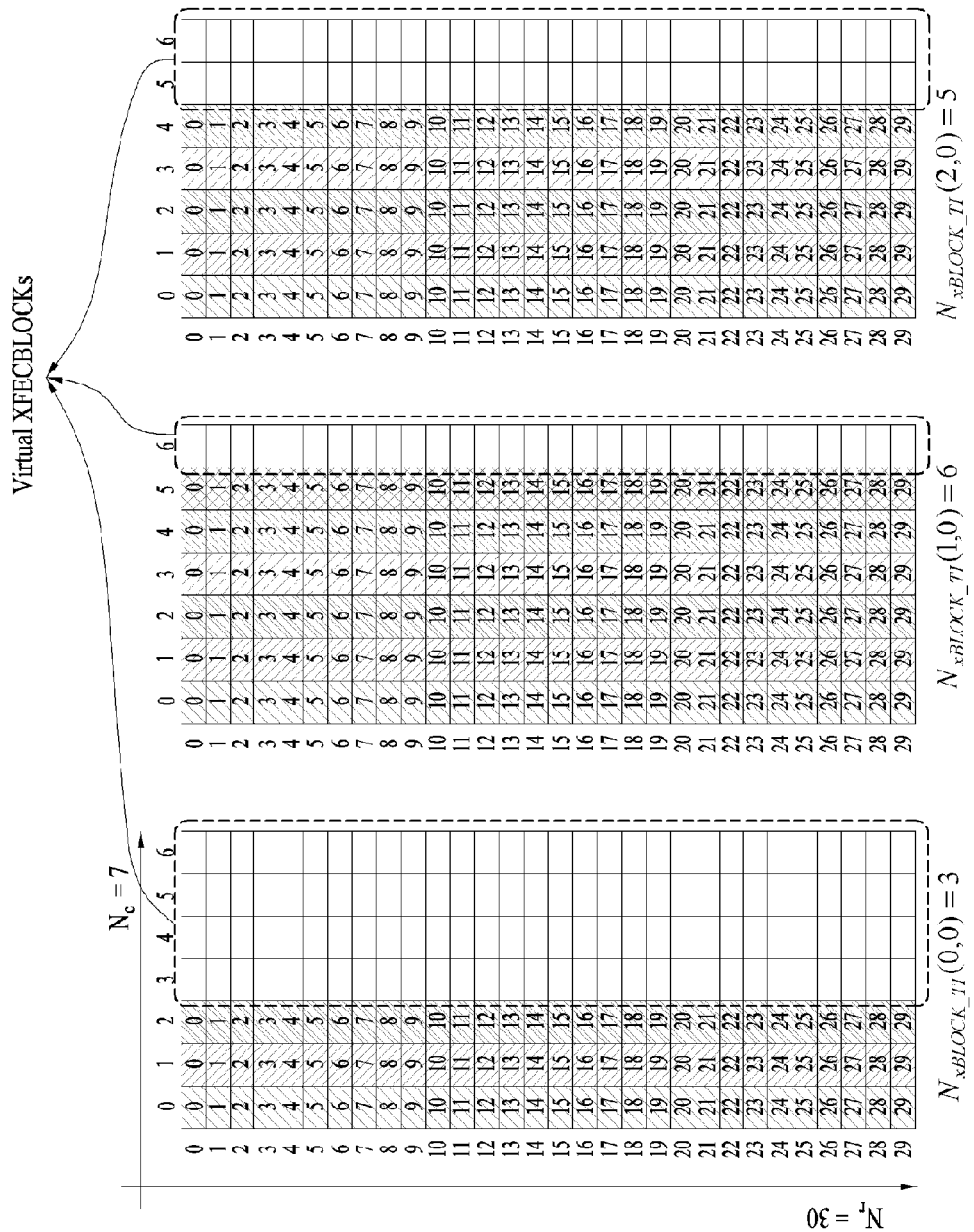

[Fig. 28]
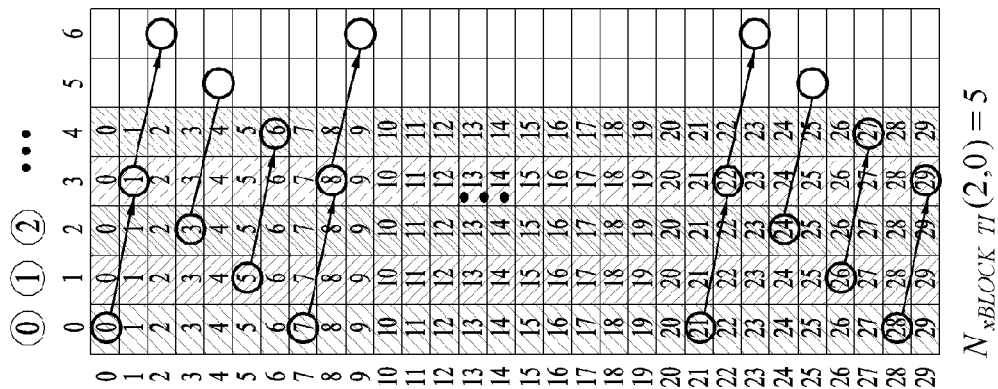
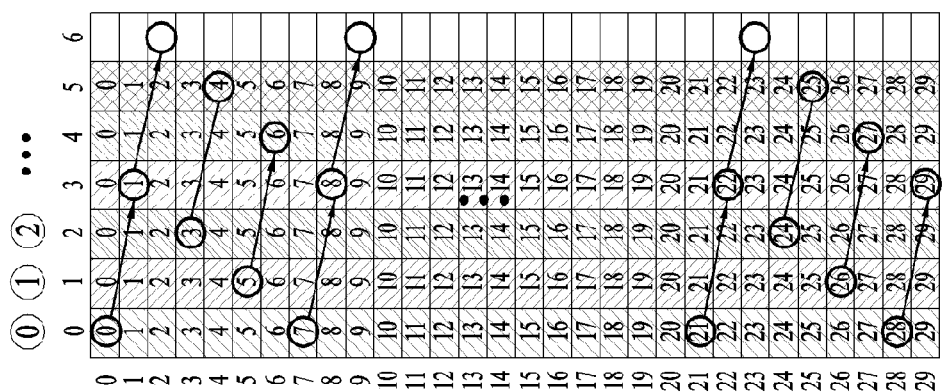
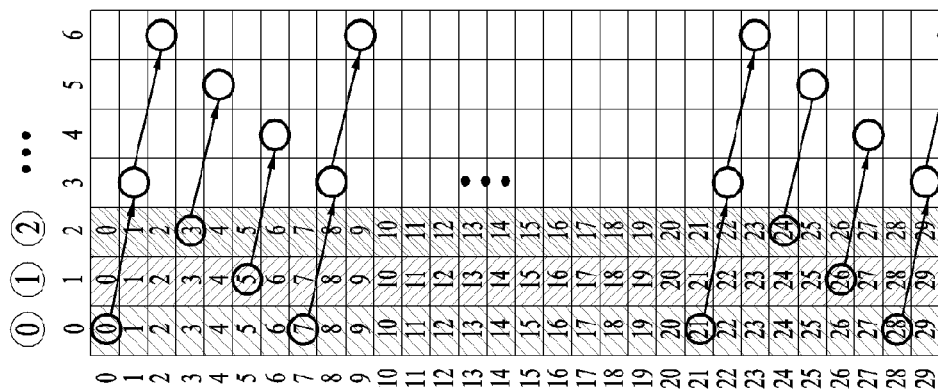

[Fig. 29]

[Fig. 30]
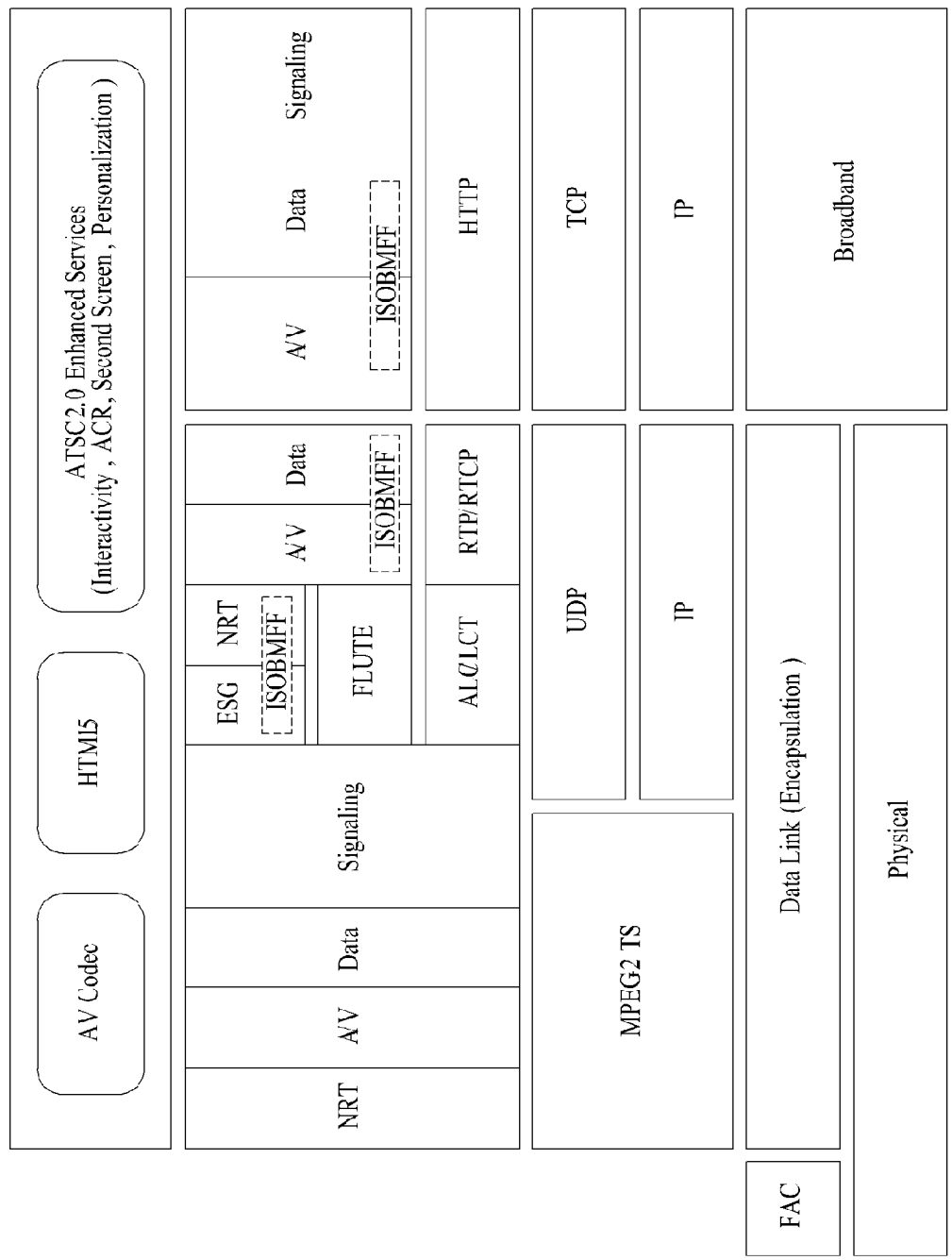

[Fig. 31]
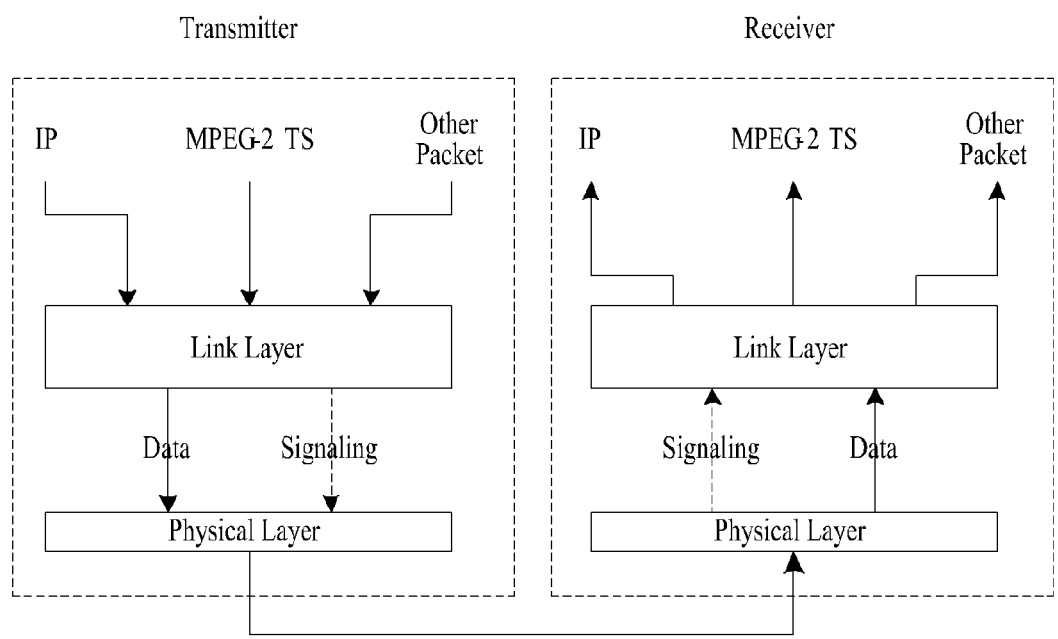

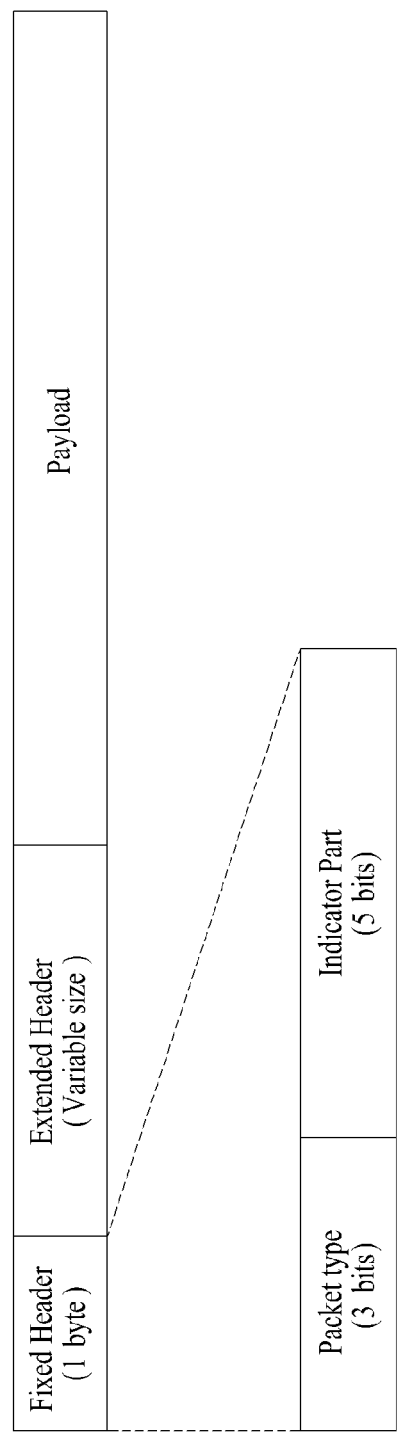
[Fig. 32]

[Fig. 33]

| Packet Type Value | Meaning |
|---|---|
| 000 | IPv4 |
| 001 | IPv6 |
| 010 | Compressed IP Packet |
| 011 | MPEG-2 Transport Stream |
| 100 | Reserved |
| 101 | Pacettized stream (e.g MPEG media transport packet , etc ) |
| 110 | Signaling |
| 111 | Framed_Packet_Type |

[Fig. 34]
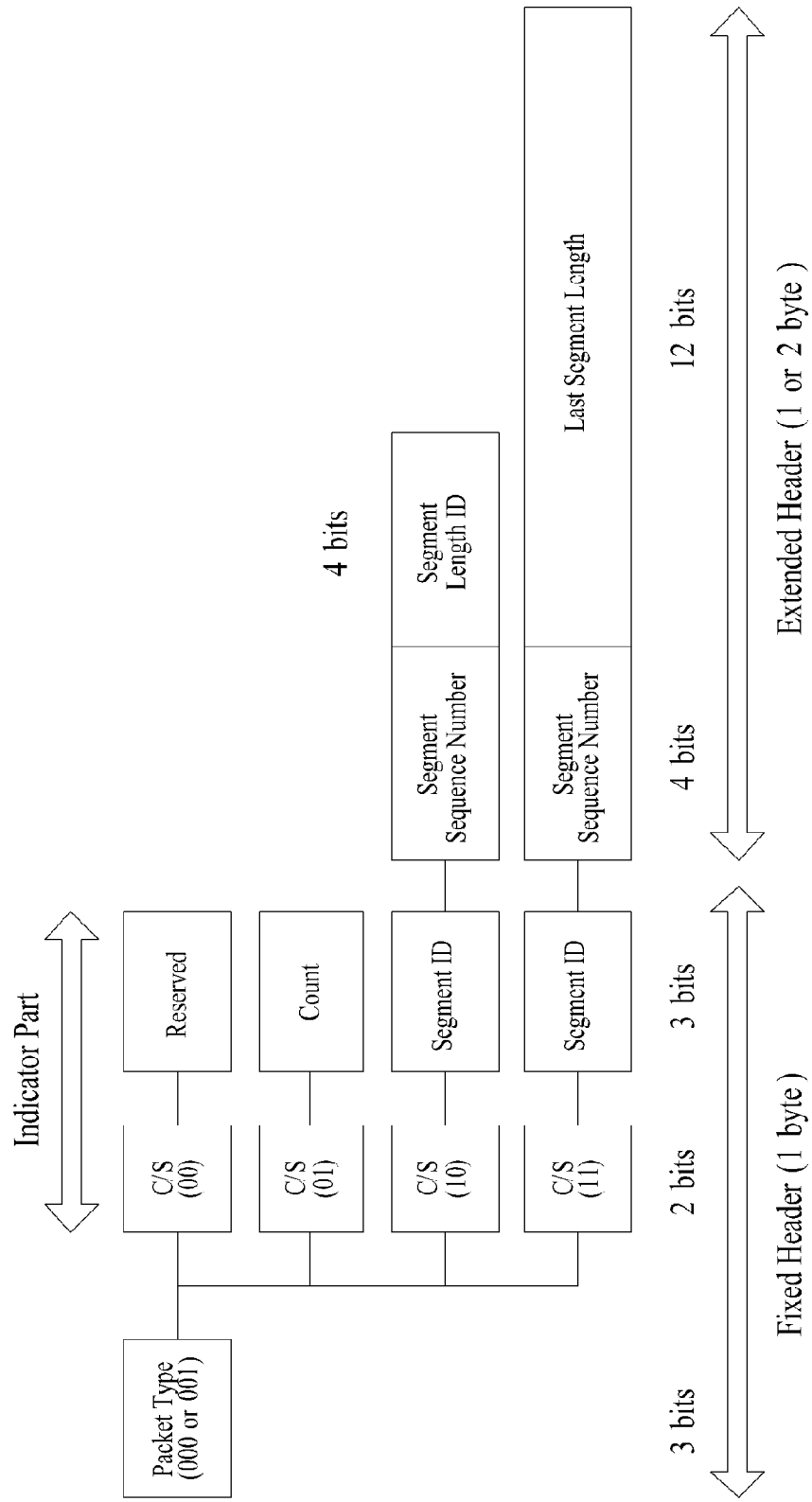

[Fig. 35]

| C/S field value | Meaning | Next Field | Extended Header Size | Extended Header Field | Total Header Length |
|---|---|---|---|---|---|
| 00 | Normal Packet | Reserved | - | - | 1 byte |
| 01 | Concatenated Packet | Count | - | - | 1 byte |
| 10 | Segmented Packet | Seg_ID | 1 byte | Seg_SN, Seg_Len_ID | 2 bytes |
| 11 | Segmented Packet | Seg_ID | 2 bytes | Seg_SN, L_Seg_Len | 3 bytes |

[Fig. 36]

| Count (3bits) | No. of Concatenated IP packets |
|---|---|
| 000 | 2 |
| 001 | 3 |
| 010 | 4 |
| 011 | 5 |
| 100 | 6 |
| 101 | 7 |
| 110 | 8 |
| 111 | 9 |

[Fig. 37]

| Seg_Len_ID | Segment Length (byte) |
|---|---|
| 0000 | 512 (= min_Len) |
| 0001 | 768 |
| 0010 | 1024 |
| 0011 | 1280 |
| 0100 | 1536 |
| 0101 | 1792 |
| 0110 | 2048 |
| 0111 | 2304 |
| 1000 | 2560 |
| 1001 | 2816 |
| 1010 | 3072 |
| 1011 | 3328 |
| 1100 | 3584 |
| 1101 | 3840 |
| 1110 | 4096 |
| 1111 | 4352 |

Segment Length = Seg_Len_ID × Len_Unit + min_Len   bytes

[Fig. 38]
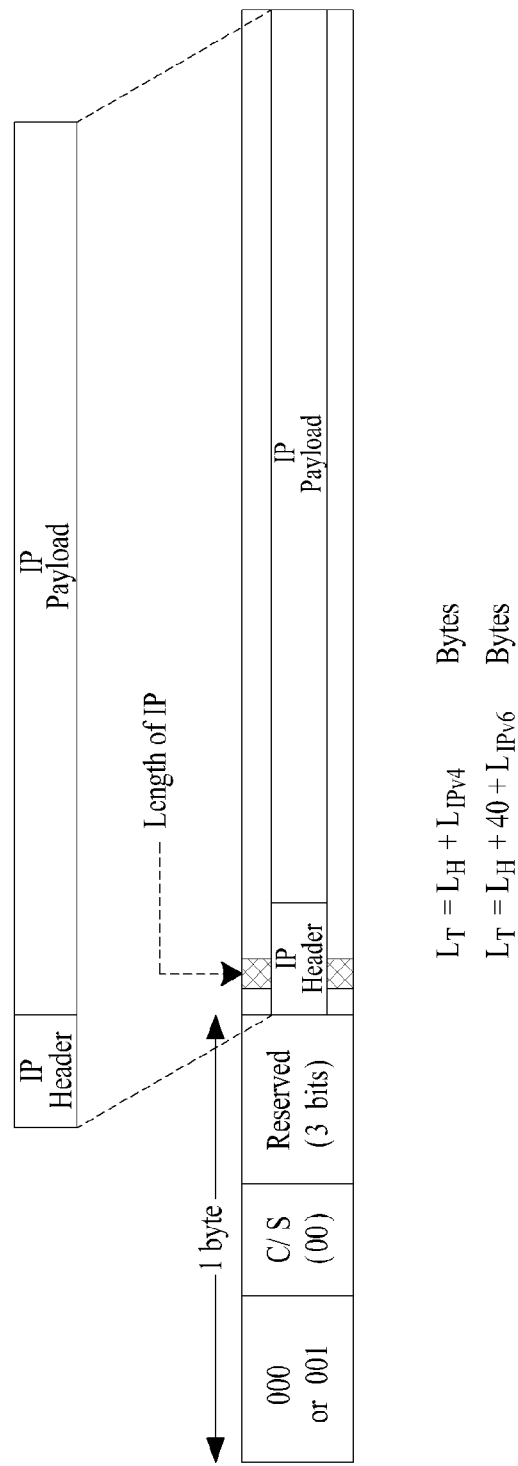

[Fig. 39]
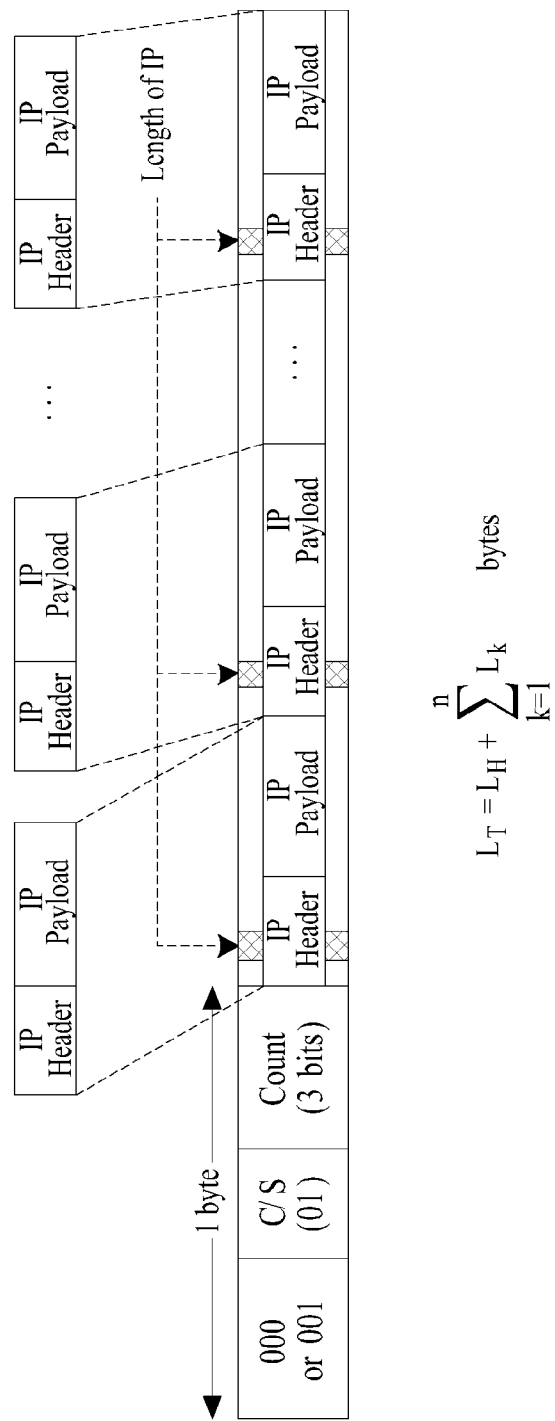

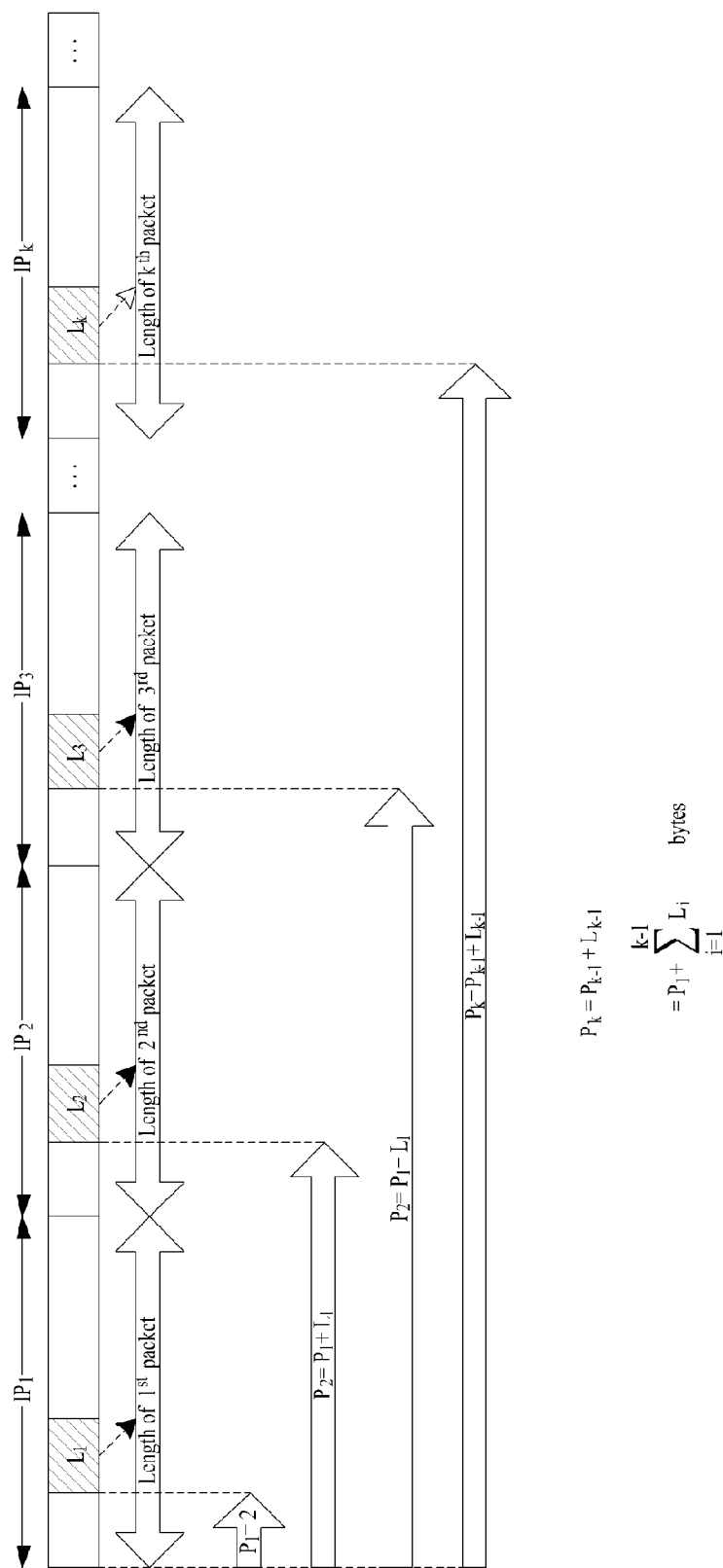
[Fig. 40]

[Fig. 41]
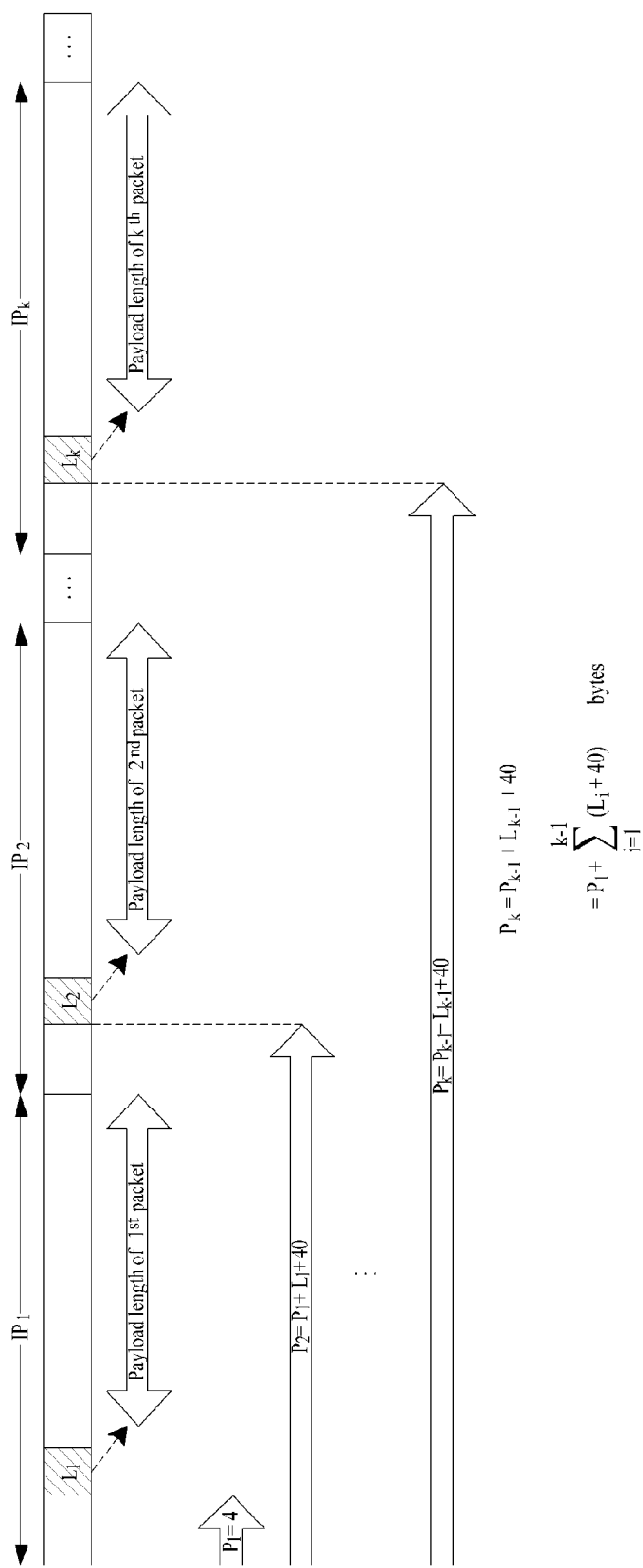

[Fig. 42]
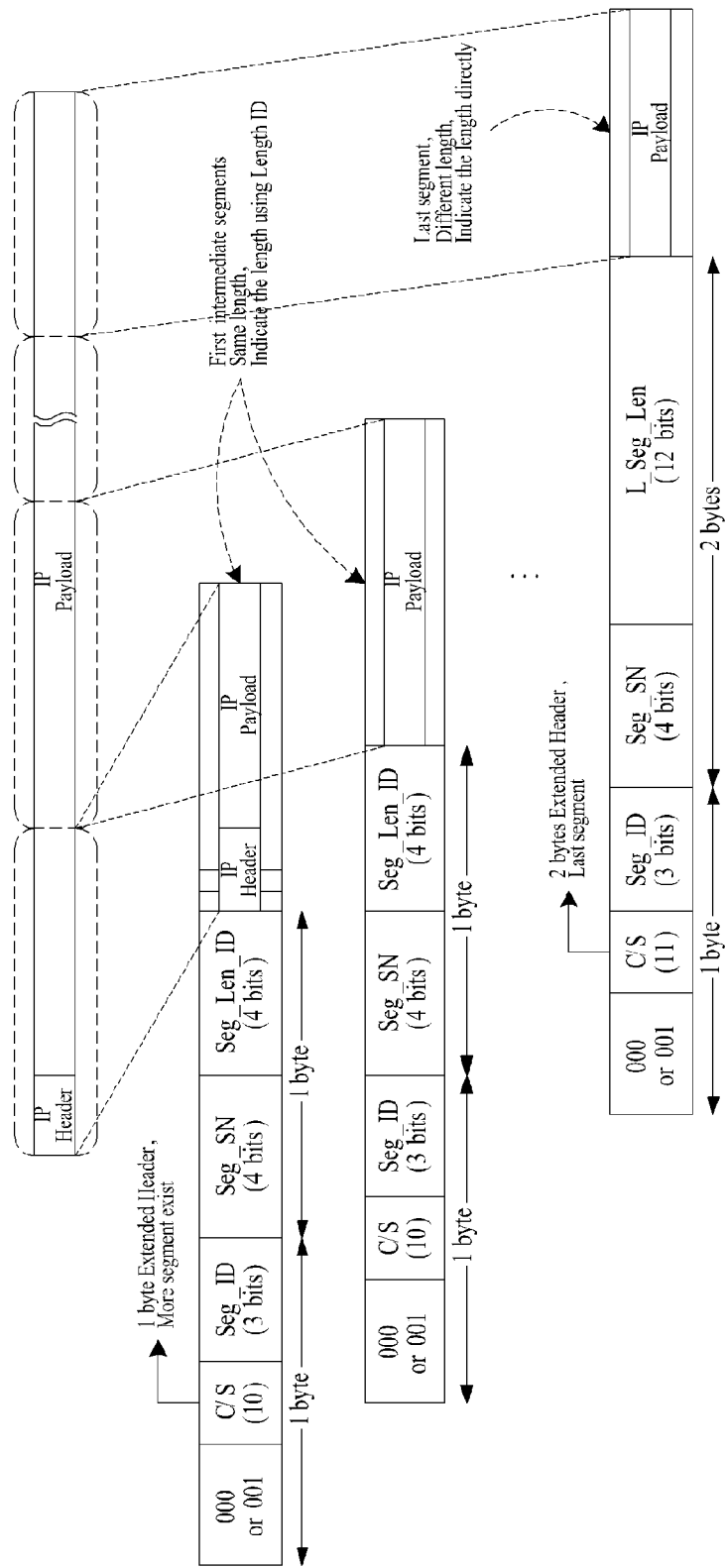

[Fig. 43]
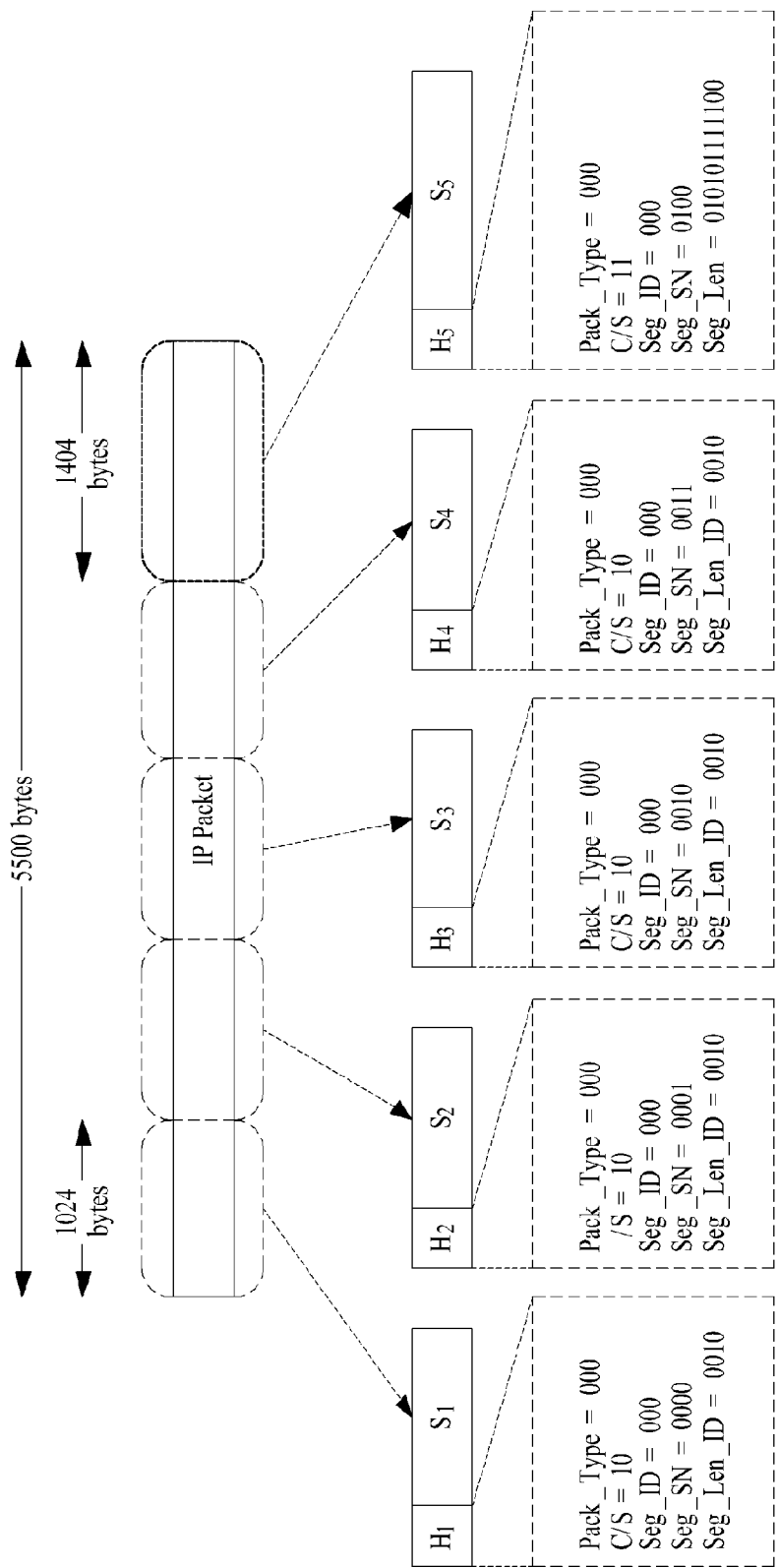

[Fig. 44]
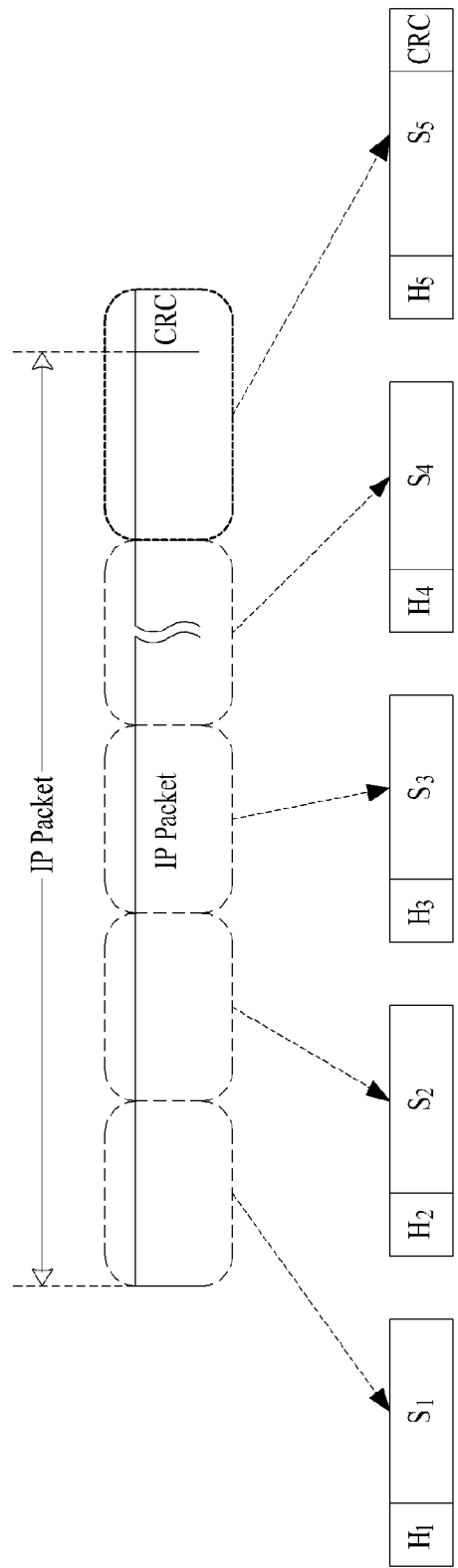

[Fig. 45]
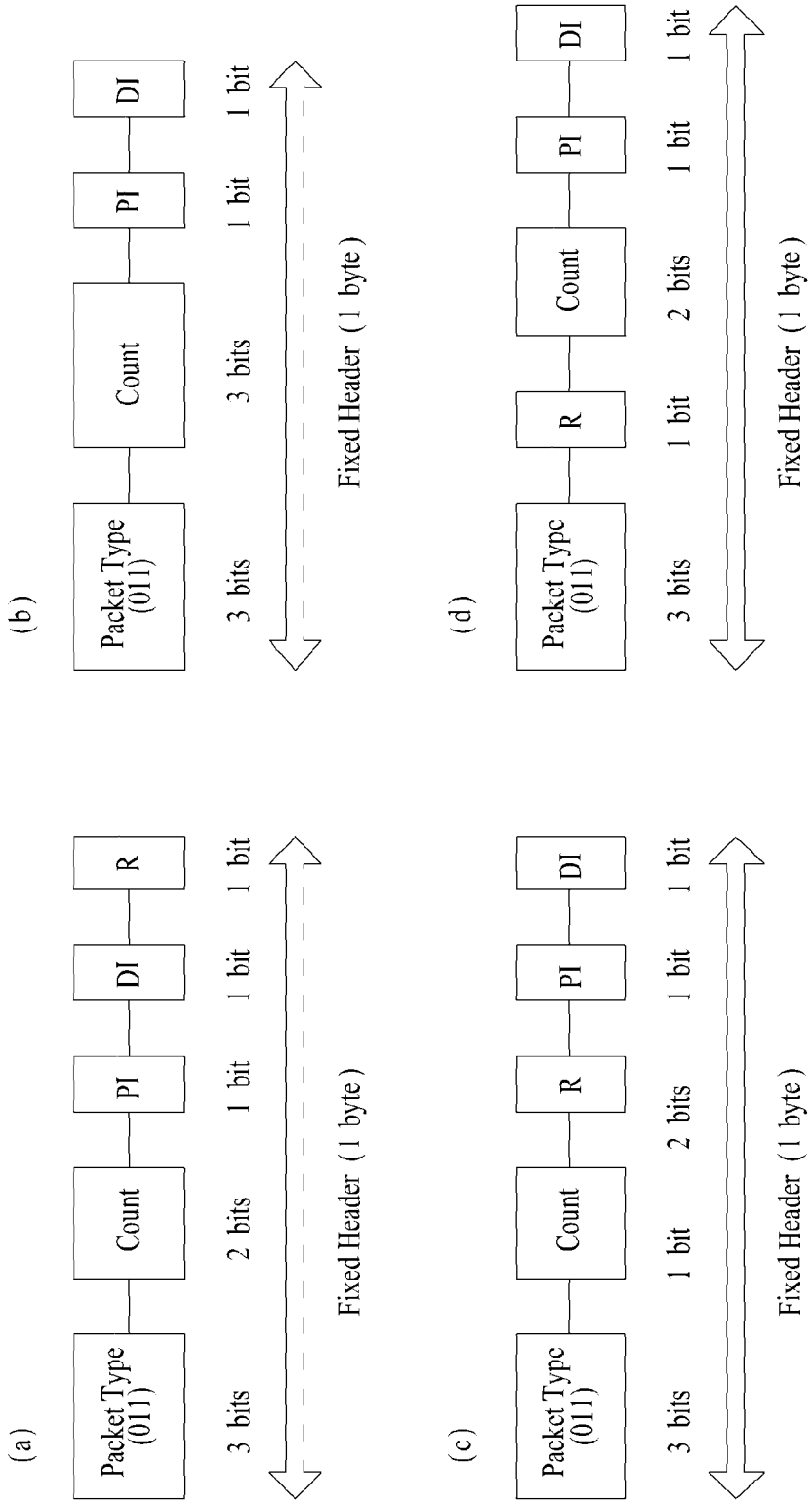

[Fig. 46]

| Count (2bits) | No. of Concatenated MPEG-2 TS packets | Size (except sync byte) |
|---|---|---|
| 00 | 8 | 1496 |
| 01 | 16 | 2992 |
| 10 | 24 | 4488 |
| 11 | 32 | 5984 |

[Fig. 47]
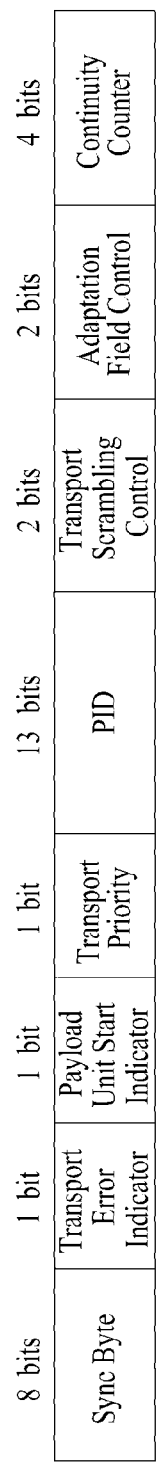

[Fig. 48]
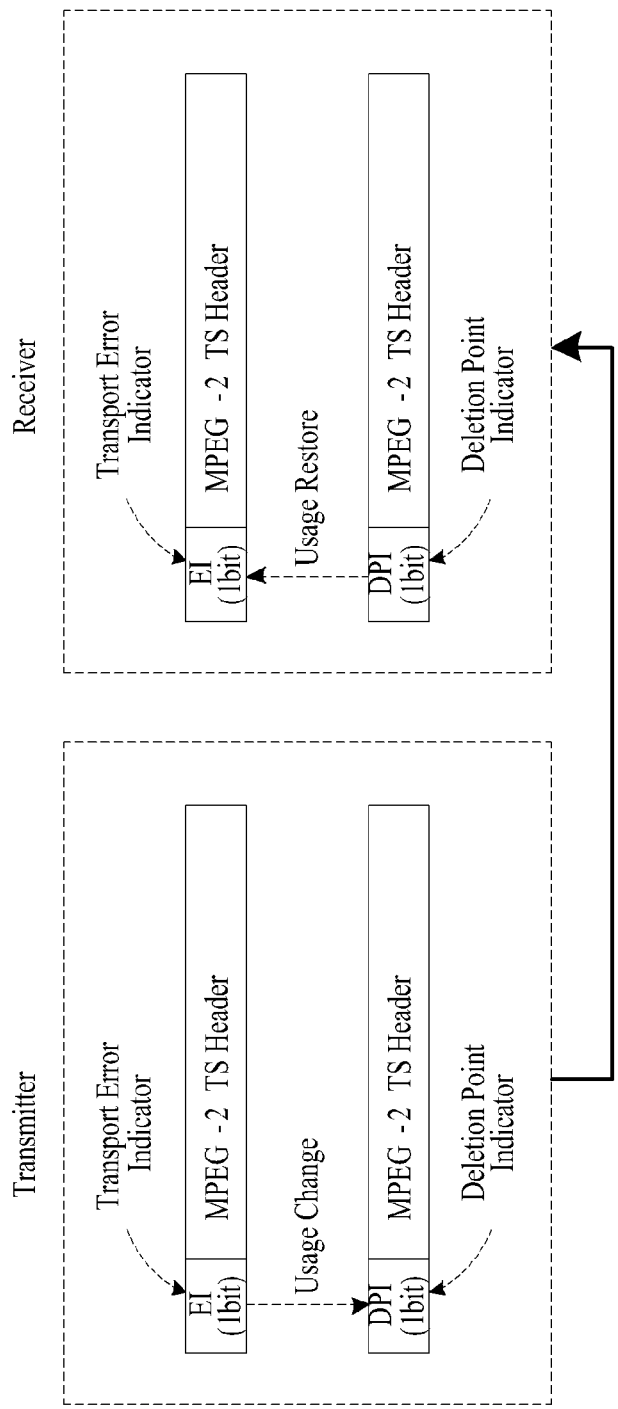

[Fig. 49]
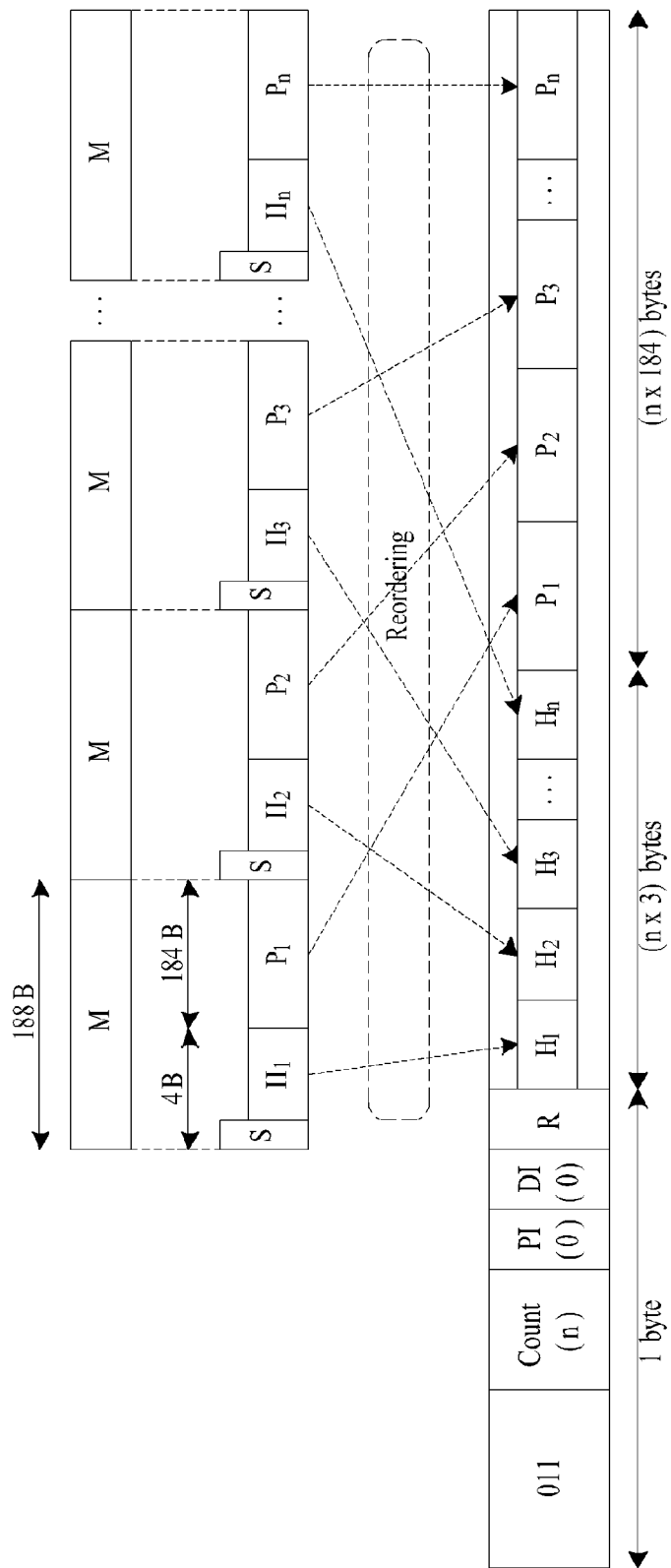

[Fig. 50]
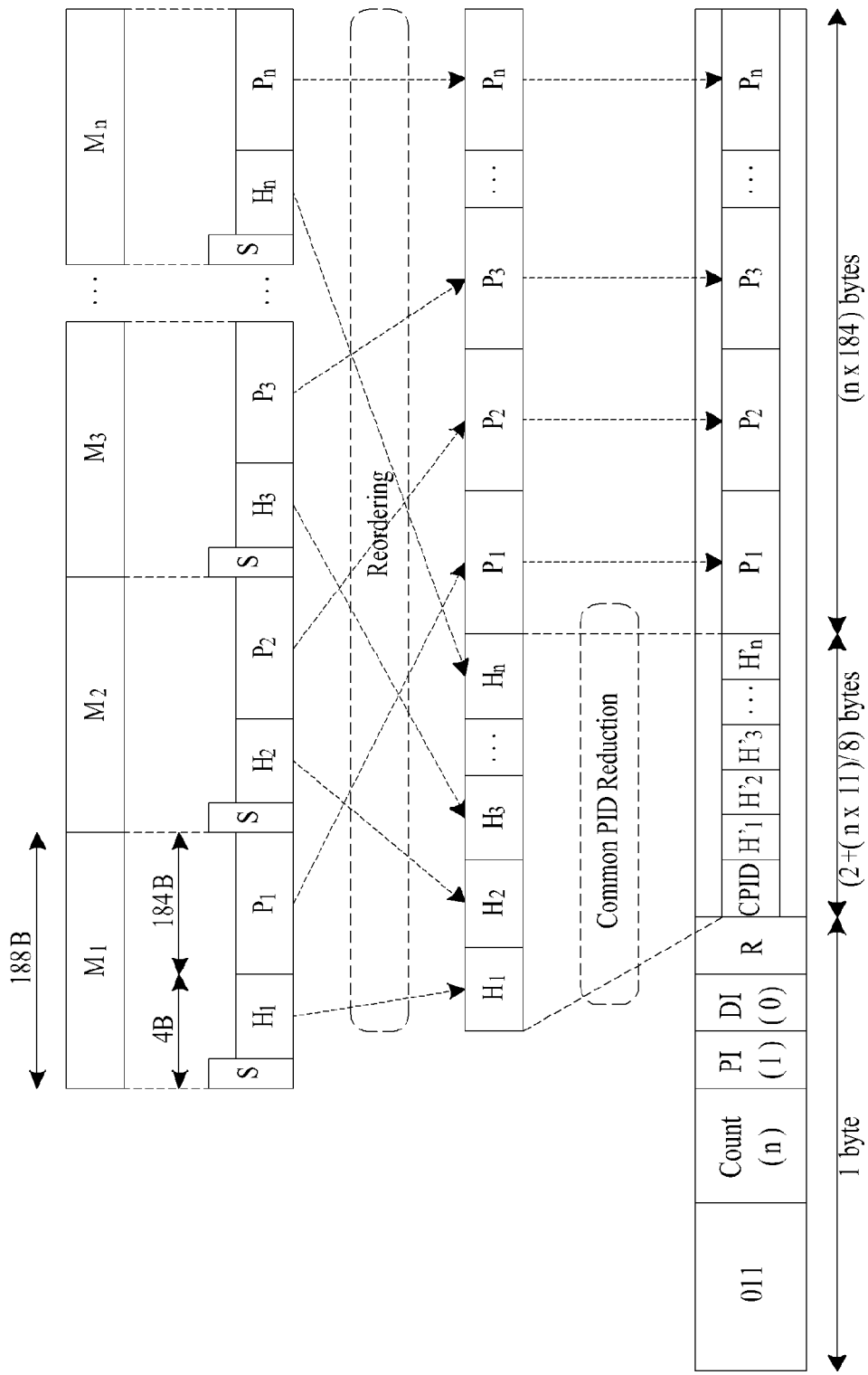

[Fig. 51]
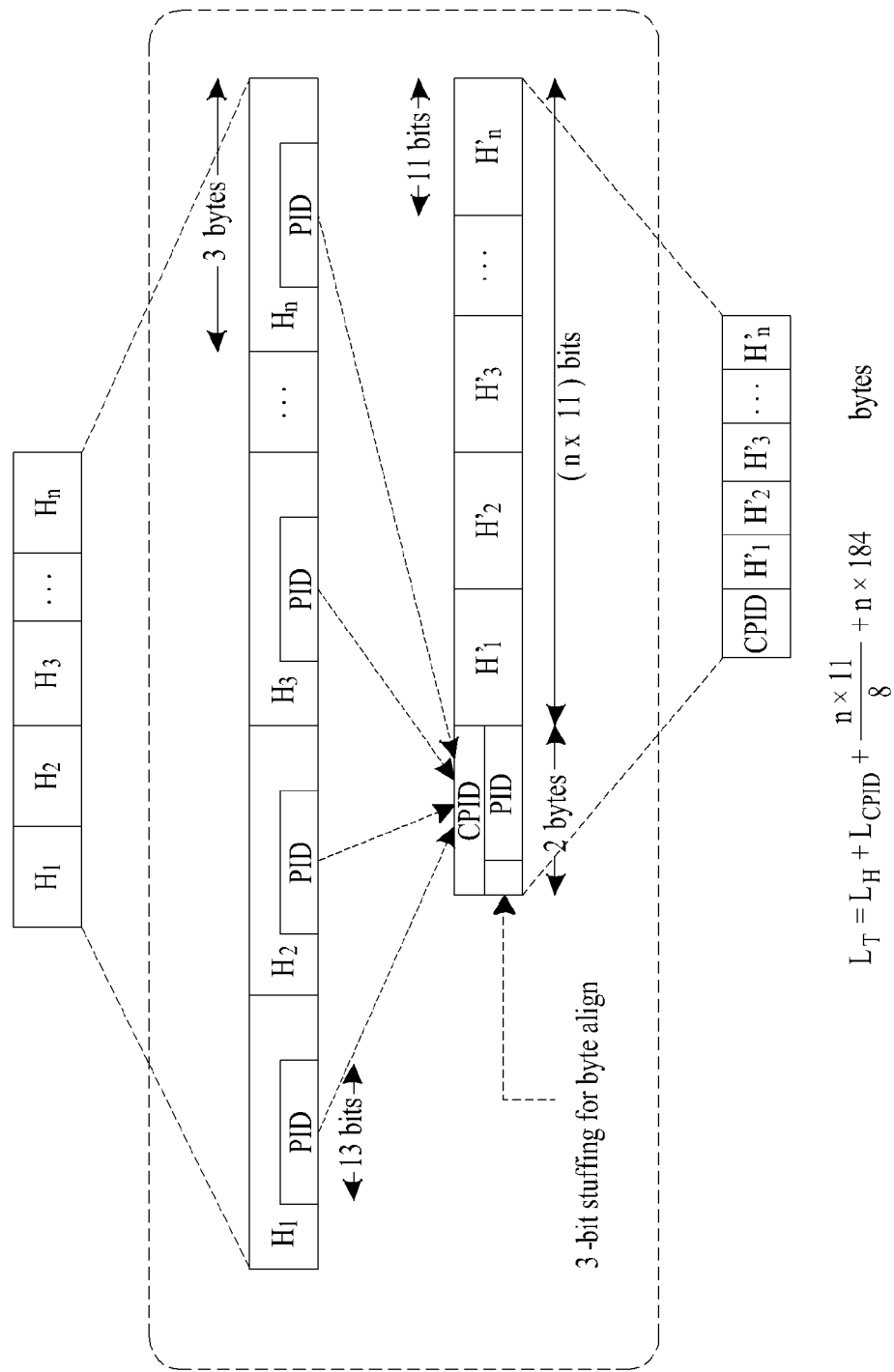

[Fig. 52]

| Count (2bits) | No. of Concatenated MPEG-2 TS packets | Link Layer Packet Length |
|---|---|---|
| 00 | 8 | 1486 |
| 01 | 16 | 2969 |
| 10 | 24 | 4452 |
| 11 | 32 | 5935 |

[Fig. 53]
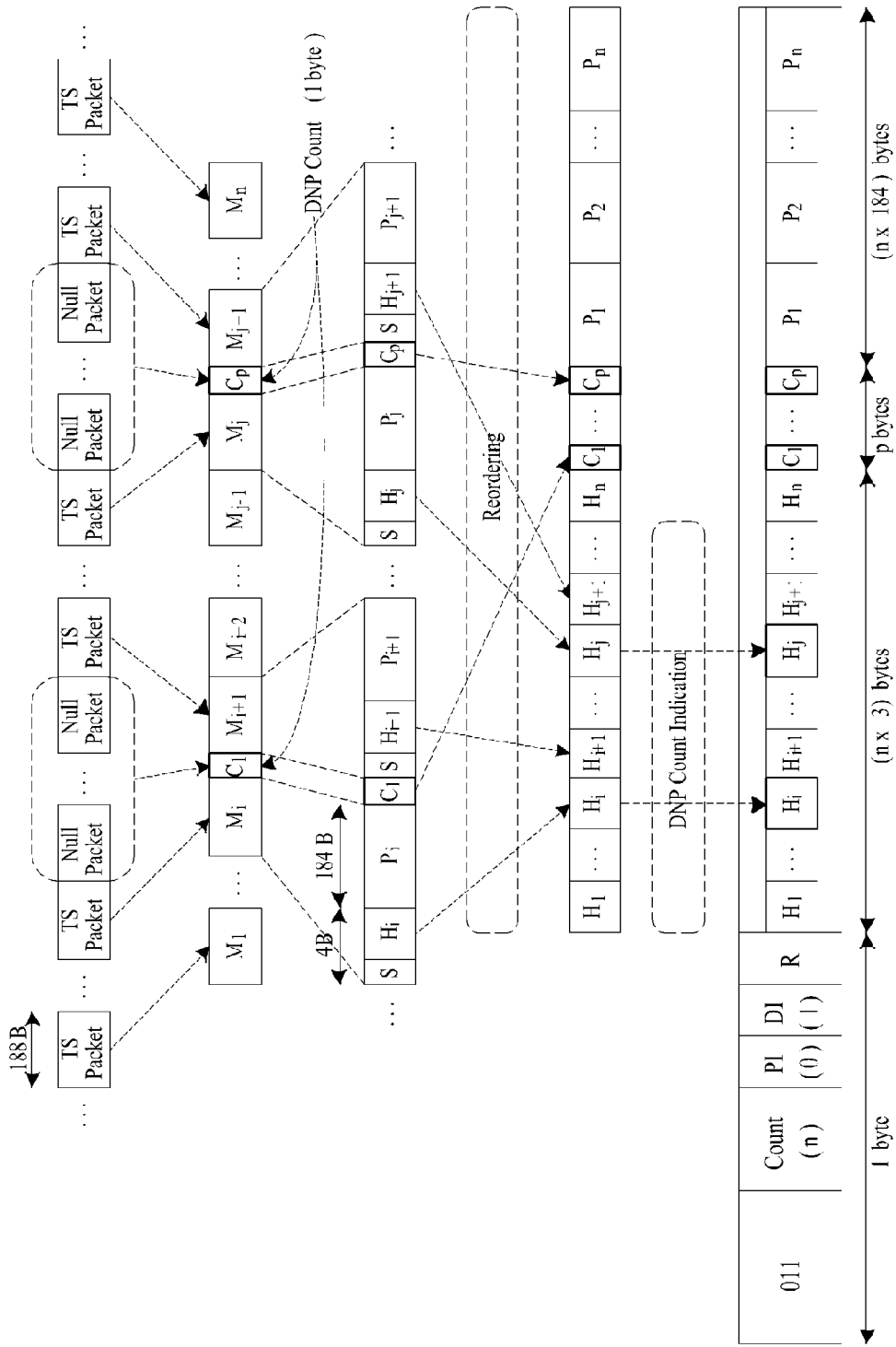

[Fig. 54]
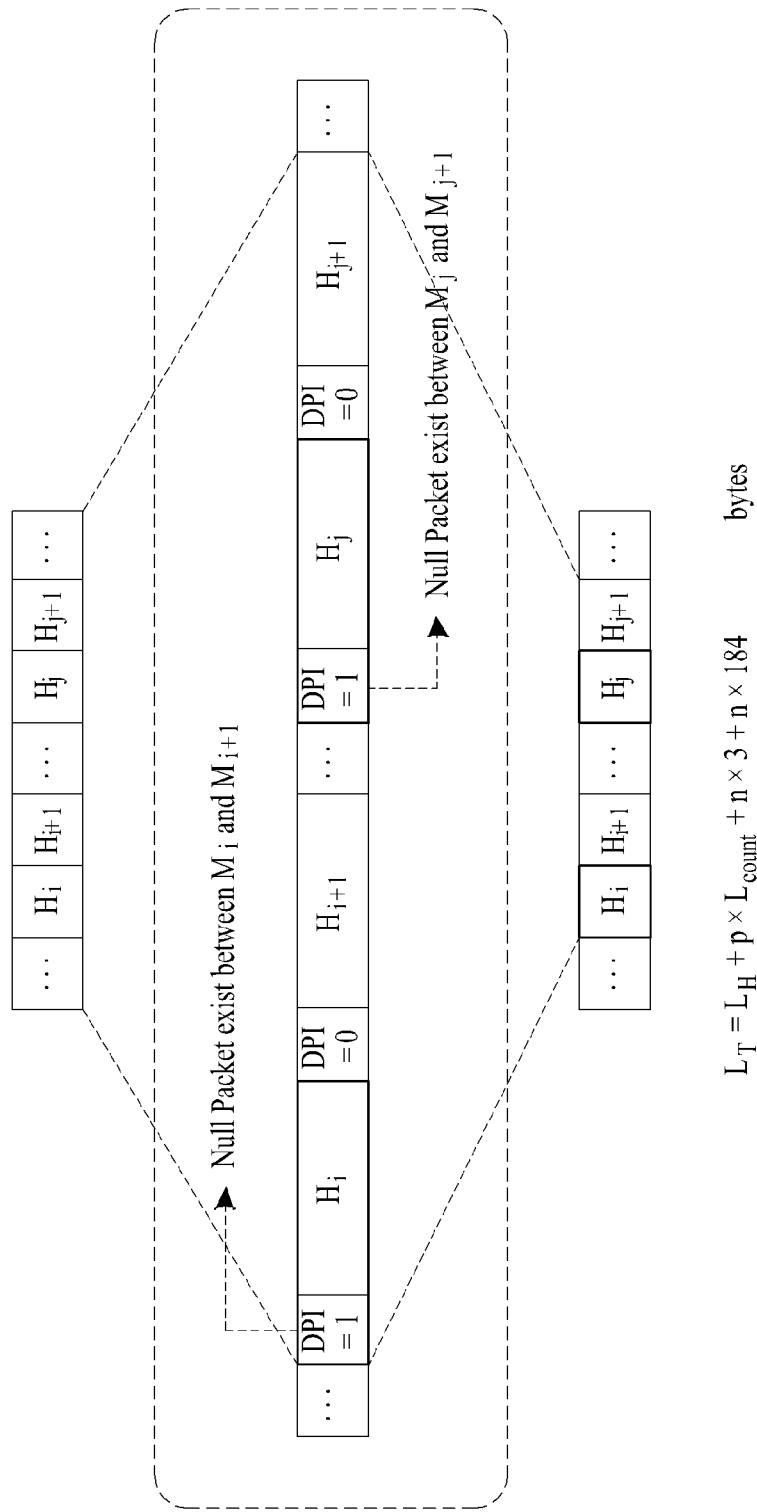

[Fig. 55]
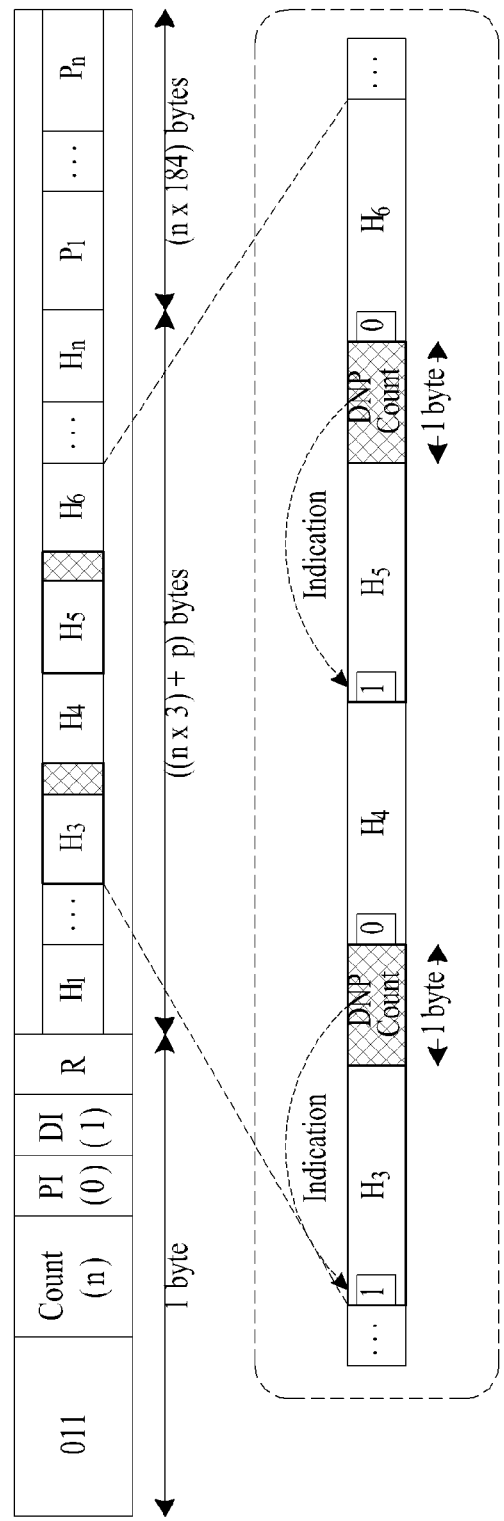

[Fig. 56]
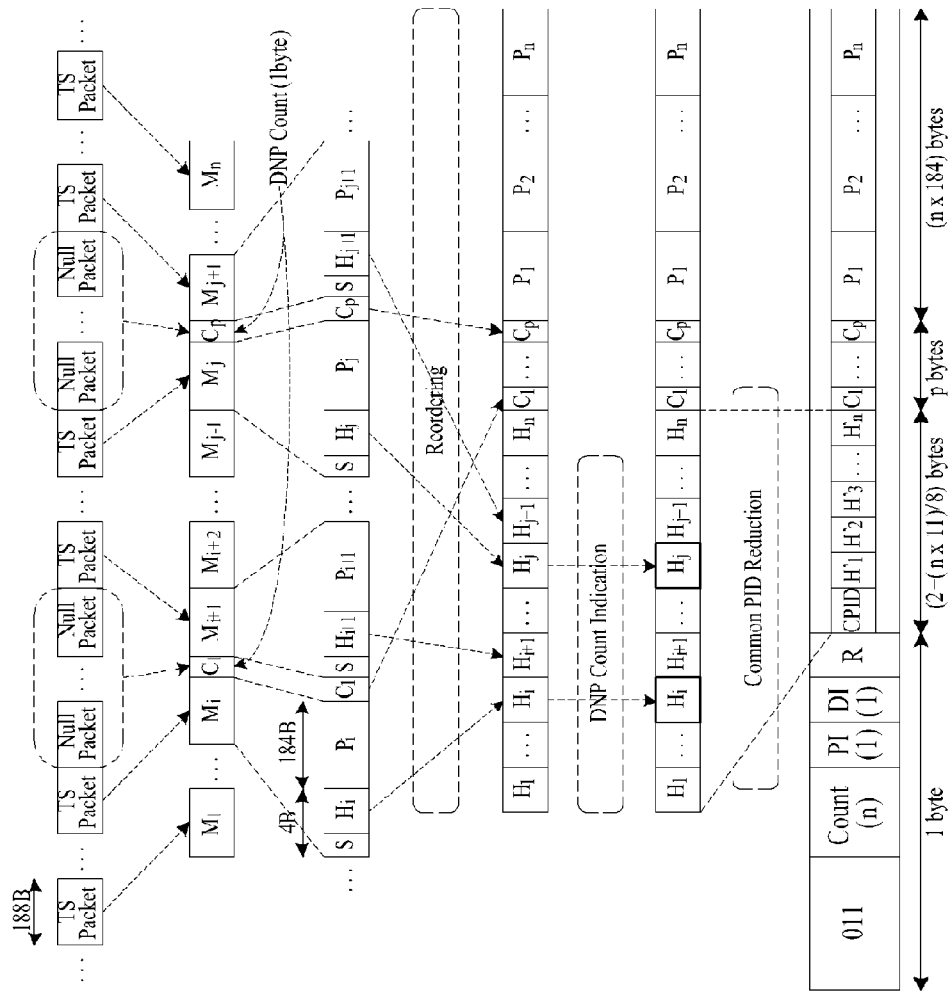
[Fig. 57]
$$L_T = L_H + p \times L_{count} + L_{CPID} + \frac{n \times 11}{8} + n \times 184 \quad \text{bytes}$$

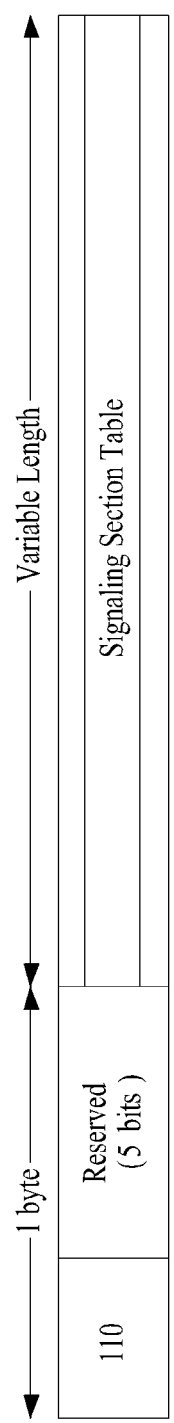
[Fig. 58]

[Fig. 59]
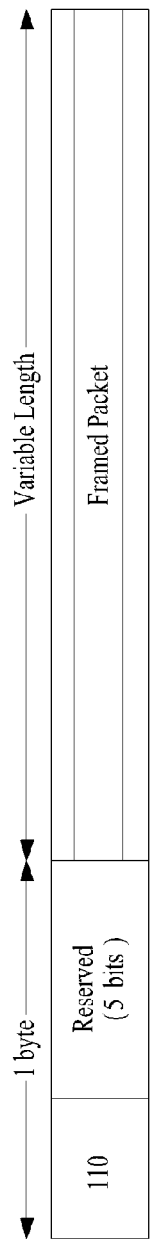
[Fig. 60]
| Syntax | No. of Bits | Format |
|---|---|---|
| framed_packet () { | | |
| ethernet_type | 16 | uimsbf |
| length | 16 | '11' |
| packet() | Var. | bslbf |
| } | | |

[Fig. 61]
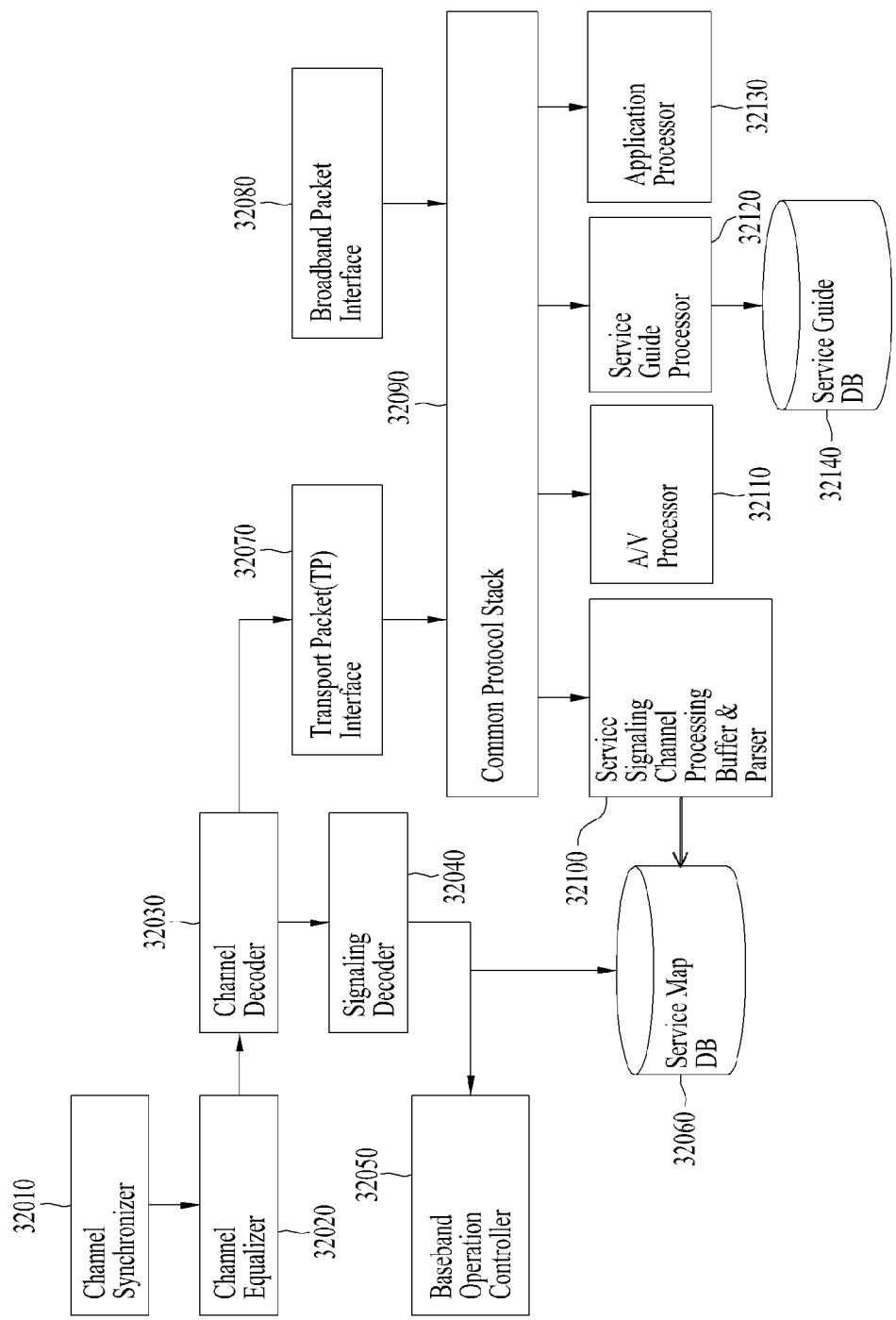

[Fig. 62]

| Syntax | No. of Bits | Format |
|---|---|---|
| Signaling_Section_Table() { | | |
|     table_id | 8 | uimsbf |
|     section_syntax_indicator | 1 | bslbf |
|     Specific Use | 1 | bslbf |
|     reserved | 2 | bslbf |
|     section_length | 12 | uimsbf |
|     Specific Use | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     Section Data | var | |
| } | | |

[Fig. 63]
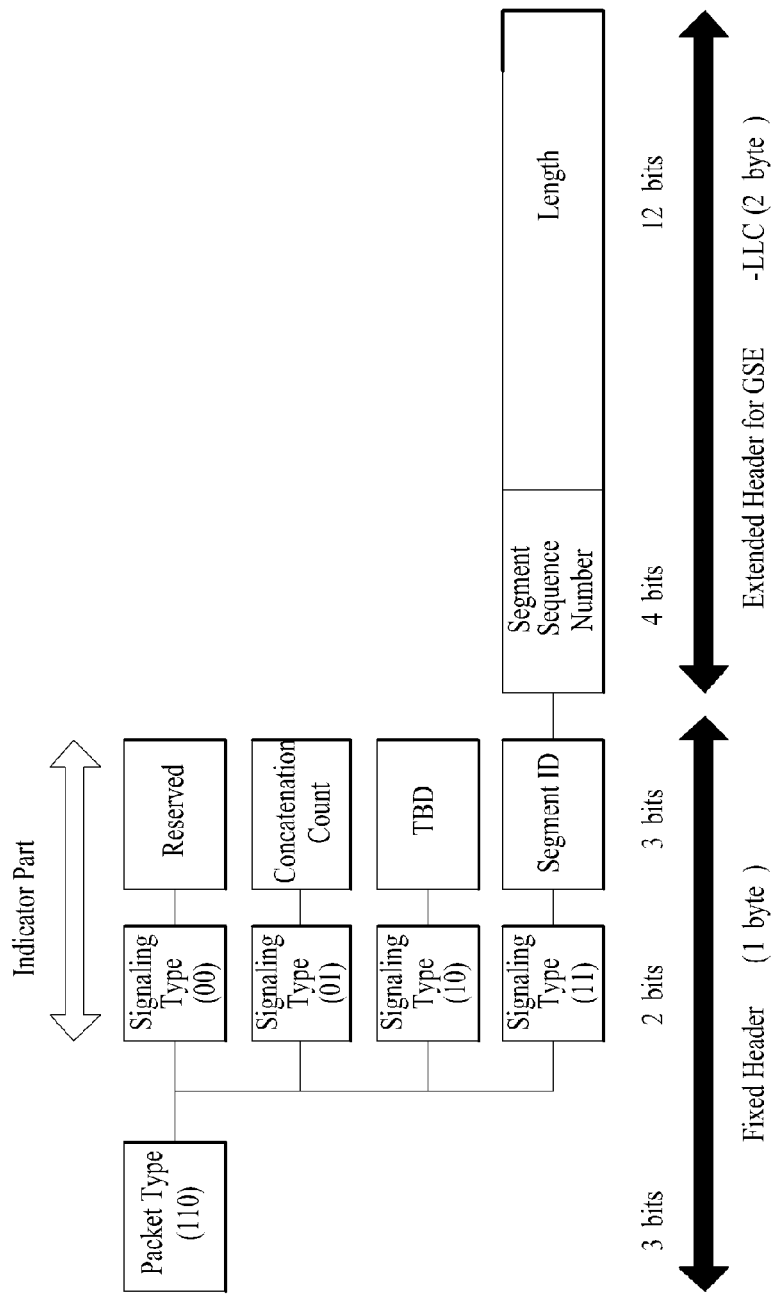
[Fig. 64]
| Signaling Type field value | Meaning | Next Field | Extended Header Size | Extended Header Field | Total Header Length |
|---|---|---|---|---|---|
| 00 | Section Table | Reserved | - | - | 1 byte |
| 01 | Descriptor Only | Count | - | - | 1 byte |
| 10 | Reserved | - | - | - | - |
| 11 | GSE -LLC Type | Seg_ID | 2 bytes | Seg_SN , Length | 3 bytes |

[Fig. 65]

| Count (3bits) | No. of Concatenated Descriptor |
|---|---|
| 000 | 1 |
| 001 | 2 |
| 010 | 3 |
| 011 | 4 |
| 100 | 5 |
| 101 | 6 |
| 110 | 7 |
| 111 | 8 |

[Fig. 66]
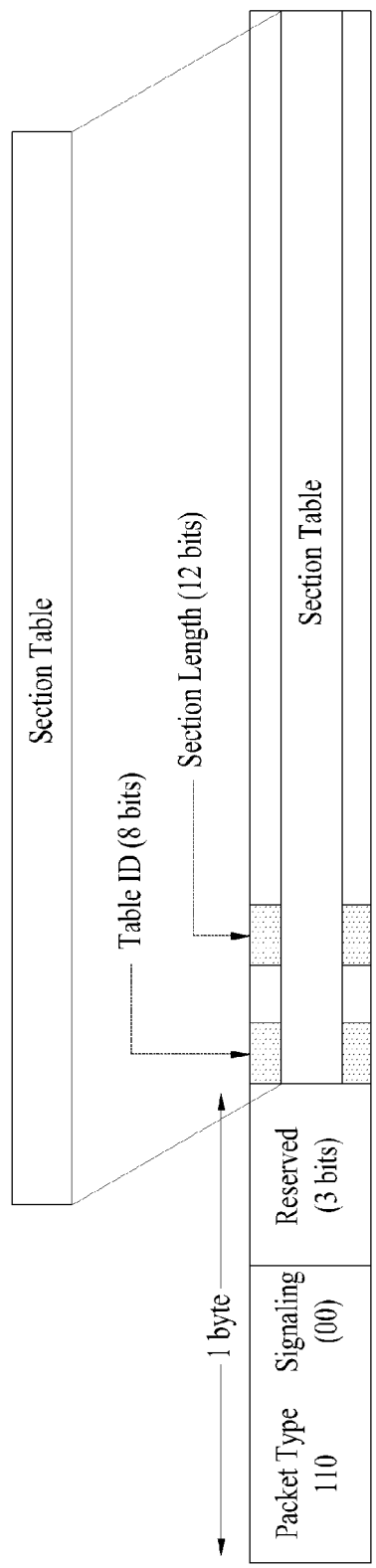

[Fig. 67]

| Syntax | No. of bits | Identifier |
|---|---|---|
| network_information_section (){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     network_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | uimsbf |
|     for(i=0;i<N;i++){ | | |
|         descriptor() | | |
|     } | | |
|     reserved_future_use | 4 | bslbf |
|     transport_stream_loop_length | 12 | uimsbf |
|     for(i=0;i<N;i++){ | | |
|         broadcast_id | 16 | uimsbf |
|         original_network_id | 16 | uimsbf |
|         reserved_future_use | 4 | bslbf |
| | 12 | uimsbf |
|     delivery_system_descriptor_length | | |
|         for(j=0;j<N;j++){ | | |
|             delivery_system_descriptor () | | |
|         } | | |
|     } | | |
| } | | |

[Fig. 68]

| Syntax | No. of bits | Identifier |
|---|---|---|
| delivery_system_descriptor (){ | | |
| descriptor_tag | 8 | uimsbf |
| descriptor_length | 8 | uimsbf |
| delivery_system_id | 16 | uimsbf |
| base_PLP_id | 8 | uimsbf |
| base_PLP_version | 5 | uimsbf |
| reserved | 3 | '111' |
| if(descriptor_length > 4) | | |
| { | | |
| delivery_system_parameters () | | |
| } | | |
| } | | |

[Fig. 69]

| Syntax | No. of bits | Format |
|---|---|---|
| fast_information_ table (){ | | |
|     table_id | 8 | uimsbf |
|     section_syntax_indicator | 1 | ? |
|     private_indicator | 1 | ? |
|     reserved | 2 | ?1 |
|     section_length | 12 | uimsbf |
|     table_id_ extension | 16 | uimsbf |
|     reserved | 2 | ?1 |
|     FIT_data_version | 5 | uimsbf |
|     current_next_indicator | 1 | bslbf |
|     section_number | 8 | uimsbf |
|     last_section_number | 8 | uimsbf |
|     num_broadcast | | |
|     for(i=0;i<num_broadcast;i++){ | | |
|       broadcast_id | 16 | uimsbf |
|       delivery_system_id | 16 | uimsbf |
|       base_PLP_id | 8 | uimsbf |
|       base_PLP _version | 5 | uimsbf |
|       reserved | 3 | ?11 |
|       num_service | 8 | uimsbf |
|       for(j=0;j< num_service ;j++){ | | |
|         service_id | 16 | uimsbf |
|         service_category | 6 | uimsbf |
|         service_hidden_flag | 1 | bslbf |
|         SP_indicator | 1 | bslbf |
|         num_component | 8 | uimsbf |
|         for(k=0;k<num_component;k++){ | | |
|           component_ id | 8 | bslbf |
|           PLP_id | 8 | bslbf |
|         } | | |
|       } | | |
|     } | | |
| } | | |

[Fig. 70]
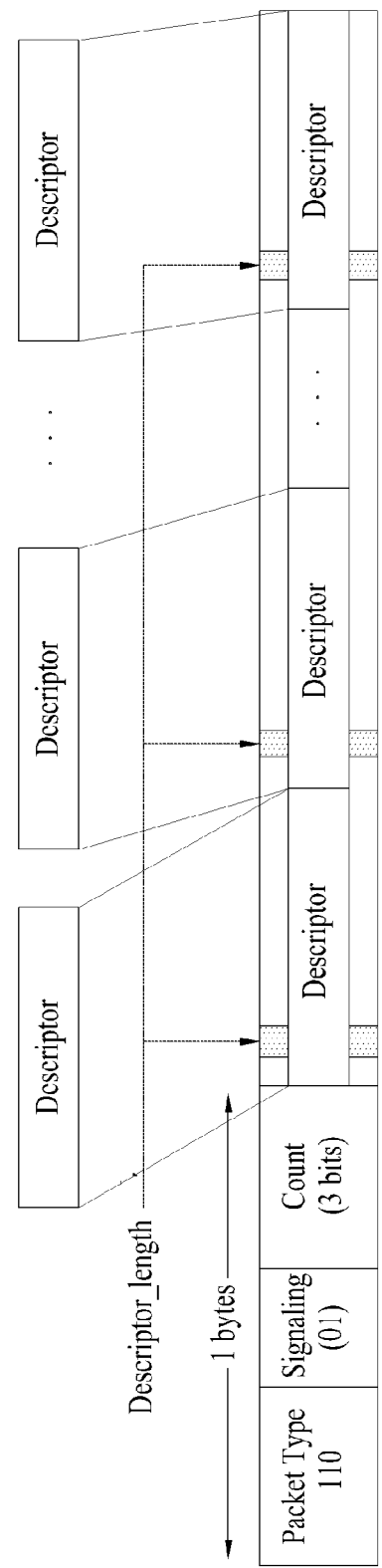

[Fig. 71]

| Syntax | No. of bits | Format |
|---|---|---|
| fast_information_descriptor(){ | | |
|     descriptor_tag | 8 | uimsbf |
|     descriptor_length | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP _version | 5 | uimsbf |
|         reserved | 3 | ?11 |
|         num_service | 8 | uimsbf |
|         for(j=0;j< num_service ;j++){ | | |
|             service_id | 16 | uimsbf |
|             service_category | 6 | uimsbf |
|             service_hidden_flag | 1 | bslbf |
|             SP_indicator | 1 | bslbf |
|         } | | |
|     } | | |
| } | | |

[Fig. 72]

| Syntax | No. of bits | Format |
|---|---|---|
| delivery_system_descriptor (){ | | |
|     descriptor_tag | 8 | uimsbf |
|     descriptor_length | 8 | uimsbf |
|     delivery_system_id | 16 | uimsbf |
|     num_broadcast | 8 | uimsbf |
|     for(i=0;i< num_broadcast;i ++){ | | |
|         broadcast_id | 16 | uimsbf |
|         base_PLP_id | 8 | uimsbf |
|         base_PLP _version | 5 | uimsbf |
|         reserved | 3 | '111' |
|         delivery_system_paramters_length | 8 | uimsbf |
|         delivery_system_parameters () | | |
|     } | | |
| } | | |

[Fig. 73]
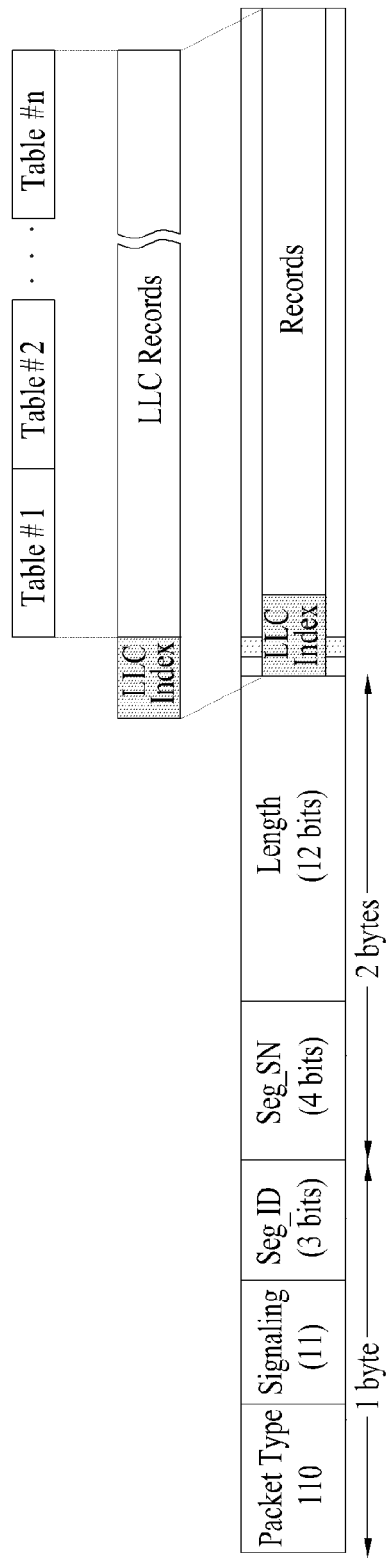

[Fig. 74]
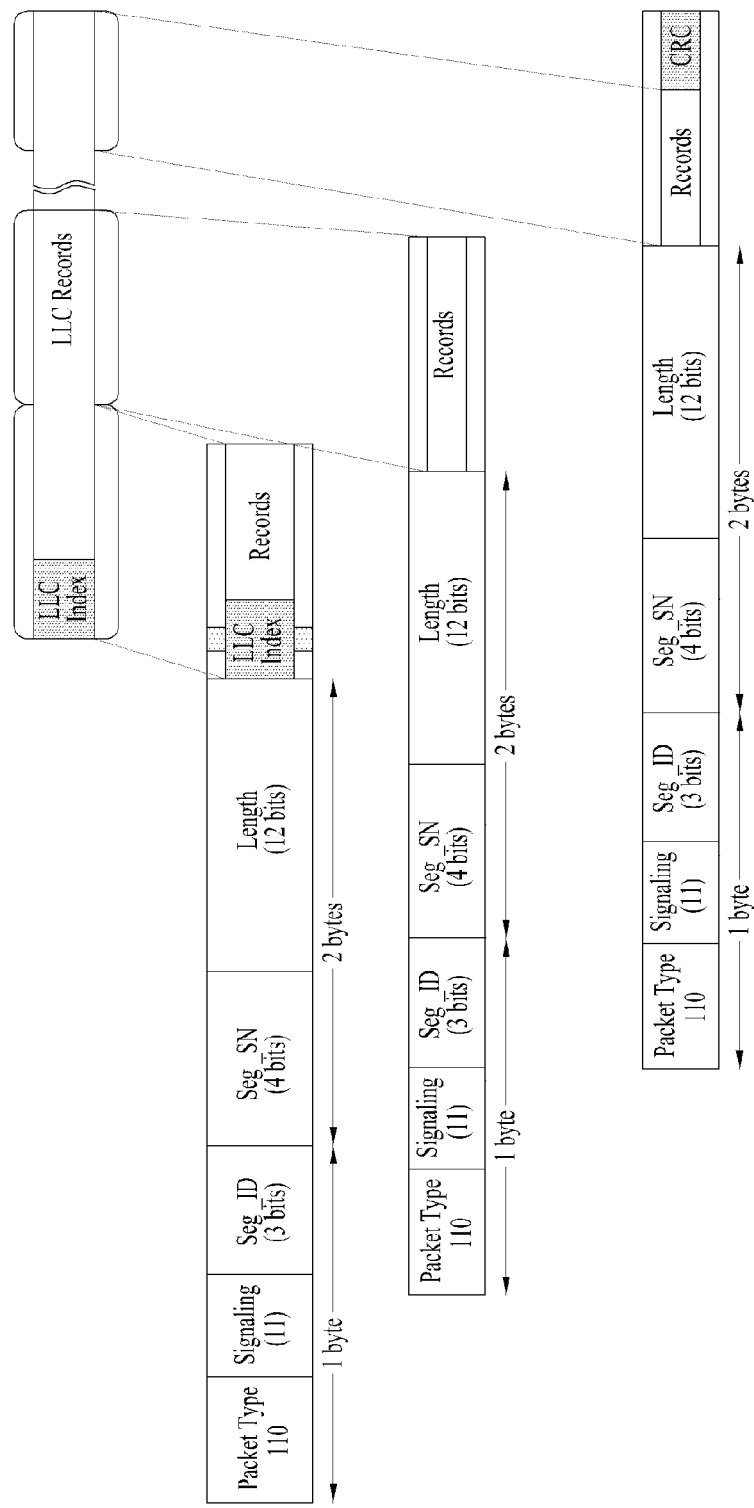

[Fig. 75]
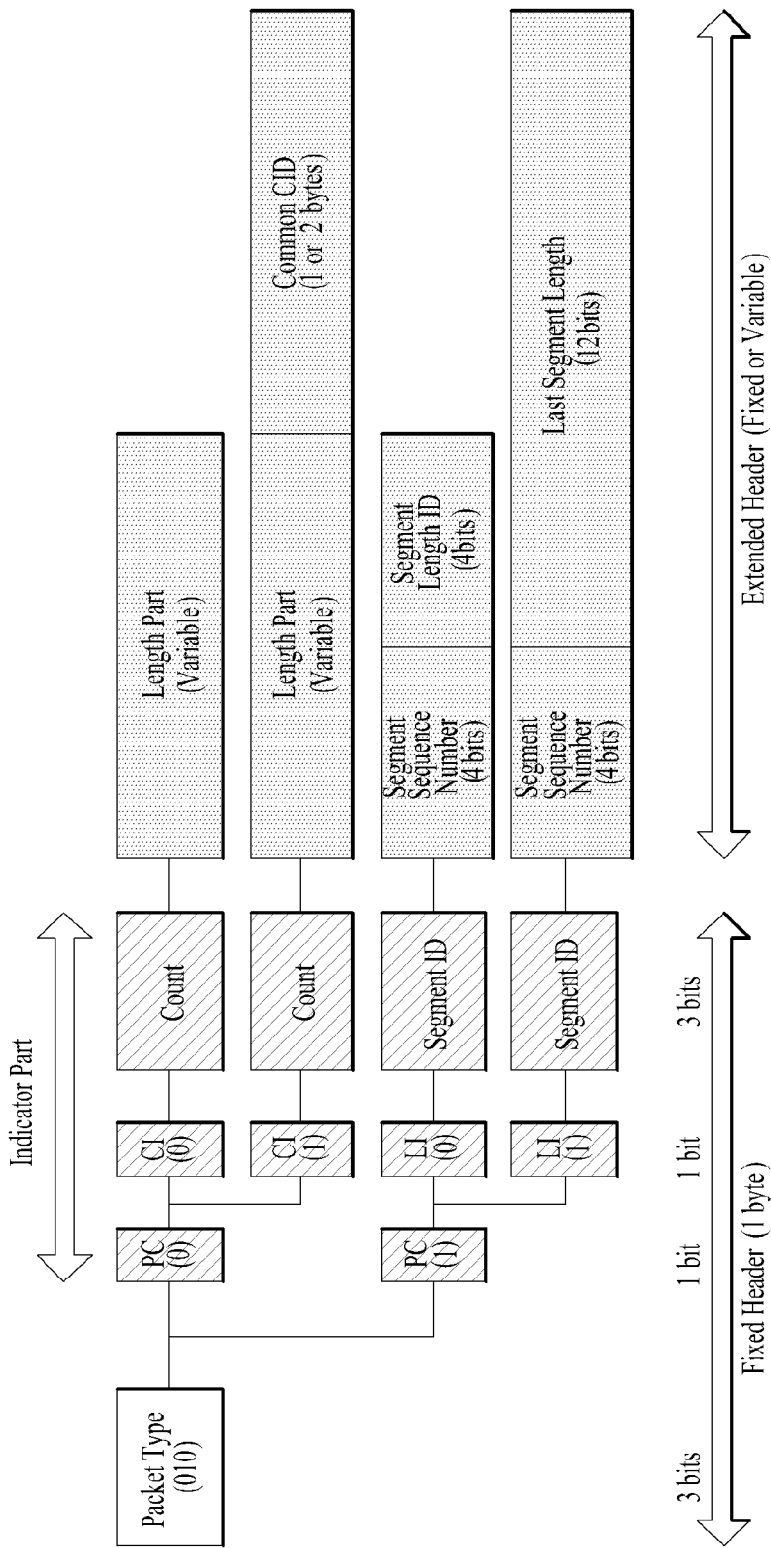

[Fig. 76]
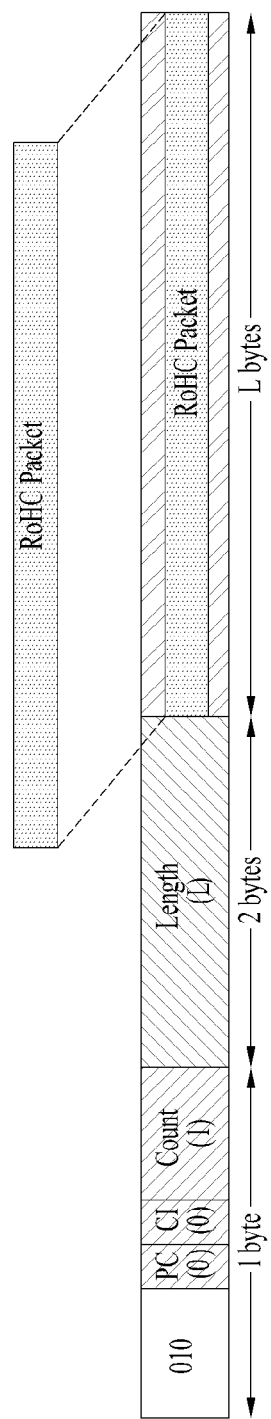

[Fig. 77]
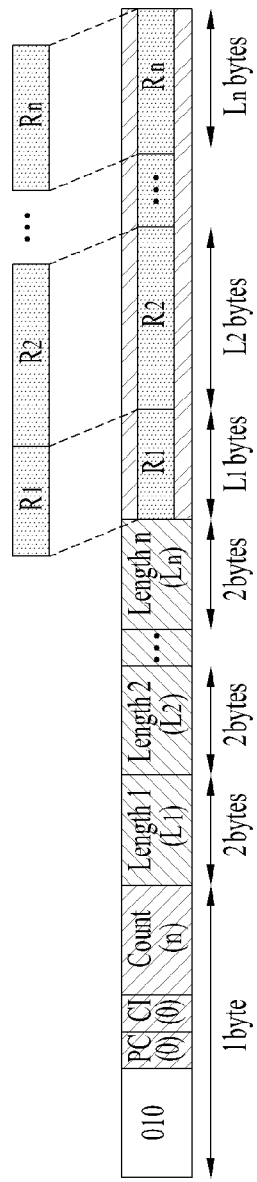

[Fig. 78]
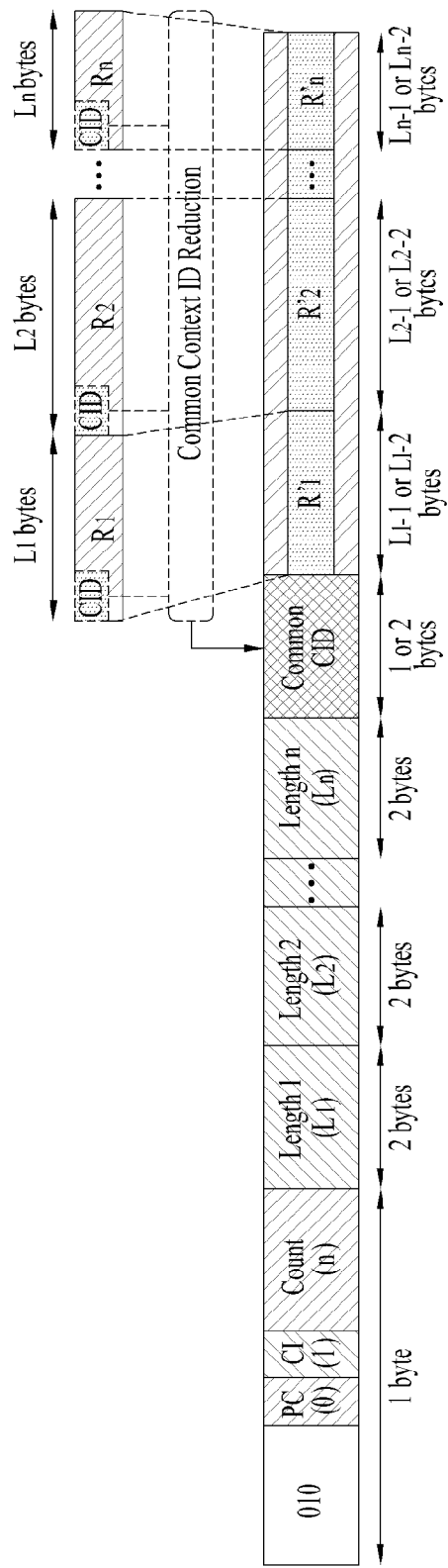

[Fig. 79]
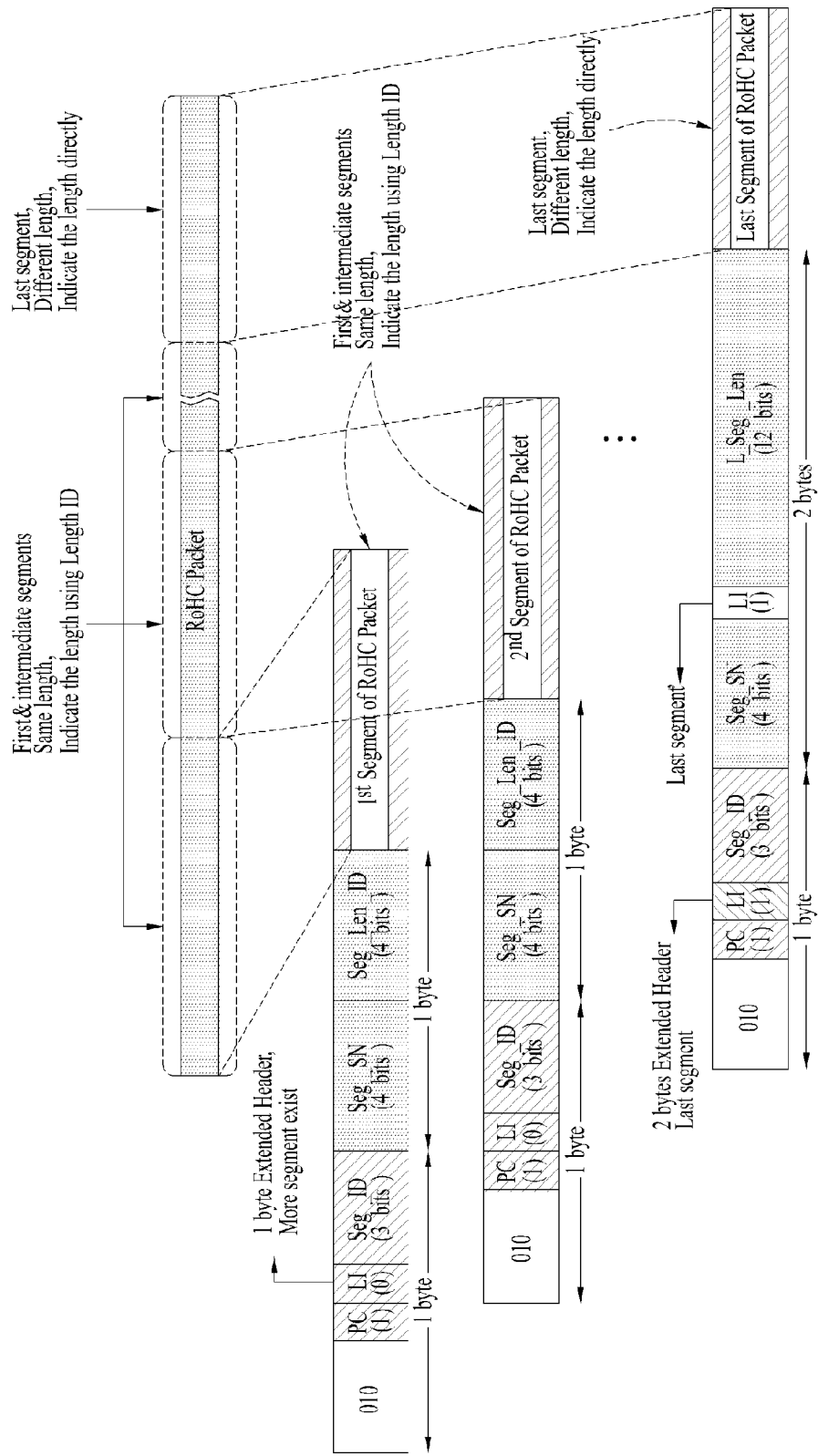

[Fig. 80]
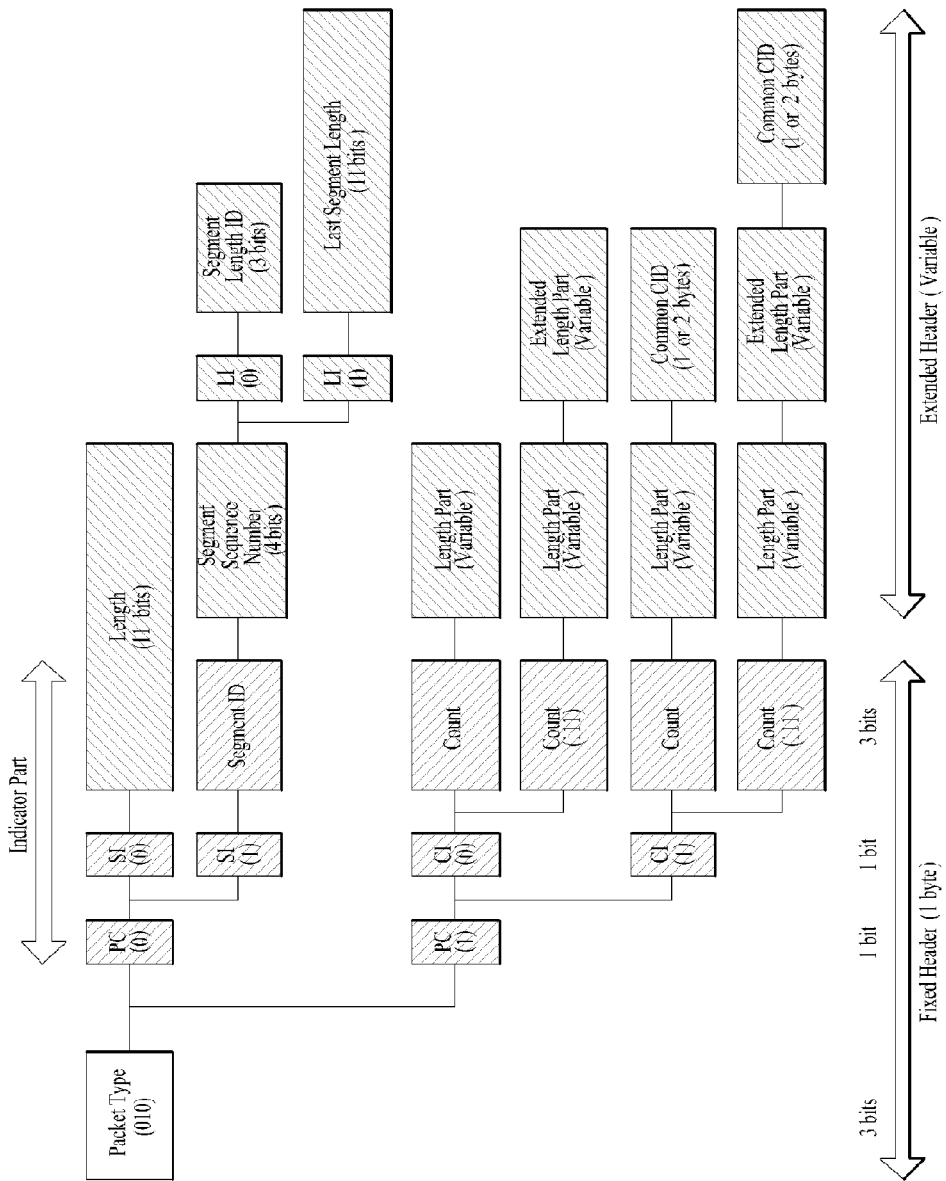

[Fig. 81]
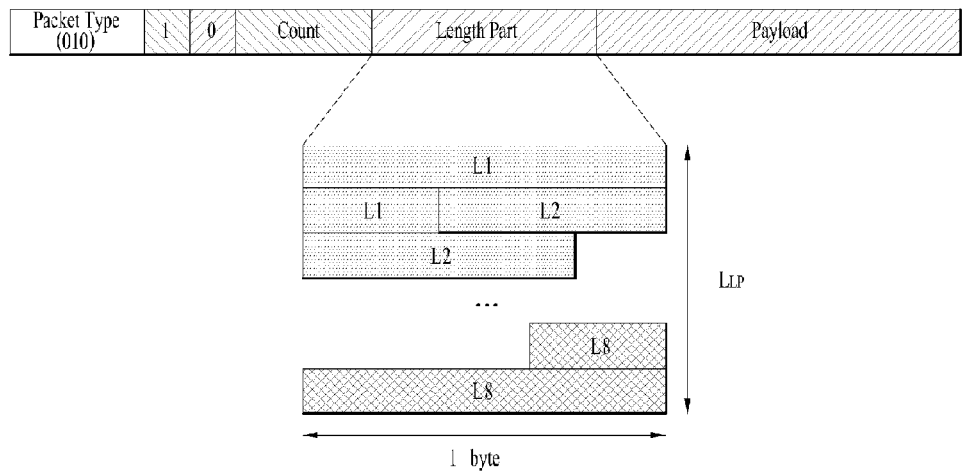
[Fig. 82]
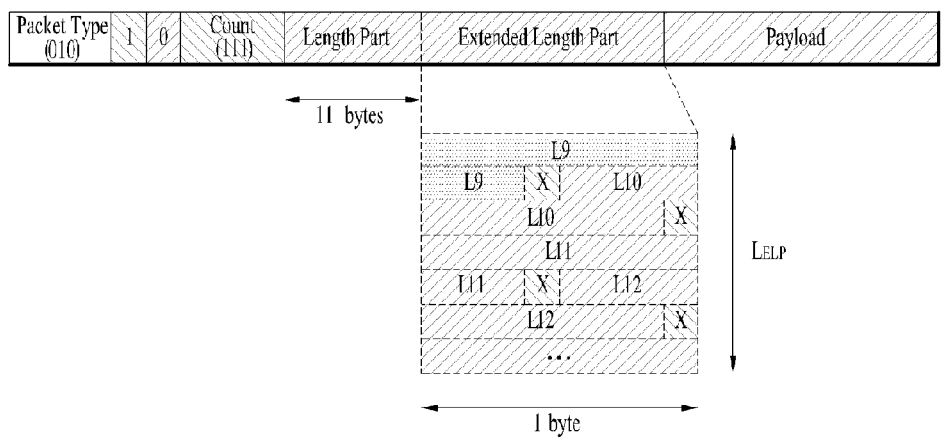
[Fig. 83]
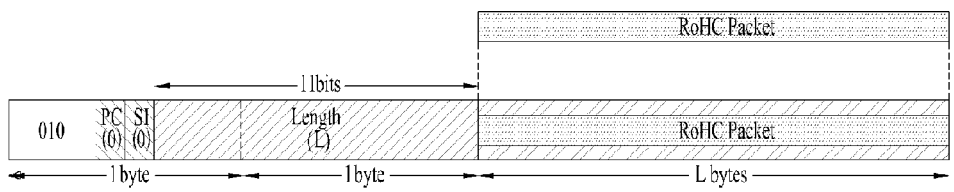

[Fig. 84]
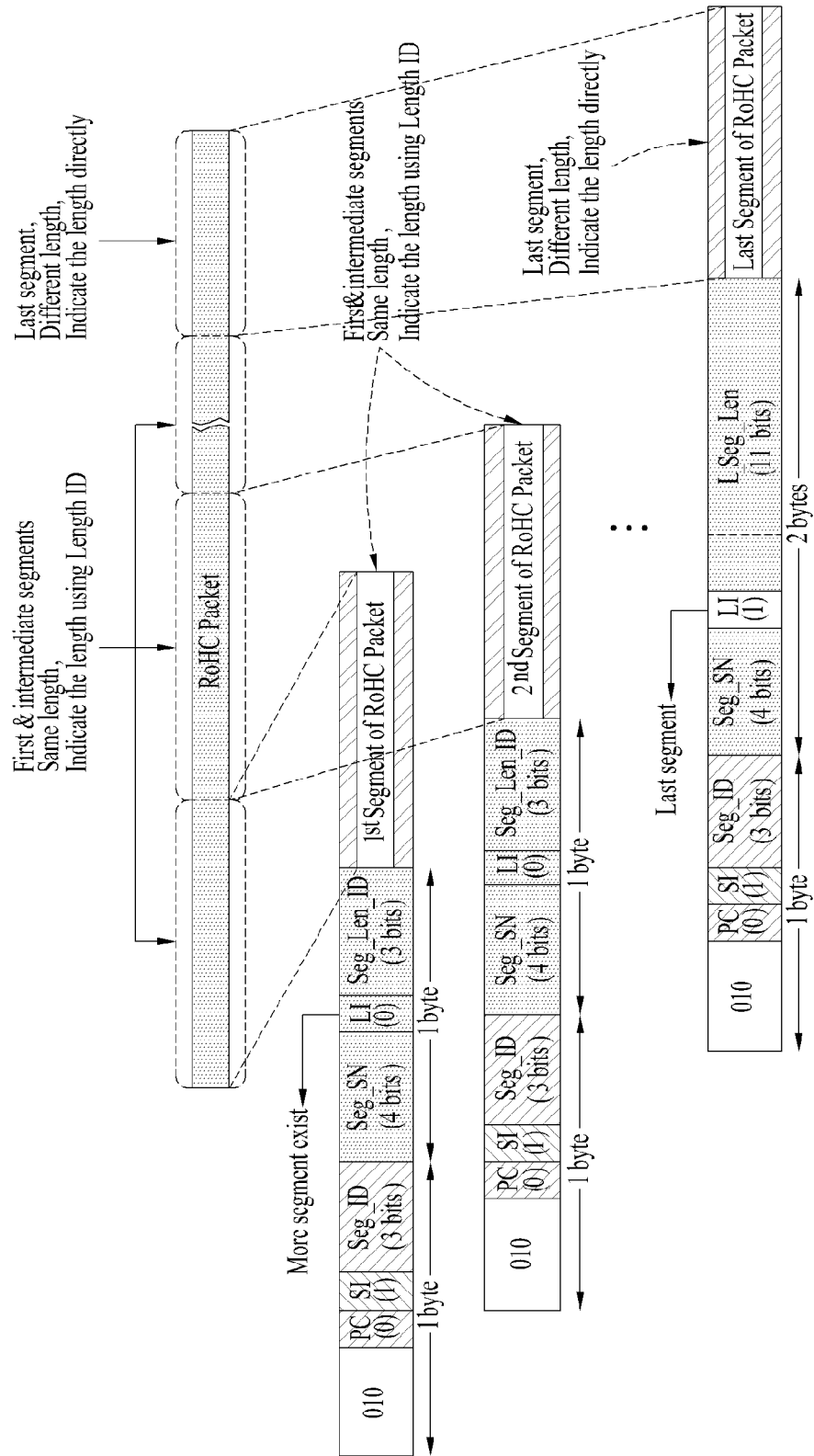

[Fig. 85]
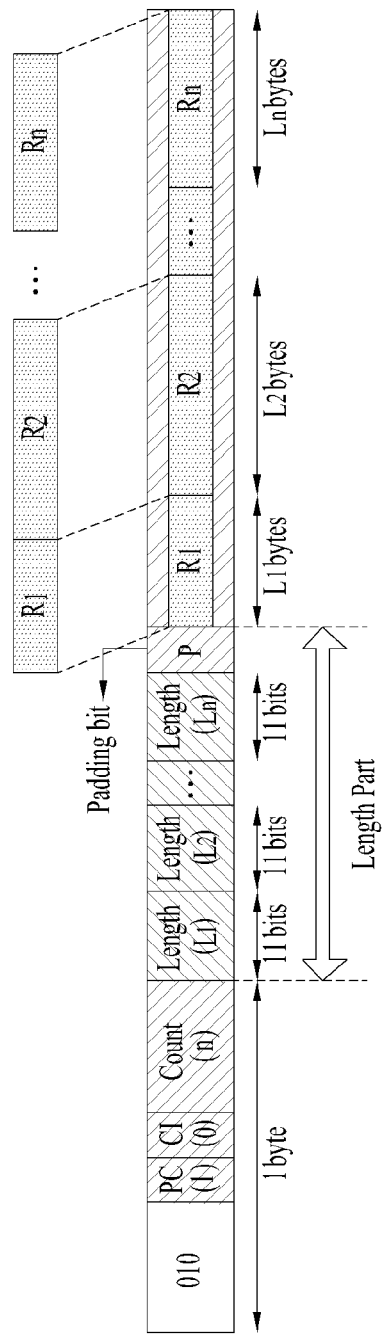

[Fig. 86]
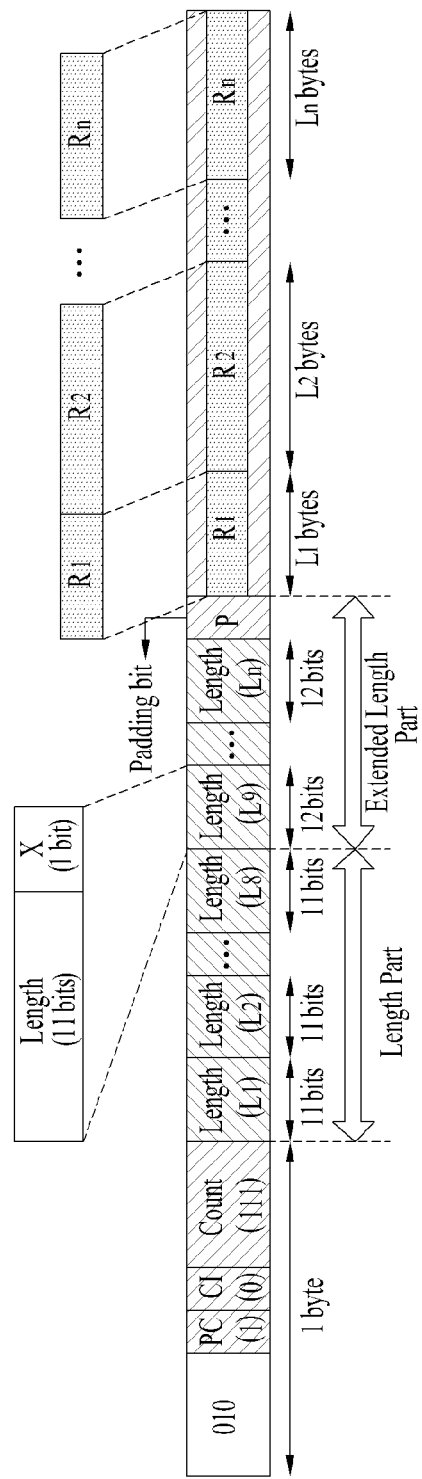

[Fig. 87]
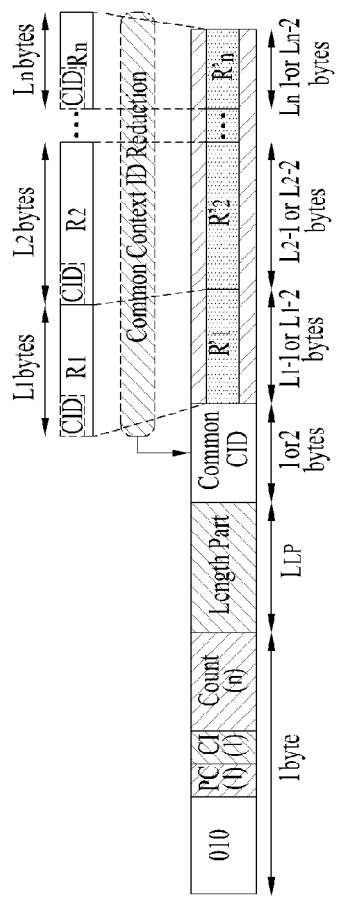
[Fig. 88]
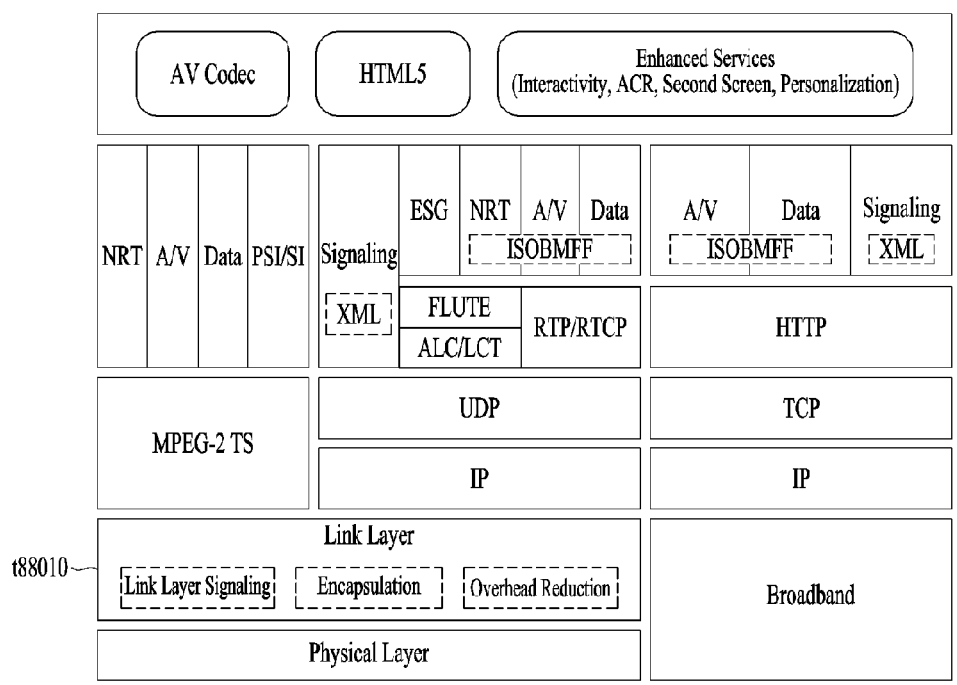

[Fig. 89]
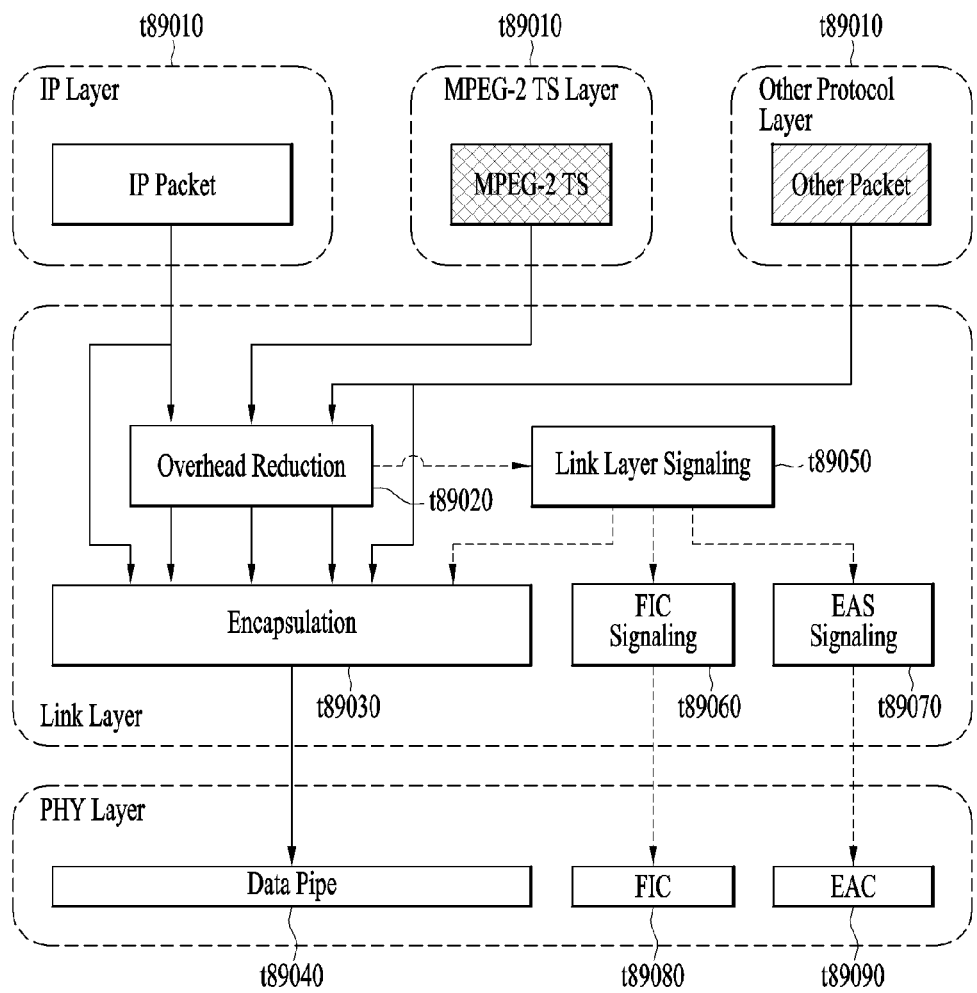

[Fig. 90]
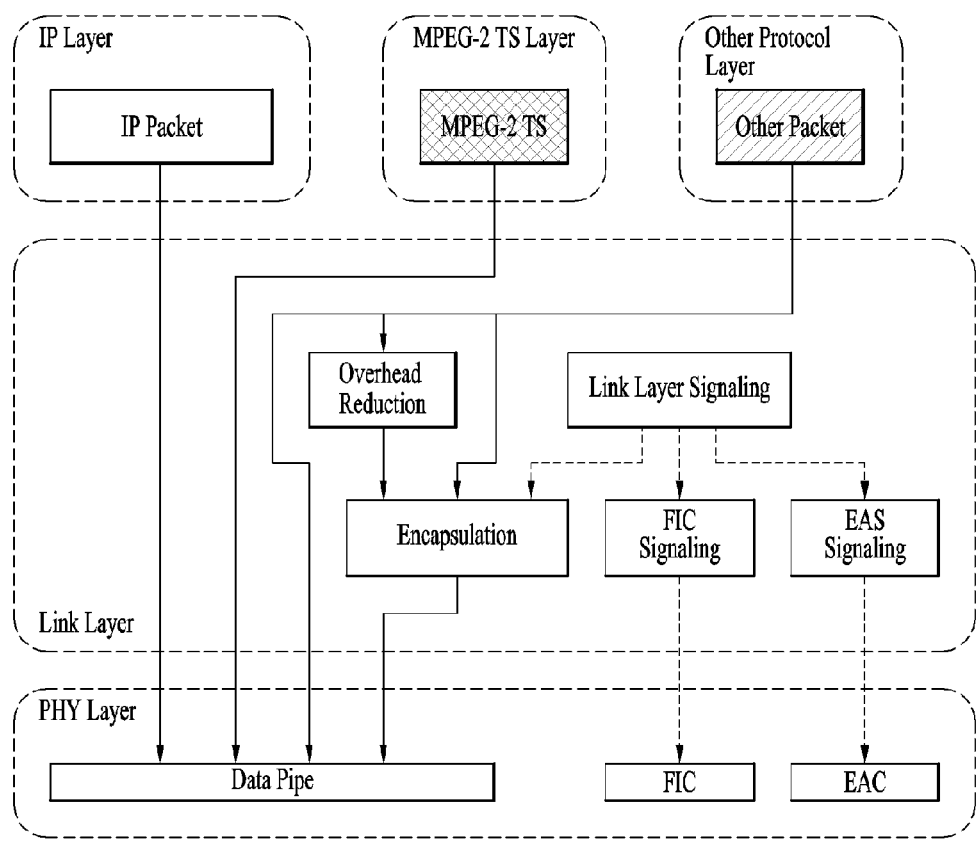

[Fig. 91]
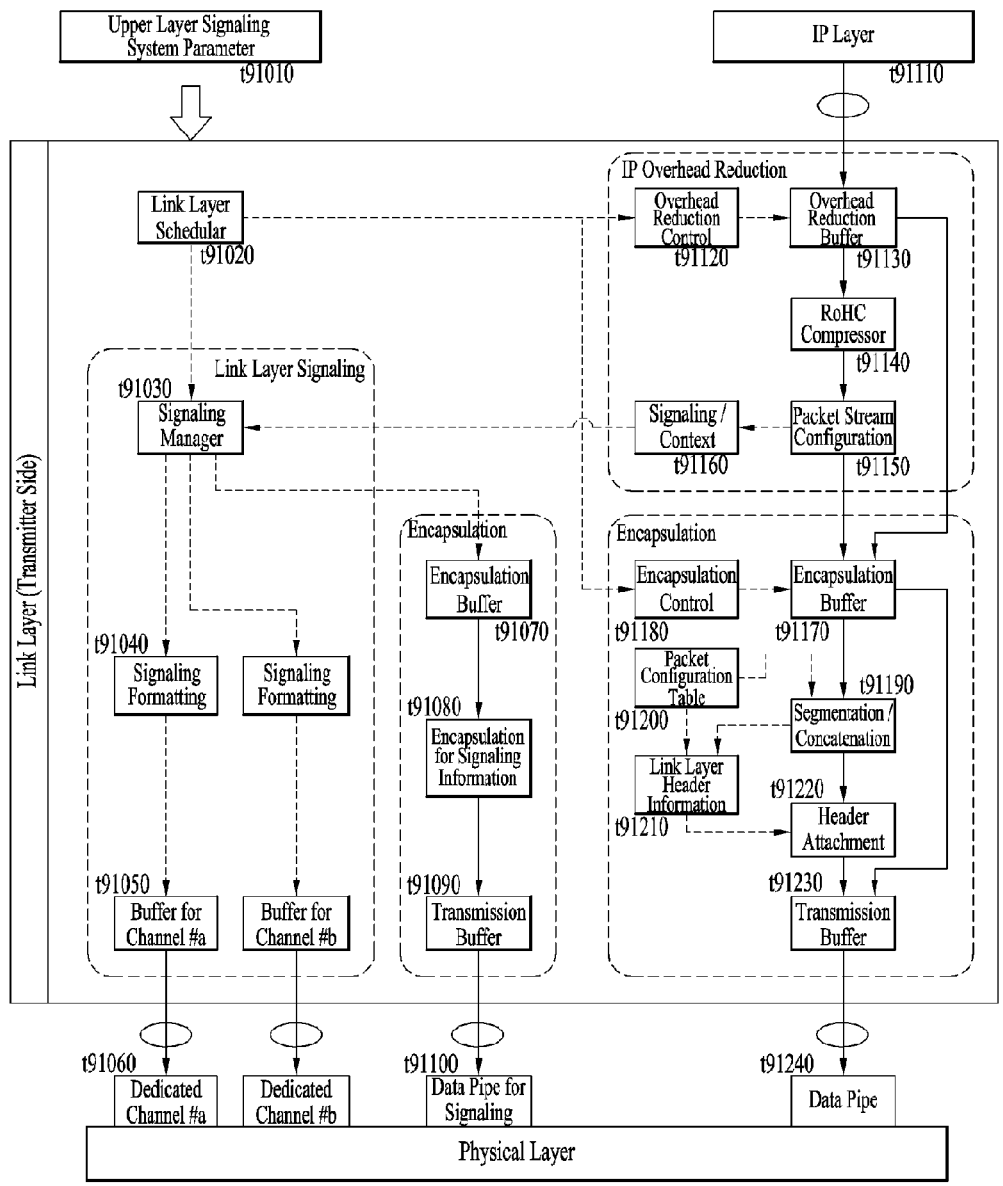

[Fig. 92]
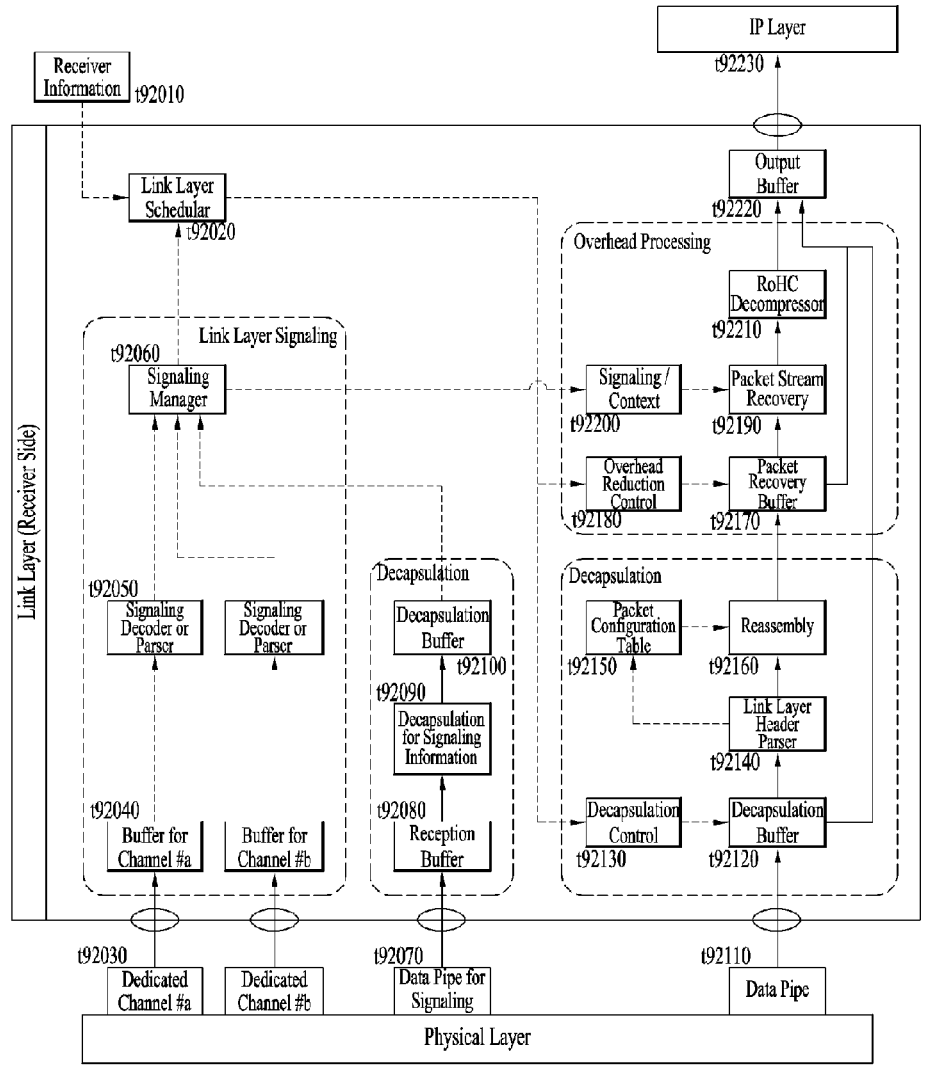
[Fig. 93]
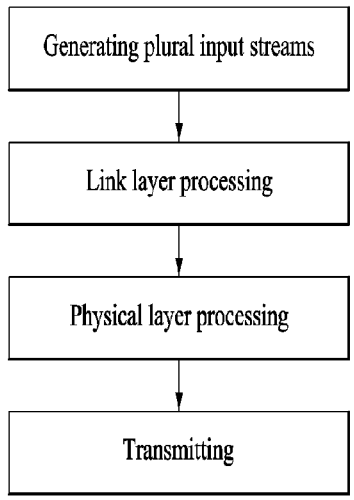

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS REFERENCE TO RELATED APPLICATIONS

This application is the National Phase of PCT International Application No. PCT/KR2015/000367, filed on Jan. 14, 2015, which claims priority under 35 U.S.C. 119(e) to U.S. Provisional Application No. 61/927,453, filed on Jan. 14, 2014, 61/926,958 filed on Jan. 14, 2014 and 61/935,863 filed on Feb. 5, 2014, all of which are hereby expressly incorporated by reference into the present application.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

DISCLOSURE OF INVENTION

Technical Problem

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Solution to Problem

To achieve the object and other advantages and in accordance with the purpose of the invention, as embodied and broadly described herein, the present invention provides a method of transmitting broadcast signals. The method of transmitting broadcast signals includes generating plural input streams, wherein each of the plural input streams include plural input packets; link layer processing the input packets in the plural input streams to generate link layer packets; physical layer processing the link layer packets in physical layer, to generate the broadcast signals; and transmitting the generated broadcast signals.

Preferably, the link layer processing includes link layer processing one of the plural input streams based on transparent mode, wherein the link layer processing one of the plural input streams based on transparent mode includes: delivering the one of the plural input streams to the physical layer without encapsulating.

Preferably, the link layer processing includes link layer processing one of the plural input streams based on normal mode, wherein the link layer processing one of the plural input streams based on normal mode includes: encapsulating the input packets in the one of the plural input streams to generate the link layer packets, and delivering the generated link layer packets to the physical layer.

Preferably, the link layer processing one of the plural input streams based on normal mode further includes: overhead reduction processing the input packets in the one of the plural input streams before encapsulating, by compressing headers of the input packets.

Preferably, the link layer processing one of the plural input streams based on normal mode further includes: extracting a first signaling information from overhead reduction processed input packets, wherein the first signaling information is a signaling information to be transmitted in a dedicated transmission channel; and delivering the extracted first signaling information to the physical layer.

Preferably, the link layer processing one of the plural input streams based on normal mode further includes: extracting a second signaling information, wherein the second signaling information is for signaling data in the input packets; encapsulating the extracted second signaling information to generate link layer packets; and delivering the generated link layer packets to the physical layer.

Preferably, the link layer packet includes a link layer payload generated by using a segment of one of the input packets, or by using concatenated input packets.

Preferably, the physical layer processing includes: physical layer processing plural PLPs (Physical Layer Pipes) including data of the link layer packets, to generate the broadcast signals.

Preferably, the physical layer processing includes: physical layer processing the first signaling information into the dedicated transmission channel, to generate the broadcast signals.

Preferably, the input packets are one of TS (Transport Stream) packet, IP (Internet Protocol) packet or GS (Generic Stream) packet.

In other aspect, the present invention provides an apparatus for transmitting broadcast signals. The apparatus for transmitting broadcast signals includes a first module that generates plural input streams, wherein each of the plural input streams include plural input packets; a second module that link layer processes the input packets in the plural input streams to generate link layer packets; a third module that physical layer processes the link layer packets, to generate the broadcast signals; and a fourth module that transmits the generated broadcast signals.

Preferably, the second module link layer processes one of the plural input streams based on transparent mode, wherein the second module delivers the one of the plural input streams to the third module without encapsulating.

Preferably, the second module link layer processes one of the plural input streams based on normal mode, wherein the second module encapsulates the input packets in the one of the plural input streams to generate the link layer packets, and wherein the second module delivers the generated link layer packets to the third module.

Preferably, the second module overhead reduction processes the input packets in the one of the plural input streams before encapsulating, by compressing headers of the input packets.

Preferably, the second module extracts a first signaling information from overhead reduction processed input packets, wherein the first signaling information is a signaling information to be transmitted in a dedicated transmission channel; and wherein the second module delivers the extracted first signaling information to the third module.

Preferably, the second module extracts a second signaling information, wherein the second signaling information is for signaling data in the input packets; wherein the second module encapsulates the extracted second signaling information to generate link layer packets; and wherein the second module delivers the generated link layer packets to the third module.

Preferably, the link layer packet includes a link layer payload generated by using a segment of one of the input packets, or by using concatenated input packets.

Preferably, the third module physical layer processes plural PLPs (Physical Layer Pipes) including data of the link layer packets, to generate the broadcast signals.

Preferably, the third module physical layer processes the first signaling information into the dedicated transmission channel, to generate the broadcast signals.

Preferably, the input packets are one of TS (Transport Stream) packet, IP (Internet Protocol) packet or GS (Generic Stream) packet.

Advantageous Effects of Invention

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFDM generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates the basic operation of a twisted row-column block interleaver according to an embodiment of the present invention.

FIG. 27 illustrates an operation of a twisted row-column block interleaver according to another embodiment of the present invention.

FIG. 28 illustrates a diagonal-wise reading pattern of a twisted row-column block interleaver according to an embodiment of the present invention.

FIG. 29 illustrates interlaved XFECBLOCKs from each interleaving array according to an embodiment of the present invention.

FIG. 30 is a conceptual diagram illustrating a protocol stack for the next generation broadcast system based on hybrid according to an embodiment of the present invention.

FIG. 31 is a conceptual diagram illustrating an interface of a link layer according to an embodiment of the present invention.

FIG. 32 is a conceptual diagram illustrating a packet structure of a link layer according to an embodiment of the present invention.

FIG. 33 shows packet types dependent upon the packet type element values according to an embodiment of the present invention.

FIG. 34 is a conceptual diagram illustrating a header structure of a link layer packet when an IP packet is transmitted to the link layer according to an embodiment of the present invention.

FIG. 35 is a conceptual diagram illustrating the meaning and header structures according to C/S field values.

FIG. 36 is a conceptual diagram illustrating the meaning according to the count field values.

FIG. 37 is a conceptual diagram illustrating the meaning and segment lengths according to values of Seg_Len_ID field.

FIG. 38 is a conceptual diagram illustrating an equation for encapsulating a normal packet and an equation for calculating a link layer packet length.

FIG. 39 is a conceptual diagram illustrating a process for encapsulating a concatenated packet and an equation for calculating a link layer packet length.

FIG. 40 is a conceptual diagram illustrating a process for calculating the length of a concatenated packet including an IPv4 packet and an equation for calculating an offset value at which a length field of the IP packet is located.

FIG. 41 is a conceptual diagram illustrating a process for calculating the length of a concatenated packet including an IPv6 packet and an equation for calculating an offset value at which a length field of the IP packet is located.

FIG. 42 is a conceptual diagram illustrating an encapsulation process of a segmented packet according to an embodiment of the present invention.

FIG. 43 is a conceptual diagram illustrating a segmentation process of an IP packet and header information of a link layer packet according to an embodiment of the present invention.

FIG. 44 is a conceptual diagram illustrating a segmentation process of an IP packet including a cyclic redundancy check (CRC) according to an embodiment of the present invention.

FIG. 45 is a conceptual diagram illustrating a header structure of a link layer packet when MPEG-2 TS (Transport Stream) is input to a link layer according to an embodiment of the present invention.

FIG. 46 shows the number of MPEG-2 TS packets contained in a payload of the link layer packet according to values of a count field.

FIG. 47 is a conceptual diagram illustrating a header of the MPEG-2 TS packet according to an embodiment of the present invention.

FIG. 48 is a conceptual diagram illustrating a process for allowing a transceiver to change a usage of a transport error indicator field according to an embodiment of the present invention.

FIG. 49 is a conceptual diagram illustrating an encapsulation process of the MPEG-2 TS packet according to an embodiment of the present invention.

FIG. 50 is a conceptual diagram illustrating an encapsulation process of the MPEG-2 TS packet having the same PID according to an embodiment of the present invention.

FIG. 51 is a conceptual diagram illustrating an equation for calculating the length of a link layer packet through a Common PID reduction process and a Common PID reduction process.

FIG. 52 is a conceptual diagram illustrating the number of concatenated MPEG-2 TS packets and the length of a link layer packet according to count field values when Common PID reduction is used.

FIG. 53 is a conceptual diagram illustrating a process for encapsulating the MPEG-2 TS packet including a null packet according to an embodiment of the present invention.

FIG. 54 is a conceptual diagram illustrating a step for processing an indicator configured to count a removed null packet and an equation for calculating the length of a link layer packet in the processing step.

FIG. 55 is a conceptual diagram illustrating a process for encapsulating the MPEG-2 TS packet including a null packet according to another embodiment of the present invention.

FIG. 56 is a conceptual diagram illustrating a process for encapsulating the MPEG-2 TS packets including the same packet identifiers (PIDs) in a stream including a null packet according to an embodiment of the present invention.

FIG. 57 is a conceptual diagram illustrating an equation for calculating the length of a link layer packet when the MPEG-2 TS packets having the same PIDs are encapsulated in a stream including a null packet according to an embodiment of the present invention.

FIG. 58 is a conceptual diagram illustrating a link layer packet structure for transmitting signaling information according to an embodiment of the present invention.

FIG. 59 is a conceptual diagram illustrating a link layer packet structure for transmitting the framed packet according to an embodiment of the present invention.

FIG. 60 shows a syntax of the framed packet according to an embodiment of the present invention.

FIG. 61 is a block diagram illustrating a receiver of the next generation broadcast system according to an embodiment of the present invention.

FIG. 62 is a conceptual diagram illustrating a general format of a section table according to an embodiment of the present invention.

FIG. 63 is a conceptual diagram illustrating a link layer packet for transmitting signaling information according to an embodiment of the present invention.

FIG. 64 shows the meaning of values denoted by the signaling type field, and contents of a fixed header and an extended header located behind the signaling type field.

FIG. 65 shows the number of descriptors contained in payload of the link layer packet according to a concatenation count field value according to an embodiment of the present invention.

FIG. 66 is a conceptual diagram illustrating a process for encapsulating the section table into payload when signaling information input to the payload of the link layer packet is a section table.

FIG. 67 is a conceptual diagram illustrating a syntax of a network information table (NIT) according to an embodiment of the present invention.

FIG. 68 is a conceptual diagram illustrating a syntax of a delivery system descriptor contained in a network information table (NIT) according to an embodiment of the present invention.

FIG. 69 is a conceptual diagram illustrating a syntax of a fast information table (FTT) according to an embodiment of the present invention.

FIG. 70 is a conceptual diagram illustrating a process for encapsulating a descriptor into payload when signaling information input to payload of the link layer packet is a descriptor.

FIG. 71 is a conceptual diagram illustrating a syntax of a fast information descriptor according to an embodiment of the present invention.

FIG. 72 is a conceptual diagram illustrating a delivery system descriptor according to an embodiment of the present invention.

FIG. 73 is a conceptual diagram illustrating a process for encapsulating one GSE-LLC datum into payload of one link layer packet when signaling information input to payload of the link layer packet has a GSE-LLC format used in DVB-GSE.

FIG. 74 is a conceptual diagram illustrating a process for encapsulating one GSE-LLC datum into payload of several link layer packets when signaling information input to payload of the link layer packet has a GSE-LLC format used in a DVB-GSE standard.

FIG. 75 illustrates a header of a link layer packet for Robust Header Compression (RoHC) transmission according to the present invention.

FIG. 76 illustrates Embodiment #1 of a method of transmitting an RoHC packet using a link layer packet, according to the present invention.

FIG. 77 illustrates Embodiment #2 of a method of transmitting an RoHC packet using a link layer packet, according to the present invention.

FIG. 78 illustrates Embodiment #3 of a method of transmitting an RoHC packet using a link layer packet, according to the present invention.

FIG. 79 illustrates Embodiment #4 of a method of transmitting an RoHC packet using a link layer packet, according to the present invention.

FIG. 80 illustrates a header of a link layer packet for RoHC transmission according to an embodiment of the present invention when an MTU is 1,500.

FIG. 81 illustrates Embodiment #1 of a method of transmitting an RoHC packet using a link layer packet when an MTU is 1,500 according to the present invention.

FIG. 82 illustrates Embodiment #2 of a method of transmitting an RoHC packet using a link layer packet when an MTU is 1,500 according to the present invention.

FIG. 83 illustrates Embodiment #3 of a method of transmitting an RoHC packet using a link layer packet when an MTU is 1,500 according to the present invention.

FIG. 84 illustrates Embodiment #4 of a method of transmitting an RoHC packet using a link layer packet when an MTU is 1,500 according to the present invention.

FIG. 85 illustrates Embodiment #5 of a method of transmitting an RoHC packet using a link layer packet when an MTU is 1,500, according to the present invention.

FIG. 86 illustrates Embodiment #6 of a method of transmitting an RoHC packet using a link layer packet when an MTU is 1,500, according to the present invention.

FIG. 87 illustrates Embodiment #7 of a method of transmitting an RoHC packet using a link layer packet when an MTU is 1,500, according to the present invention.

FIG. 88 illustrates a protocol stack for a hybrid-based next generation broadcast system according to another embodiment of the present invention.

FIG. 89 illustrates an operation in a normal mode corresponding to one of operation modes of a link layer according to an embodiment of the present invention.

FIG. 90 illustrates an operation in a transparent mode corresponding to one of operation modes of a link layer according to an embodiment of the present invention.

FIG. 91 illustrates a configuration of a link layer at a transmitter according to an embodiment of the present invention (normal mode).

FIG. 92 illustrates a configuration of a link layer at a receiver according to an embodiment of the present invention (normal mode).

FIG. 93 illustrates a method of transmitting broadcast signals according to an embodiment of the present invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles), each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudorandom value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFTsize.

reserved for future use: not defined by the present document but may be defined in future superframe: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams.

Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_l$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output ($g_{1,i}$ and $g_{2,i}$) is transmitted by the same carrier k and OFDM symbol l of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

MathFigure 1

$$C_{ldpc}=[I_{ldpc}P_{ldpc}]=[i_0,i_1,\ldots,i_{K_{ldpc}-1},p_0,p_1,\ldots p_{N_{ldpc}-K_{ldpc}-1}] \qquad [\text{Math.1}]$$

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ $(=N_{bch})$ | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

|  | Current PHY_PRO-FILE = '000' (base) | Current PHY_PRO-FILE = '001' (handheld) | Current PHY_PRO-FILE = '010' (advanced) | Current PHY_PRO-FILE = '111' (FEF) |
| --- | --- | --- | --- | --- |
| FRU_CON-FIGURE = 000 | Only base profile present | Only handheld profile present | Only advanced profile present | Only FEF present |
| FRU_CON-FIGURE = 1XX | Handheld profile present | Base profile present | Base profile present | Base profile present |
| FRU_CON-FIGURE = X1X | Advanced profile present | Advanced profile present | Handheld profile present | Handheld profile present |
| FRU_CON-FIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
| --- | --- |
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all trans-missions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I=1$). The allowed $P_I$ values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |

TABLE 24-continued

| Value | ISSY mode |
|---|---|
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use. The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

|  | DP_START field size | |
| --- | --- | --- |
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS 1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

MathFigure 2

$$D_{DP1}+D_{DP2} \leq D_{DP} \quad [\text{Math.2}]$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, . . . , DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$, bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

MathFigure 3

$$B_{ldpc} = [I_{ldpc} P_{ldpc}][i_0, i_1, \ldots, i_{K_{ldpc}-1}, p_0, p_1, \ldots, p_{N_{ldpc}-K_{ldpc}-1}] \quad \text{[Math.3]}$$

The parameters for long FECBLOCK and short FECBLOCK are given in the above table 28 and 29, respectively.

The detailed procedure to calculate $N_{ldpc}$-$K_{ldpc}$ parity bits for long FECBLOCK, is as follows:

1) Initialize the parity bits,

MathFigure 4

$$p_0 = p_1 = p_2 = \ldots = p_{N_{ldpc}-K_{ldpc}-1} = 0 \quad \text{[Math.4]}$$

2) Accumulate the first information bit $-i_0$, at parity bit addresses specified in the first row of an addresses of parity check matrix. The details of addresses of parity check matrix will be described later. For example, for rate 13/15:

MathFigure 5

$$p_{983} = p_{983} \oplus i_0$$

$$p_{2815} = p_{2815} \oplus i_0$$

$$p_{4837} = p_{4837} \oplus i_0$$

$$p_{4989} = p_{4989} \oplus i_0$$

$$p_{6138} = p_{6138} \oplus i_0$$

$$p_{6458} = p_{6458} \oplus i_0$$

$$p_{6921} = p_{6921} \oplus i_1$$

$$p_{6974} = p_{6974} \oplus i_0$$

$$p_{7572} = p_{7572} \oplus i_0$$

$$p_{8260} = p_{8260} \oplus i_0$$

$$p_{8496} = p_{8406} \oplus i_0 \quad \text{[Math.5]}$$

3) For the next 359 information bits, $i_s$, s=1, 2, . . . , 359 accumulate $i_s$ at parity bit addresses using following Math figure.

MathFigure 6

$$\{x + (s \bmod 360) \times Q_{ldpc}\} \bmod(N_{ldpc}-K_{ldpc}) \quad \text{[Math.6]}$$

where x denotes the address of the parity bit accumulator corresponding to the first bit $i_0$, and $Q_{ldpc}$ is a code rate dependent constant specified in the addresses of parity check matrix. Continuing with the example, $Q_{ldpc}$=24 for rate 13/15, so for information bit $i_1$, the following operations are performed:

MathFigure 7

$$p_{1007} = p_{1007} \oplus i_1$$

$$p_{2819} = p_{2839} \oplus i_1$$

$$p_{4861} = p_{4861} \oplus i_1$$

$$p_{5013} = p_{5013} \oplus i_1$$

$$p_{6162} = p_{6162} \oplus i_1$$

$$p_{6482} = p_{6482} \oplus i_1$$

$$p_{6945} = p_{6945} \oplus i_1$$

$$p_{6998} = p_{6998} \oplus i_1$$

$$p_{7596} = p_{7596} \oplus i_1$$

$p_{8284} = p_{8284} \oplus i_1$ $p_{8520} = p_{8520} \oplus i_1$ [Math.7]

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, . . . , 719 are obtained using the Math FIG. 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

MathFigure 8

$p_i = p_i \oplus p_{i-1}, i=1,2, \ldots, N_{ldpc} - K_{ldpc} - 1$ [Math.8]

where final content of $p_i$, i=0, 1, . . . $N_{ldpc} - K_{ldpc} - 1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}$=64800/$\blacksquare_{mod}$ or 16200/$\blacksquare_{mod}$ according to the FECBLOCK length. The QCB interleaving pattern is unique to each combination of modulation type and LDPC code rate.

After QCB interleaving, inner-group interleaving is performed according to modulation type and order ($\blacksquare_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word $(c_{0,1}, c_{1,1}, \ldots, c_{\blacksquare_{mod}-1,1})$ of the bit interleaving output is demultiplexed into $(d_{1,0,m}, d_{1,1,m} \ldots, d_{1,\blacksquare_{mod}-1,m})$ and $(d_{2,0,m}, d_{2,1,m} \ldots, d_{2,\blacksquare_{mod}-1,m})$ as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word $(c_{0,1}, c_{1,1}, \ldots, c_{9,1})$ of the Bit Interleaver output is demultiplexed into $(d_{1,0,m}, d_{1,1,m} \ldots, d_{1,3,m})$ and $(d_{2,0,m}, d_{2,1,m} \ldots, d_{2,5,m})$, as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFEC-BLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1},$$
$$\ldots, d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & theoutputofSSD \ldots encoding \\ g_{n,s,r,q}, & theoutputofMIMOencoding \end{cases}$$

In addition, assume that output XFECBLOCKs from the time interleaver are defined as $$(h_{n,s,0}, h_{n,s,1}, \ldots, h_{n,s,i}, \ldots, h_{n,s,N_{xBLOCK\_TI}(n,s) \times N_{cells}-1}),$$

where $h_{n,s,i}$ is the ith output cell (for i=0, ..., $N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$, while the number of columns $N_c$ is equal to the number $N_{xBLOCK\_TI}(n,s)$.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_r N_c$) as the TI memory cell position to be read sequentially, the reading process in such an interleaving array is performed by calculating the row index $R_{n,s,i}$, the column index $c_{n,s,i}$, and the associated twisting parameter $T_{n,s,i}$, as follows expression.

MathFigure 9 [Math.9]
GENERATE ($R_{n,s,i}, C_{n,s,i}$)=
{
$R_{n,s,i}$ = mod(i, $N_r$),
$T_{n,s,i}$ = mod($S_{shift} \times R_{n,s,i}$, $N_c$), $$C_{n,s,i} = \mod\left(T_{n,s,i} + \left\lfloor \frac{i}{N_r} \right\rfloor, N_c\right)$$

} where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

MathFigure 10

$$\text{for } \begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases}, \quad [\text{Math. 10}]$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N$, will be less than or equal to $N_{xBLOCK\_TI\_MAX}$.

Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N_{xBLOCK\_TI\_MAX}$ by inserting the virtual XFECBLOCKs into the TI memory and the reading process is accomplished as follow expression.

MathFigure 11 [Math.11]
```
p = 0;
for i = 0;i < N_cells N_xBLOCK_TI_MAX';i = i + 1
{GENERATE (R_{n,s,i},C_{n,s,i});
    V_i = N_r C_{n,s,j} + R_{n,s,j}
    if V_i < N_cells N_xBLOCK_TI(n,s)
    {
        Z_{n,s,p} = V_i; p = p + 1;
    }
}
```

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}=1$, $I_{JUMP}=1$, and $P_I=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $\lfloor N_{xBLOCK\_Group\_MAX}/N_{TI} \rfloor = N_{xBLOCK\_TI\_MAX}=6$ FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N_{xBLOCK\_TI\_MAX}=7$ and $S_{shift}=(7-1)/2=3$. Note that in the reading process shown as pseudocode above, if $V_i \geq N_{cells} N_{xBLOCK\_TI}(n,s)$, the value of $V_i$ is skipped and the next calculated value of $V_i$ is used.

Figure 29:
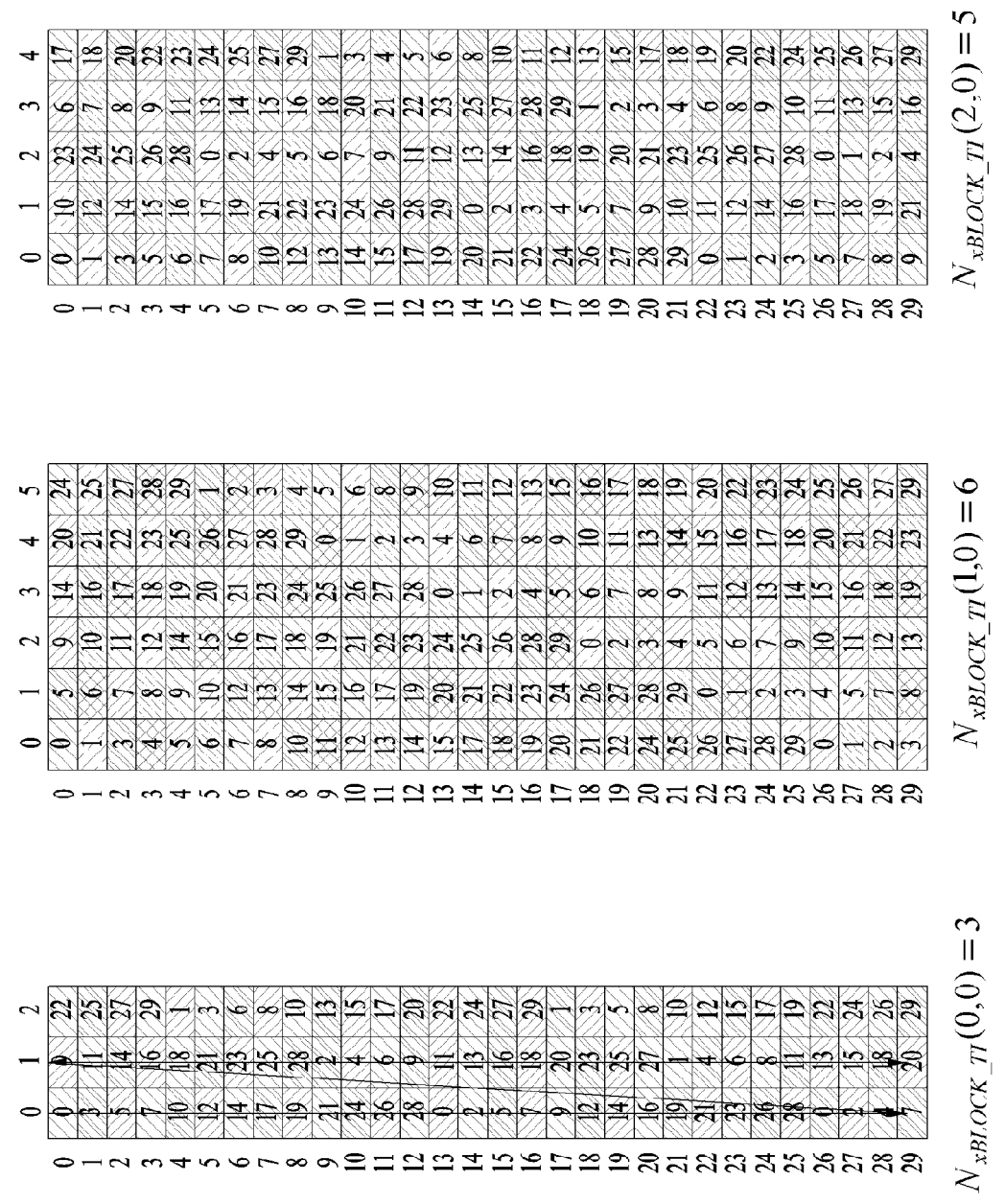

FIG. 29 illustrates interlaved XFECBLOCKs from each interleaving array according to an embodiment of the present invention.

FIG. 29 illustrates the interleaved XFECBLOCKs from each interleaving array with parameters of $N_{xBLOCK\_TI\_MAX}=7$ and $S_{shift}=3$.

FIG. 30 is a conceptual diagram illustrating a protocol stack for the next generation broadcast system based on hybrid according to an embodiment of the present invention.

The present invention proposes a data link (encapsulation) part shown in FIG. 30, and proposes a method for transmitting MPEG-2 TS (Transport Stream) and/or IP (Internet Protocol) packets received from an upper layer over a physical layer. In addition, the present invention provides a signaling transmission method needed to operate a physical layer. In addition, when transmission of a new packet type is considered in an upper layer in the future, the present invention can implement a method for transmitting the new packet transmission information to a physical layer.

The corresponding protocol layer may also be referred to as a data link layer, an encapsulation layer, a Layer 2, or the like. For convenience of description and better understanding of the present invention, the protocol layer will hereinafter be referred to as a link layer. When the term "protocol layer" is actually applied to the present invention, it should be noted that the term "protocol layer" may be replaced with the term 'link layer' or may also be called a new name as necessary.

The broadcast system according to the present invention may correspond to a hybrid broadcast signal implemented by combination of an IP (Internet Protocol) centric broadcast network and a broadband network.

The broadcast system according to the present invention may be designed to be compatible with the legacy MPEG-2 based broadcast system.

The broadcast system according to the present invention may correspond to a hybrid broadcast system based on a combination of the IP centric broadcast network, a broadband network, and/or a mobile communication network or cellular network.

Referring to FIG. 30, a physical layer may use a physical protocol adopted by a broadcast system such as the ATSC and/or DVB system.

In an encapsulation layer, an IP datagram may be obtained from specific information acquired from a physical layer, or the obtained IP datagram may be converted into a specific frame (e.g., RS frame, GSE-lite, GSE or signal frame). In this case, the frame may include an aggregate of IP datagrams.

A fast access channel (FAC) may include specific information (e.g., mapping information between a service ID and a frame) used for access to a service and/or contents.

A broadcast system according to the present invention may use a variety of protocols, for example, Internet Protocol (IP), User Datagram Protocol (UDP), Transmission Control Protocol (TCP), ALC/LCT (Asynchronous Layered Coding/Layered Coding Transport), RCP/RTCP (Rate Control Protocol/RTP Control Protocol), HTTP (Hypertext Transfer Protocol), FLUTE (File Delivery over Unidirectional Transport), etc. A stack between protocols may refer to the structure of FIG. 30.

In the broadcast system of the present invention, data may be transmitted in the form of ISOBMFF (ISO base media file format). ESG (Electrical Service Guide), NRT (Non Real Time), A/V (Audio/Video) and/or general data may be transmitted in the form of ISOBMFF.

Data transmission caused by the broadcast network may include linear content transmission and/or non-linear content transmission.

RTP/RTCP based A/V, and data (closed caption, emergency alert message, etc.) transmission may correspond to linear content transmission.

RTP payload may be encapsulated and transmitted in the form of an RTP/AV stream including a Network Abstraction Layer (NAL) and/or in the form of an ISO based media file format. RTP payload transmission may correspond to linear content transmission. If the RTP payload is encapsulated and transmitted in the form of an ISO based media file format, the RTP payload may include MPEG DASH media segments for A/V or the like.

FLUTE based ESG transmission, non-timed data transmission, and NRT content transmission may correspond to non-linear content transmission. The above-mentioned information may be encapsulated and transmitted in the form of a MIME type file and/or an ISO based media file format. If data is encapsulated and transmitted in the form of an ISO based media file format, this data transmission may conceptually include an MPEG DASH media segment for A/V or the like.

Data transmission over the broadband network may be classified into transmission of contents and transmission of the signaling data.

Content transmission may include transmission of linear content (A/V, data (closed caption, emergency alert messages, etc.), transmission of non-linear content (ESG, non-timed data, etc.), and transmission of an MPEG DASH based Media segment (A/V, data).

Transmission of the signaling data may include transmission of data including a signaling table (including MPD of MPEG DASH) transmitted on the broadcast network.

The broadcast system of the present invention may support not only synchronization between linear/non-linear contents having been transmitted over the broadcast network, but also synchronization between content transmitted over the broadcast network and content transmitted over the broadband network. For example, if one UD content is divided into the broadcast network and the broadband network and then simultaneously transmitted over the broadcast and broadband networks, the receiver may coordinate a timeline dependent upon a transmission (Tx) protocol, may synchronize contents of the broadcast network and the broadband contents, and may reconstruct the synchronized contents into one piece of UE content.

An application layer of the broadcast system may implement technical characteristics, for example, interactivity, personalization, second screen, ACR (automatic content recognition), etc. The above-mentioned technical characteristics are of importance to the North American broadcast standard evolved from ATSC 2.0 to ATSC 3.0. For example, HTML5 may be used to implement interactivity.

In a presentation layer of the broadcast system of the present invention, HTML and/or HTML may be used to identify the space and time relationship between components or between bidirectional applications.

The broadcast system according to another embodiment may be implemented by addition or modification of the above-mentioned broadcast system, and a detailed description of the individual constituent elements will be replaced with that of the above-mentioned broadcast system.

The broadcast system according to another embodiment of the present invention may include a system structure compatible with the MPEG-2 system. For example, the linear/non-linear contents transmitted in the legacy MPEG-2 system can be received or operated in the ATSC 3.0 system, and the AN and data processing may be adaptively coordinated according to whether data received by the ATSC 3.0 system is an MPEG-2 TS or IP datagram.

In an encapsulation layer of the broadcast system according to another embodiment of the present invention, information/data obtained from a physical layer may be converted into the MPEG-2 TS or IP datagram, or may be converted into a specific frame (e.g., RS frame, GSE-lite, GSE or signal frame, etc.) using the IP datagram.

The broadcast system according to another embodiment may include signaling information capable of being adaptively obtained according to whether MPEG-2 TS or IP datagram is used to acquire the service/content through the broadcast network. That is, when obtaining signaling information from the broadcast system, the signaling information may be obtained on the basis of MPEG-2 TS, or may be obtained from data based on a UDP protocol.

The broadcast system of the present invention may support synchronization between the linear/non-linear contents based on the broadcast network encapsulated by MPEG-2 TS and/or IP datagram. Alternatively, the broadcast system can support synchronization between content fragments that are respectively transmitted through the broadcast network and the broadband network. For example, if one UD content is divided into the broadcast network and the broadband network and then simultaneously transmitted over the broadcast and broadband networks, the receiver may coordinate a timeline dependent upon a transmission (Tx) protocol, may synchronize contents of the broadcast network and the broadband contents, and may reconstruct the synchronized contents into one piece of UE content.

FIG. 31 is a conceptual diagram illustrating an interface of a link layer according to an embodiment of the present invention.

Referring to FIG. 31, the transmitter may consider an exemplary case in which IP packets and/or MPEG-2 TS packets mainly used in the digital broadcasting are used as input signals. The transmitter may also support a packet structure of a new protocol capable of being used in the next generation broadcast system. The encapsulated data of the link layer and signaling information may be transmitted to a physical layer. The transmitter may process the transmitted data (including signaling data) according to the protocol of a physical layer supported by the broadcast system, such that the transmitter may transmit a signal including the corresponding data.

On the other hand, the receiver may recover data and signaling information received from the physical layer into other data capable of being processed in a higher layer. The receiver may read a header of the packet, and may determine whether a packet received from the physical layer indicates signaling information (or signaling data) or recognition data (or content data).

The signaling information (i.e., signaling data) received from the link layer of the transmitter may include first signaling information that is received from an upper layer and needs to be transmitted to an upper layer of the receiver; second signaling information that is generated from the link layer and provides information regarding data processing in the link layer of the receiver; and/or third signaling information that is generated from the upper layer or the link layer and is transferred to quickly detect specific data (e.g., service, content, and/or signaling data) in a physical layer.

FIG. 32 is a conceptual diagram illustrating a packet structure of a link layer according to an embodiment of the present invention.

In accordance with an embodiment of the present invention, the packet of the link layer may include a fixed header, an extended header, and/or payload.

A fixed header is designed to have a fixed size. For example, the fixed header may be 1 byte long. The extended header can be changed in size. Payload including data received from the higher layer may be located behind the fixed header and the extended header.

The fixed header may include a packet type element and/or an indicator part element.

The packet type element may be 3 bits long. The packet type element may identify a packet type of a higher layer (i.e., a higher layer of the link layer). The packet type identified by the packet type element value will hereinafter be described in detail.

The indicator part element may include information regarding a payload construction method and/or construction information of the extended header. The construction method and/or the construction information indicated by the indicator part element may be changed according to packet types.

FIG. 33 shows packet types dependent upon the packet type element values according to an embodiment of the present invention.

Referring to FIG. 33, if the packet type element is set to '000', this means that a packet transferred from the higher layer to the link layer is an IPv4 (Internet Protocol version 4) packet.

If the packet type element value is set to '001', this means that a packet transferred from the higher layer to the link layer is an IPv6 (Internet Protocol version 6) packet.

If the packet type element value is set to '010', this means that a packet transferred from the higher layer to the link layer is a Compressed IP packet.

If the packet type element value is set to '011', this means that a packet transferred from the higher layer to the link layer is an MPEG-2 TS packet.

If the packet type element value is set to '101', this means that a packet transferred from the higher layer to the link layer is a Packetized Stream packet. For example, the Packetized Stream may correspond to an MPEG media transport packet.

If the packet type element value is set to '110', this means that a packet transferred from the higher layer to the link layer is a packet for transmitting signaling information (signaling data).

If the packet type element value is set to '111', this means that a packet transferred from the higher layer to the link layer is a Framed Packet type.

FIG. 34 is a conceptual diagram illustrating a header structure of a link layer packet when an IP packet is transmitted to the link layer according to an embodiment of the present invention.

Referring to FIG. 34, if the IP packet is input to the link layer, the packet type element value may be 000B (3 bits of 000) or 001B (3 bits of 001).

Referring to a packet header of the link layer when an IP packet is input, the indicator part element located next to the packet type element may include a C/S (Concatenation/Segmentation) field and/or an additional bit of 3 bits (hereinafter referred to as an additional field).

In case of the packet of the link layer, an additional field of the fixed header and information of the extended header may be decided according to the CS (Concatenation/Segmentation) field of 2 bits located behind the packet type element.

The C/S field indicates the processing type of the input IP packet, and may include information regarding the extended header length.

In accordance with an embodiment of the present invention, the case in which the C/S field is set to 00B (2 bits of 00) may indicate that payload of the link layer packet includes a normal packet. The normal packet may indicate that the input IP packet is used as payload of the link layer packet without change. In this case, the additional field of the fixed header part is not in use, and may be reserved for a subsequent use. In this case, the extended header may not be used.

If the C/S field is set to '01B' (2 bits of '01'), this means that payload of the link layer packet includes a concatenated packet. The concatenated packet includes one or more IP packets. That is, one or more IP packets may be contained in payload of the link layer packet. In this case, the extended header is not used, and the additional field located subsequent to the C/S field may be used as the count field. A detailed description of the count field will hereinafter be described in detail.

If the C/S field is set to '10B' (2 bits of '10'), this means that payload is composed of segmented packets. The segmented packet is obtained by dividing one IP packet into a few segments. Specifically, the segmented packet may include one segment from among the divided segments. That is, payload of the link layer packet may include any one of a plurality of packets contained in the IP packet. The additional field located behind the C/S field is used as the segment ID. The segment ID may uniquely identify the segment. The segment ID is assigned when the IP packet is segmented. In more detail, if segments to be respectively transmitted in the future are integrated, the segment ID can indicate the presence of a constituent element of the same IP packet. The segment ID may be 3 bits long, and at the same time can support segmentation of the IP packet. For example, the divided segments obtained by one IP packet may have the same segment ID. In this case, the extended header may be 1 byte long. In this case, the extended header may include the Seg_SN (Segment Sequence Number) field and/or the Seg_Len_ID (Segment Length ID) field.

The Seg_SN field may be 4 bits long, and may indicate a sequence number of the corresponding segment for use in the IP packet. When the Seg_SN field IP packet is segmented, the Seg_SN field may be used to confirm the order or sequence of each segment. Accordingly, although the link layer packets including a payload segmented from one IP packet may have the same segment ID (Seg_ID), the link layer packets may have different Seg_SN field values. The Seg_SN field may be 4 bits long. In this case, one IP packet can be segmented into a maximum of 16 segments. If a user desires to divide the IP packet into many more segments, the Seg_SN field is increased in size so that the Seg_SN field may indicate each order of the segment and/or the number of segments.

The Seg_Len_ID (Segment Length ID) field may be 4 bits long, and may be used to identify the segment length. The actual segment length according to the Seg_Len_ID field value may be identified by a table to be described later. If the length value of an actual segment is signaled instead of the Seg_Len_ID field, the Seg_Len_ID field of 4 bits may be extended to the segment length field of 12 bits. In this case, the extended header of 2 bytes may be contained in the link layer packet.

If the C/S field value is set to 11B (2 bits of '11'), this means an exemplary case in which payload includes the segmented packet as in the case in which the C/S field value is set to 10B. However, the C/S field of 11B may also indicate that the last segment from among several segments divided in one IP packet may be contained in a payload. When segments are collected to reconstruct one IP packet, the receiver may identify the link layer packet configured to transmit the last segment using the C/S field value, and the segment contained in the payload of the corresponding packet may be recognized as the last segment. The additional field located behind the C/S field may be used as the segment ID. In this case, the extended header may be 2 bytes long. The extended header may include the Seg_SN (Segment Sequence Number) field and/or the L_Seg_Len (Last Segment Length) field.

The L_Seg_Len field may indicate the actual length of the last segment. If data is segmented to generate the same-sized data segments in the order from the front part of the IP packet using the Seg_Len_ID field, the last segment may have a different size as compared to another previous segment. Accordingly, the segment length may be directly indicated using the L_Seg_Len field. The segment length may be changed according to the number of allocated bits of the L_Seg_Len field. However, when allocating the number of bits according to the present invention, the L_Seg_Len field may indicate that the last segment is 1~4095 bytes long.

That is, if one IP packet is divided into a plurality of segments, the IP packet can be divided into a plurality of segments having a predetermined length. However, the length of the last segment may be changed according to the length of the IP packet. Accordingly, the length of the last segment needs to be signaled independently. A detailed description of the field having the same name may be replaced with the above-mentioned description.

FIG. 35 is a conceptual diagram illustrating the meaning and header structures according to C/S field values.

Referring to FIG. 35, if the C/S field is set to '00', this means that a normal packet is contained in the payload of the link layer packet and the additional field is reserved. On the other hand, the extended header may not be contained in the link layer packet. In this case, a total length of the header of the link layer packet may be 1 byte.

If the C/S field is set to '01', a concatenated packet is contained in the payload of the link layer packet and the additional field may be used as the count field. A detailed description of the count field will be given later. In the meantime, the extended header may not be contained in the link layer packet. In this case, a total length of the header of the link layer packet may be 1 byte.

If the C/S field is set to '10', the segmented packet may be contained in the payload of the link layer packet, and the additional field may be used as the segment ID. In the meantime, the extended header may be contained in the link layer packet, and the extended header may include the Seg_SN field and/or the Seg_Len_ID field. A detailed description of the Seg_SN field or the Seg_Len_ID field may be replaced with the above-mentioned description or a description to be given later. A total length of the link layer packet may be 2 bytes.

If the C/S field is set to '11', the segmented packet (i.e., packet including the last segment) may be contained in the payload of the link layer packet, and the additional field may be used as the segment ID. Meanwhile, the extended header may be contained in the link layer packet, and the extended header may include the Seg_SN field and/or the L_Seg_Len field. A detailed description of the Seg_SN field or the L_Seg_Len field may be replaced with the above-mentioned description or a description to be described given. A total length of the link layer packet may be 3 bytes.

FIG. 36 is a conceptual diagram illustrating the meaning according to the count field values.

Referring to FIG. 36, the count field may be used in the case in which the payload of the link layer packet includes a concatenated packet. The count field may indicate how many IP packets are contained in one payload. The value of the count field may indicate the number of concatenated IP packets. However, zero or one concatenation has no meaning, such that the count field may indicate that the IP packets, the number of which is denoted by "count field value+2", are contained in the payload. In accordance with one embodiment, 3 bits may be allocated to the count field, so that this means that a maximum of 9 IP packets has been contained in the payload of the link layer packet. If there is a need to include many more IP packets in one payload, the length of the count field may be extended, or 9 or more IP packets of the extended header may be additionally signaled.

FIG. 37 is a conceptual diagram illustrating the meaning and segment lengths according to values of Seg_Len_ID field.

Referring to FIG. 37, the Seg_Len_ID field may be used to indicate the length of segments other than the last segment from among several segments. In order to reduce overhead of the header needed for indicating the segment length, an available segment size may be limited to 16 segments.

The segment length is decided in response to the packet input size predetermined by a code rate of Forward Error Correction (FEC) processed by a physical layer, and the decided segment length may be designated as a length for each value of the Seg_Len_ID field. For example, in association with each value assigned to the Seg_Len_ID field, the segment length may be predetermined. In this case, information regarding the segment length dependent upon each value of the Seg_Len_ID field is generated by the transmitter and transmitted to the receiver, such that the receiver may store the received information therein. In the meantime, the segment length established to have each value of the Seg_Len_ID field may be changed. In this case, the transmitter may generate new information and transmit the new information to the receiver, and the receiver may update stored information on the basis of the above new information.

In the meantime, if the physical layer processing is performed irrespective of the segment length, the segment length may be calculated as shown in the equation of FIG. 37.

In Equation of FIG. 37, Len_Unit (Length Unit) may be a basic unit for indicating the segment length, and min_Len may be a minimum value of the segment length. Len_Unit and min_Len may be set to the same value not only in the transmitter but also in the receiver. After the above-mentioned parameters of Equation have been decided once, it is preferable that the above parameters remain unchanged in terms of system throughput. This value may be decided in consideration of the FEC processing throughput of the physical layer during an initiation process of the system. For example, as shown in FIG. 37, the Len_Unit or min_Len value may indicate the segment length differently represented in response to the Seg_Len_ID field value. At this time, the parameter 'Len_Unit' may be 256, and the parameter 'min_Len' may be 512.

FIG. 38 is a conceptual diagram illustrating an equation for encapsulating a normal packet and an equation for calculating a link layer packet length.

Referring to FIG. 38, if the input IP packet is not concatenated or segmented within the processing range of the physical layer as described above, the IP packet may be encapsulated into a normal packet. The following contents may be equally applied to IPv4 and IPv6 IP packets. One IP packet may be used as payload of the link layer packet without change, the packet type element value may be set to 000B (IPv4) or 001B (IPv6), and the C/S field value may be set to 00B (Normal Packet). The remaining three bits of the fixed header may be set to a reserved field to be used for another usage in future.

The link layer packet length can be identified as follows. A specific field indicating the IP packet length may be contained in the header of the IP packet. The field indicating the length is always located at the same position, such that the receiver may confirm the field located at a specific position spaced apart from an initial part (start part) of the link layer packet by a predetermined offset, such that the payload length of the link layer packet can be recognized.

The receiver can read the length field having the length of 2 bytes at a specific position spaced apart from the start point of the payload by 2 bytes in case of IPv4, and can read the length field having the length of 2 bytes at a specific position spaced apart from the start point of the payload by 4 bytes in case of IPv6.

Referring to FIG. 38, assuming that the IPv4 length field is set to LIPv4, LIPv4 indicates a total length of IPv4. In this case, if the header length LH (1 byte) of the link layer packet is added to LIPv4, the length of the entire link layer packet is obtained. In this case, LT may indicate the length of the link layer packet.

Referring to the equation of FIG. 38, assuming that the IPv6 length field is denoted by LIPv6, LIPv6 indicates only the payload length of the IPv6 IP packet. Accordingly, if the header length LH (1 byte) of the link layer packet is added and the fixed header length (40 bytes) of IPv6 is additionally added, the length of the link layer packet is obtained. Here, LT may denote the length of the link layer packet.

FIG. 39 is a conceptual diagram illustrating a process for encapsulating a concatenated packet and an equation for calculating a link layer packet length.

Referring to FIG. 39, if the input IP packet does not arrive within the processing range of the physical layer, some IP packets are concatenated and encapsulated into one link layer packet. The following description can also be applied to IP packets of IPv4 and IPv6.

Some IP packets may be used as the payload of the link layer packet, the packet type element value may be set to 000B (IPv4) or 001B (IPv6), and the C/S field may be set to 01B (Concatenated Packet). In addition, the count field of 3 bits indicating how many IP packets are contained in one payload may be concatenated to the C/S field of 01B.

In order to calculate the length of the concatenated packet by the receiver, a similar way to the normal packet case may be used. Assuming that the number of concatenated IP packets indicated by the count field is denoted by n, the header length of the link layer packet is denoted by LH, and the length of each IP packet is denoted by Lk (where $1 \le k \le n$), the entire link layer packet length (LT) can be calculated as shown in the equation.

Since the concatenated packet has the fixed header information only, LH=1 (byte) is achieved, and each Lk (where $1 \le k \le n$) value can be confirmed by reading the value of the length field contained in the header of each IP packet contained in the concatenated packet. The receiver may parse the length field of a first IP packet at a specific position that has a predetermined offset on the basis of a payload start position after the link layer packet header has ended, and may identify the length of a first IP packet using this length field. The receiver may parse the length field of a second IP packet at a specific position that has a predetermined offset on the basis of a length end point of the first IP packet, and may identify the length of the second IP packet using this length field. The above-mentioned operation is repeated a predetermined number of times corresponding to the number of IP packets contained in the payload of the link layer packet, so that the payload length of the link layer packet can be identified.

FIG. 40 is a conceptual diagram illustrating a process for calculating the length of a concatenated packet including an IPv4 packet and an equation for calculating an offset value at which a length field of the IP packet is located.

When the IP packet is input to the transmitter, the transmitter has no difficulty in reading the length field of the IP packet. However, the receiver can recognize only the number of IP packets constructing the link layer packet through the header, such that the position of each length field is not well known in the art. However, since the length field is always located at the same position of the header of the IP packet, the position of the length field is detected using the following method, so that the length of each IP packet contained in the payload of the concatenated packet can be calculated and recognized.

Assuming that n IP packets contained in the payload of the concatenated packet are respectively denoted by IP1, IP2, . . . , IPk, . . . , IPn, the position of the length field corresponding to IPk may be spaced apart from a start point of the payload of the concatenated packet by Pk bytes. In this case, Pk (where $1 \le k \le n$) may be an offset value at which the length field of the k-th IP packet is located on the basis of a start point of the payload of the concatenated packet, and the Pk value can be calculated as shown in the equation of FIG. 40.

In this case, P1 of the IPv4 packet is 2 bytes. Therefore, the Pk value is successively updated from P1, and the Lk value corresponding to the Pk value is read. If Lk is applied to the equation of FIG. 39, the length of concatenated packet can be finally calculated.

FIG. 41 is a conceptual diagram illustrating a process for calculating the length of a concatenated packet including an IPv6 packet and an equation for calculating an offset value at which a length field of the IP packet is located.

If the IPv6 packets are concatenated and contained in the payload of the link layer packet, a method for calculating the payload length is as follows. The length field contained in the IPv6 packet indicates information regarding the payload length of the IPv6 packet, and 40 bytes indicating the length of a fixed header of IPv6 are added to the payload length of the IPv6 packet indicated by the length field, such that the length of IPv6 packet can be calculated.

Assuming that n IP packets contained in the payload of the concatenated packet are respectively denoted by IP1, IP2, . . . , IPk, . . . , IPn, the position of the length field corresponding to IPk may be spaced apart from the start position of the payload of the concatenated packet by Pk bytes. In this case, Pk (wherein 1≤k≤n) may be an offset value at which the length field of the k-th IP packet is located on the basis of a start point of the payload of the concatenated packet, and may be calculated by the equation shown in FIG. 41. In this case, P1 in case of IPv6 has 4 bytes. Accordingly, the Pk value is successively updated from P1, and Lk corresponding to the Pk value is read. If this Lk value is applied to the equation of FIG. 39, the length of concatenated packet can be finally calculated.

FIG. 42 is a conceptual diagram illustrating an encapsulation process of a segmented packet according to an embodiment of the present invention.

The following description can be equally be applied to the IPv4 IP packet and the IPv6 IP packet. One IP packet is segmented to result in a payload of several link layer packets. The packet type element value may be set to 000B (IPv4) or 001B (IPv6), and the C/S field value may be 10B or 11B according to the segment construction.

The C/S field may be set to 11B only in a specific segment corresponding to the last part of the IP packet, and may be set to 10B in the remaining segments other than the above specific segment. The C/S field value may also indicate information of the extended header of the link layer packet as described above. That is, if the C/S field is set to 10B, the header is 2 bytes long. If the C/S field is set to 11B, the header is 3 bytes long.

In order to indicate the segmentation state from the same IP packet, the Seg_ID (segment ID) values contained in the headers of the individual link layer packets must have the same value. In order to allow the receiver to indicate the order (sequence) information of segments for recombination of normal IP packets, the sequentially increasing Seg_SN values are recorded in the header of each link layer packet.

When the IP packet is segmented, the segment length is decided as described above, and the segmentation process based on the same length is carried out. Thereafter, the Seg_Len_ID value appropriate for the corresponding length information is recorded in the header. In this case, the length of the last segment may be changed as compared to the previous segment, so that the length information may be directly designated using the L_Seg_Len field.

The length information designated by the Seg_Len_ID field and the L_Seg_Len field may indicate only payload information of the segment (i.e., link layer packet), such that the receiver may identify the length information of the entire link layer packet by adding the header length of the link layer packet to the payload length of the link layer packet using the C/S field.

FIG. 43 is a conceptual diagram illustrating a segmentation process of an IP packet and header information of a link layer packet according to an embodiment of the present invention.

When the IP packet is segmented and encapsulated into the link layer packet, the field values allocated to the header of respective link layer packets are shown in FIG. 14.

For example, if the IP packet having the length of 5500 bytes in the IP layer is input to the link layer, this IP packet is divided into 5 segments (S1, S2, S3, S4, S5), and headers (H1, H2, H3, H4, H5) are added to the 5 segments, so that the added results are encapsulated into the individual link layer packets.

Assuming that the case of using the IPv4 packet is used, the packet type element value may be set to 000B. The C/S field value is set to 10B in the range of H1~H4, and the C/S field value of H5 is set to 11B. All the segment IDs (Seg_IDs) indicating the same IP packet structure may be set to 000B, and the Seg_SN field is sequentially denoted by 0000B~0100B in the range of H1~H5.

The resultant value obtained when 5500 bytes is divided by 5 is 1100 bytes. Assuming that the segment is composed of the length of 1024 bytes located closest to the 1100 bytes, the length of the last segment S5 is denoted by 1404 bytes (010101111100B). In this case, the Seg_Len_ID field may be set to 0010B as shown in the above-mentioned example.

FIG. 44 is a conceptual diagram illustrating a segmentation process of an IP packet including a cyclic redundancy check (CRC) according to an embodiment of the present invention.

When the IP packet is segmented and transmitted to the receiver, the transmitter may attach the CRC to the rear of the IP packet in such a manner that integrity of combined packets can be confirmed by the receiver, and finally the segmentation process may be carried out. Generally, since CRS is added to the last part of the packet, the CRS is contained in the last segment after completion of the segmentation process.

When the receiver receives data having a length exceeding the length of the last segment, the received data may be recognized as CRC. Alternatively, the length including the CRC length may be signaled as the length of the last segment.

FIG. 45 is a conceptual diagram illustrating a header structure of a link layer packet when MPEG-2 TS (Transport Stream) is input to a link layer according to an embodiment of the present invention.

The packet type element may identify that the MPEG-2 TS packet is input to the link layer. For example, the packet type element value may be set to 011B.

If the MPEG-2 TS is input, the header structure of the link layer packet is shown in FIG. 16. If the MPEG-2 TS packet is input to the link layer, the header of the link layer packet may include the packet type element, the count field, the PI (PID Indicator) field, and/or the DI (Deleted Null Packet Indicator) field.

For example, the 2-bit or 3-bit count field, the 1-bit PI (PID Indicator) field, and the 1-bit DI (Deleted Null Packet Indicator) field may be arranged subsequent to the packet type of the header of the link layer packet. If the count field has 2 bits, the remaining 1 bit may be used as a reserved field to be used for a subsequent use in future. The fixed header part may be constructed in various ways as shown in FIGS. 16(*a*) to 16(*d*) according to locations of the reserved field.

Although the present invention will be disclosed on the basis of the header of (a) for convenience of description and better understanding of the present invention, the same description may also be applied to other types of headers.

If the MPEG-2 TS packet is input to the link layer (packet type=011), the extended header may not be used.

The count field may indicate how many MPEG-2 TS packets are contained in the payload of the link layer packet. The size of one MPEG-2 TS packet is greatly less than the size of LDPC (Low-density parity-check) input indicating the FEC scheme having a high-selection possibility in the physical layer of the next generation broadcast system, and concatenation of the link layer can be basically considered. That is, one or more MPEG-2 TS packets may be contained in the payload of the link layer packet. However, the number of concatenated MPEG-2 TS packets is limited to some numbers, so that this information may be identified by 2 bits or 3 bits. Since the length of the MPEG-2 T packet is fixed to a predetermined size (e.g., 188 bytes), the receiver may also estimate the payload size of the link layer packet using the count field. An example of indicating the number of MPEG-2 TS packets according to the count field will hereinafter be described in detail.

PI (Common PID indicator) field is set to '1' when the MPEG-2 TS packets contained in the payload of one link layer packet have the same PIDs (Packet Identifiers). On the contrary, if the MPEG-2 TS packets contained in the payload of one link layer packet have different PIDs, the PI field is set to '0'. The PID field may be 1 bit long.

DI (Null Packet Deletion Indicator) field is set to 1 when a null packet contained in the MPEG-2 TS packet and then transmitted is deleted. If the null packet is not deleted, the DI field is set to '0'. The DI field may be 1 bit long. If the DI field is set to 1, the receiver may reuse some fields of the MPEG-2 TS packet so as to support null packet deletion in the link layer.

FIG. 46 shows the number of MPEG-2 TS packets contained in a payload of the link layer packet according to values of a count field.

If the count field is 2 bits long, the concatenated MPEG-2 TS packets may be present in four cases. The payload size of the link layer packet other than synchronous bytes (Sync Bytes) (47H) may also be identified by the count field.

The number of MPEG-2 TS packets to be allocated according to the count field value may be changed according to system designers.

FIG. 47 is a conceptual diagram illustrating a header of the MPEG-2 TS packet according to an embodiment of the present invention.

Referring to FIG. 47, the header of the MPEG-2 TS packet may include a Sync Byte field, a Transport Error Indicator field, a payload unit start indicator field, a transport priority field, a PID field, a transport scrambling control field, an adaptation field control field, and/or a continuity counter field.

The Sync Byte field may be used for packet synchronization, and may be excluded in the case of encapsulation at the link layer. A transport error indicator (EI) located next to the Sync Byte field is not used by the transmitter, and may be used to inform a higher layer of the presence of an error incapable of being recovered by the receiver. As a result, the Transport Error Indicator field is not used by the transmitter.

The Transport Error Indicator field is established in a demodulation process on the condition that it is impossible to correct errors of the stream. In more detail, the Transport Error Indicator field may indicate the presence of errors incapable of being corrected in the packet.

The payload unit start indicator field may identify whether PES (Packetized elementary stream) or PSI (Program-specific information) is started.

The transport priority field may indicate whether the corresponding packet has a higher priority than other packets having the same PID.

The PID field may identify each packet.

The transport scrambling control field may indicate whether or not a scramble is used, and/or may indicate whether a scramble is used using an odd or even key.

The adaptation field control field may indicate the presence or absence of the adaptation field.

The continuity counter field may indicate an order number (or sequence number (of the payload packet.

FIG. 48 is a conceptual diagram illustrating a process for allowing a transceiver to change a usage of a transport error indicator field according to an embodiment of the present invention.

If the DI field is set to 1, the Transport Error Indicator field may be used as a Deletion Point Indicator (DPI) field in the link layer of the transmitter as shown in FIG. 19. The Deletion Point Indicator (DPI) field may be recovered to the Transport Error Indicator field after completion of the null packet-related processing in the link layer of the receiver. That is, the DI field may indicate whether the null packet is deleted, and at the same time may indicate whether the usage of the Transport Error Indicator field of the MPEG-2 TS header is changed.

FIG. 49 is a conceptual diagram illustrating an encapsulation process of the MPEG-2 TS packet according to an embodiment of the present invention.

Basically, the MPEG-2 TS packet concatenation is being considered, so that a plurality of MPEG-2 TS packets may be contained in the payload of one link layer packet, and the number of MPEG-2 TS packets may be decided as described above. Assuming that the number of MPEG-2 TS packets contained in payload of one link layer packet is denoted by N, respective MPEG-2 TS packets may be denoted by Mk (wherein 1≤k≤n).

The MPEG-2 TS packet may include a fixed header of 4 bytes and a payload of 184 bytes. 1 byte from among the header of 4 bytes is used as the Sync Byte, and is always assigned the same value (47H). Accordingly, one MPEG-2 TS packet 'Mk' may include the sync part (S) of 1 byte, a fixed header part (Hk) of 3 bytes other than the sync byte, and/or the payload part (Pk) of 184 bytes (wherein 1≤k≤n).

If the adaptation field is used in the header of the MPEG-2 TS packet, the fixed header part is extended even to the front part of the adaptation field, and the remaining adaptation parts are contained in the payload part.

Assuming that N MPEG-2 TS packets are denoted by [M1, M2, M3, . . . , Mn], the N MPEG-2 TS packets are arranged in the form of [S, H1, P1, S, H2, P2, . . . , S, Hn, Pn]. The Sync Part is always set to the same value, such that the receiver can detect the corresponding position without receiving any signal from the transmitter, and can perform the insertion action at the detected position. Accordingly, when the payload of the link layer packet is constructed, the sync part is excluded so that the packet can be reduced in size. When an aggregate of the MPEG-2 TS packets having the above arrangement is constructed as the payload of the link layer packet, the sync part is excluded, and the header part and the payload part are separated from each other, so that the MPEG-2 TS packets are arranged in the form of [H1, H2, . . . , Hn, P1, P2, . . . , Pn].

If the PI field value is set to zero '0' and the DI field is set to zero '0', the payload length of the link layer packet has '(n×3)+(n×184)' bytes. Thereafter, if 1 byte indicating the header length of the link layer packet is added to the resultant bytes, the entire link layer packet length can be calculated and obtained. That is, the receiver can identify the length of the link layer packet through the above-mentioned process.

FIG. 50 is a conceptual diagram illustrating an encapsulation process of the MPEG-2 TS packet having the same PID according to an embodiment of the present invention.

If broadcast data is being successively streamed, the MPEG-2 TSs contained in one link layer packet may have the same PDI value. In this case, repeated PID values are simultaneously indicated so that the link layer packet can be reduced in size. In this case, the PI (PID indicator) field contained in the header of the link layer packet may be used as necessary.

The PI (Common PID Indicator) value of the header of the link layer packet may be set to '1'. As described above, in the case of using N MPEG-2 TS packets [M1, M2, M3, . . . , Mn] within the payload of the link layer packet, the sync part is excluded, and the header part and the payload part are separated from each other, so that the MPEG-2 TS packets may be arranged in the form of [H1, H2, . . . , Hn, P1, P2, . . . , Pn]. In this case, the header parts [H1, H2, . . . , Hn] of the MPEG-2 TS may have the same PID. Although the PID value is indicated and transmitted only once, the receiver can recover the corresponding data to an original header. Assuming that a common PID is referred to as a Common PID (CPID) and the header obtained when the PID is excluded from the MPEG-2 TS packet header (Hk) is denoted by H'k (where 1≤k≤n), the header parts [H1, H2, . . . , Hn] of the MPEG-2 TS constructing the payload of the link layer packet may be reconstructed in the form of [CPID, H'1, H'2, . . . , H'n]. This process may be referred to as Common PID reduction.

FIG. 51 is a conceptual diagram illustrating an equation for calculating the length of a link layer packet through a Common PID reduction process and a Common PID reduction process.

Referring to FIG. 51, the header part of the MPEG-2 TS packet may include a PID of 13 bits. If the MPEG-2 TS packets configured to construct the payload of the link layer packet have the same PID values, PID is repeated a predetermined number of times corresponding to the number of concatenated packets. Accordingly, the PID part is excluded from the header parts [H1, H2, . . . , Hn] of the original MPEG-2 TS packet, so that the MPEG-2 TS packets are reconstructed in the form of [H'1, H'2, . . . , H'n], the common PID value is set to the CPID value, and the CIPD may be located at the front of the reconstructed header part.

The PID value has the length of 13 bits, and the stuffing bit may be added in a manner that the entire packet is configured in the form of a byte unit. The stuffing bits may be located at the front or rear part of the CPID. The stuffing bits may be properly arranged according to the structure of concatenated protocol layer or the system implementation.

In the case of encapsulating the MPEG-2 TS packets having the same PID, the PID is excluded from the header part of the MPEG-2 TS packets and then encapsulated, and the payload length of the link layer packet can be calculated as described above.

As shown in FIG. 51, the header of the MPEG-2 TS packet other than the Sync Byte is 3 bytes long. If the PID part of 13 bits is excluded, resulting in the implementation of 11 bits. Accordingly, if N packets are concatenated to implement (n×11) bits, and if the number of concatenated packets is set to a multiple of 8, the (n×11) bits have the length of a byte unit. The stuffing bits having the length of 3 bits are added to the common PID length of 13 bits, so that the CPID part having the length of 2 bytes can be constructed.

Therefore, in the case of using the link layer packet obtained when N MPEG-2 TS packets having the same PID are encapsulated, assuming that the length of the header of the link layer packet is denoted by LH, the CPID part has the length of LCPID, and a total length of the link layer packet is denoted by LT, the LT value can be calculated as shown in the equation of FIG. 51.

In the embodiment of FIG. 21, LH is 1 byte, and LCPID is 2 bytes.

FIG. 52 is a conceptual diagram illustrating the number of concatenated MPEG-2 TS packets and the length of a link layer packet according to count field values when Common PID reduction is used.

If the number of concatenated MPEG-2 TS packets is decided, and if all packets have the same PID, the above-mentioned common PID reduction process can be applied, and the receiver can calculate the length of the link layer packets according to the above-mentioned equation.

FIG. 53 is a conceptual diagram illustrating a process for encapsulating the MPEG-2 TS packet including a null packet according to an embodiment of the present invention.

In order to transmit the MPEG-2 TS packet at a fixed transfer rate, the null packet may be contained in the transmission (Tx) stream. The null packet is used as overhead in terms of a transmission aspect, and thus, although the transmitter does not the null packet, the receiver can recover this null packet. When the transmitter deletes the null packet and transmits data and the receiver searches for the number of deleted null packets and the location of deleted null packets so as to perform data recovery, the null packet deletion indicator (DI) field located in the header of the link layer packet may be used. In this case, the DI value of the header of the link layer packet may be set to 1.

The encapsulation action when the null packet is located at an arbitrary position between input Tx streams may be carried in a manner that n packets other than the null packet are sequentially concatenated. The count value indicating how many null packets are successively excluded may be contained in the payload of the link layer packet, and the receiver may generate the null packet at an original position on the basis of this count value so that the original position is filled with the null packet.

Assuming that N MPEG-2 TS packets other than the null packet are denoted by [M1, M2, M3, . . . , Mn], the null packet may appear at any position between the MPEG-2 TS packets (M1~Mn). The part at which the null packet is counted a predetermined number of times from among 0~n times may appear in a single link layer packet. That is, assuming that the appearance number of times of the above part at which the null packet is counted within one link layer packet is denoted by 'p', the range of p is denoted by 0 to n.

If the count value of each null packet is denoted by Cm, the range of m is denoted by 1≤m≤p, and Cm does not exist in case of p=0. Specific information indicating where each Cm is located between the MPEG-2 TS packets may be denoted using a specific field in which the usage of EI (transport error indicator) is changed to DPI (Deletion Point Indicator) in the header of the MPEG-2 TS packet.

In the present invention, Cm may have the length of 1 byte. If the packet to be used later has a margin in length, the 1-byte Cm may also be extended. Cm of 1 byte may count a maximum of 256 null packets. The indicator field of the null packets is located at the header of the MPEG-2 TS packet, and the exclusion of a predetermined number of null packets corresponding to "(value denoted by Cm)+1" can be calculated. For example, in case of Cm=0, one null packet may be excluded. In case of Cm=123, 124 null packets are excluded. If the number of contiguous null packets is higher than 256, the 257-th null packets are processed as normal packets, and the subsequent null packets can be processed as such null packets according to the above-mentioned method.

As shown in FIG. 24, the null packet is located between the MPEG-2 TS packets corresponding to Mi and Mi+1. The count value of the MPEG-2 TS packets is denoted by C1, and the null packet is located between the MPEG-2 TS packets corresponding to Mj and Mj+1. If the count value of the MPEG-2 TS packets may be denoted by Cp, the actual transmission order may be denoted by [ . . . , Mi, C1, Mi+1, . . . , Mj, Cp, Mj+1, . . . ].

When the header part and the payload part of the MPEG-2 TS packet, instead of the null packet, are separated from each other and rearranged to construct the payload of the link layer packet, the count value Cm ($1 \leq m \leq p$) of the null packets is located between the header part and the payload part of the MPEG-2 TS packet. That is, the payload of the link layer packets are arranged in the form of [H1, H2, . . . , Hn, C1, . . . , Cp, P1, P2, . . . , Pn], and the receiver confirms the count value one byte by one byte in the order shown in the DPI field located at Hk, and recovers as many null packets as the number of confirmed value according to the order of original MPEG-2 TS packets.

FIG. 54 is a conceptual diagram illustrating a step for processing an indicator configured to count a removed null packet and an equation for calculating the length of a link layer packet in the processing step.

The DPI field may be established to indicate deletion of the null packet and the presence of a count value associated with the deleted null packet. As shown in FIG. 25, if the DPI field present at Hi from among the header of a plurality of MPEG-2 TS packets is set to 1, this means that the null packet located between Hi and Hi+1 is excluded and encapsulated, and its associated 1-byte count value is located between the header part and the payload part.

In the above-mentioned process, the length of the link layer packet can be calculated by the equation shown in FIG. 54. Therefore, in case of the link layer packet that has been obtained by encapsulation of n MPEG-2 TS packets through the null packet exclusion process, assuming that the header length of the link layer packet is denoted by LH, the count value Cm ($1 \leq m \leq p$) of the null packets is denoted by LCount, and the total length of the link layer packet is denoted by LT, LT can be calculated by the equation of FIG. 54.

FIG. 55 is a conceptual diagram illustrating a process for encapsulating the MPEG-2 TS packet including a null packet according to another embodiment of the present invention.

In accordance with another embodiment of the encapsulation method excluding the null packets, payload of the link layer packet can be constructed. In accordance with another embodiment of the present invention, when the header part and payload part of the MPEG-2 TS packets are rearranged to construct the link layer packet payload, the count value Cm ($1 \leq m \leq p$) of the null packets can be located at the header part and the order or sequence of the null packets may remain unchanged. That is, the count value of the null packets may be contained at a specific point at which individual MPEG-2 TS headers are ended. Accordingly, when the receiver reads a value of the DPI field contained in each MPEG-2 TS header, the receiver determines completion of the deletion of null packets, the receiver reads the count value contained at the last part of the corresponding header, and regenerates as many null packets as the corresponding count value, such that the regenerated null packets may be contained in the stream.

FIG. 56 is a conceptual diagram illustrating a process for encapsulating the MPEG-2 TS packets including the same packet identifiers (PIDs) in a stream including a null packet according to an embodiment of the present invention.

The encapsulation process of MPEG-2 TS packets including the same PID (packet identifier) in the stream including the null packet may be carried out by combination of a first process for encapsulating the link layer packets other than the above null packets and a second process for encapsulating the MPEG-2 TS packets having the same ID into the link layer packet.

Since an additional PID indicating the null packet is allocated, the case in which the null packet is contained in the actual transmission stream is not processed by the same PID. However, after completion of the exclusion process of the null packets, only the count value related to the null packet is contained in the payload of the link layer packet, the remaining N MPEG-2 TS packets have the same PID, such that the N MPEG-2 TS packets can be processed by the above-mentioned method FIG. 57 is a conceptual diagram illustrating an equation for calculating the length of a link layer packet when the MPEG-2 TS packets having the same PIDs are encapsulated in a stream including a null packet according to an embodiment of the present invention.

In the stream including the null packet, when MPEG-2 TS packets having the same PID are encapsulated, the length of the link layer packet can be calculated through FIG. 51 and/or FIG. 54. The above equations can be represented by an equation of FIG. 28.

FIG. 58 is a conceptual diagram illustrating a link layer packet structure for transmitting signaling information according to an embodiment of the present invention.

In order to transmit signaling information before the receiver receives the IP packet or the MPEG-2 TS packet in the same manner as in the update process of IP header compression information or broadcast channel scan information, the present invention provides packet formats capable of transmitting signaling data (i.e., signaling data) to the link layer.

In accordance with the embodiment of the present invention, if the packet type element contained in the header of the link layer packet is set to 110B, a section table (or a descriptor) for signaling may be contained in the payload of the link layer packet and then transmitted. The signaling section table may include a signaling table/table section contained in conventional DVB-SI (service information), PSI/PSIP, NRT (Non Real Time), ATSC 2.0, and MH (Mobile/Handheld).

FIG. 59 is a conceptual diagram illustrating a link layer packet structure for transmitting the framed packet according to an embodiment of the present invention.

Besides the IP packet or the MPEG-2 TS packet, the packet used in a general network can be transmitted through the link layer packet. In this case, the packet type element of the header of the link layer packet may be set to 111B, and may indicate that the framed packet is contained in the payload of the link layer packet.

FIG. 60 shows a syntax of the framed packet according to an embodiment of the present invention.

The syntax of framed packet may include ethernet_type, length, and/or packet( ).

The ethernet_type which is a 16-bit field shall identify the type of packet in the packet( ) field according to the LANA registry. Only registered values shall be used.

The length which is a 16-bit field shall be set to the total length in bytes of the packet( ) structure.

The packet( ) which is variable length field shall contain a network packet.

FIG. 61 is a block diagram illustrating a receiver of the next generation broadcast system according to an embodiment of the present invention.

Referring to FIG. 61, the receiver according to an embodiment of the present invention may include a receiver (not shown), a Channel Synchronizer 32010, a Channel Equalizer 32020, a Channel Decoder 32030, a Signaling Decoder 32040, a Baseband Operation Controller 32050, a Service Map DB 32060, a Transport Packet Interface 32070, a Broadband Packet Interface 32080, a Common Protocol Stack 32090, a Service Signaling Channel Processing Buffer & Parser 32100, an A/V Processor 32110, a Service Guide Processor 32120, an Application Processor 32130, and/or a Service Guide DB 32140.

The receiver (not shown) may receive broadcast signals.

The channel synchronizer 32010 may synchronize a symbol frequency with timing in a manner that signals received at baseband can be decoded. In this case, the baseband may indicate a Tx/Rx region of the broadcast signal.

The channel equalizer 32020 may perform channel equalization of the received (Rx) signal. The channel equalizer 32020 may compensate for signal distortion encountered when the Rx signals are distorted by multipath, Doppler effect, etc.

The Channel Decoder 32030 may recover the received (Rx) signal into a meaningful transport frame. The channel decoder 32030 may perform forward error correction (FEC) of data or transport frame contained in the Rx signal.

The signaling decoder 32040 may extract and decode signaling data contained in the received (Rx) signal. Here, the signaling data may include signaling data and/or service information (SI) to be described later.

The baseband operation controller 32050 may control baseband signal processing.

The Service Map DB 32060 may store signaling data and/or service information. The service Map DB 32060 may store signaling data contained/transmitted in the broadcast signal and/or signaling data contained/transmitted in the broadband packet.

The transport packet interface 32070 may extract the transport packet from the transmission (Tx) frame or the broadcast signal. The transport packet interface 32070 may extract the signaling data or the IP datagram from the transport packet.

The broadband packet interface 32080 may receive broadcast-related packets through the Internet. The broadband packet interface 32080 may extract a packet obtained through the Internet, and combine or extract the signaling data or A/V data from the corresponding packet.

The common protocol stack 32090 may process the received packet according to the protocol contained in the protocol stack. For example, the common protocol stack 32090 may perform processing for each protocol, such that it can process the received packet.

The service signaling channel processing buffer & parser 32100 may extract signaling data contained in the received packet. The service signaling channel processing buffer & parser 32100 may scan services and/or contents from the IP datagram or the like, and may extract signaling information related to acquisition of the services and/or contents, and parse the extracted signaling information. The signaling data may be located at a predetermined position or channel within the received packet. This position or channel may be referred to as a service signaling channel. For example, the service signaling channel may have a specific IP address, a UDP Port number, a transmission session ID, etc. The receiver may recognize data being transmitted as the specific IP address, the UDP port number, and the transmission session, etc. as signaling data.

The A/V Processor 32110 may perform decoding of the received audio and video data, and presentation processing thereof.

The service guide processor 32120 may extract announcement information from the Rx signal, may manage the service guide DB 32140, and provide the service guide.

The application processor 32130 may extract application data contained in the received packet and/or application-associated information, and may process the extracted data or information.

The service guide DB 32140 may store the service guide data therein.

FIG. 62 is a conceptual diagram illustrating a general format of a section table according to an embodiment of the present invention.

Referring to FIG. 62, the section table according to an embodiment may include a table_id field, a section_syntax_indicator field, a section_length field, a version_number field, a current_next_indicator field, a section_number field, a last_section_number field, and/or a section data field.

The table_id field may indicate a unique ID value of the corresponding table.

The section_syntax_indicator field may indicate a format of a table section located behind the corresponding field. If the corresponding field is set to zero (0), the corresponding table section indicates a short format. If the corresponding field is set to 1, the corresponding table section has a general long format. The corresponding field value according to an embodiment of the present invention may always be set to 1.

The section_length field may indicate the length of the corresponding section, such that it can indicate the length from the next part of the corresponding field to the last part of the corresponding section in bytes.

The version_number field may indicate a version of the corresponding table.

If the current_next_indicator field is set to 1, this means that the corresponding section table is valid. If the current_next_indicator field is set to 0, this means that the next section table to be subsequently transmitted is valid.

The section_number field may indicate the number of sections contained in the corresponding table. If the first section constructing the corresponding table is decided, the section_number field value may indicate zero, and may also be sequentially increased.

The last_section_number field may indicate the number of the last_section from among a plurality of sections constructing the corresponding table.

The section data field may include data contained in the corresponding section.

The field denoted by "Special Use" may be a field that can be differently configured according to individual tables. The number of bits allocated to "Special Use" may be maintained without change.

FIG. 63 is a conceptual diagram illustrating a link layer packet for transmitting signaling information according to an embodiment of the present invention.

If signaling information is transmitted using the link layer packet, the value of the packet type element may be set to '110B'.

FIG. 63 shows a header structure of the link layer packet when signaling information is transmitted. Referring to FIG. 63, during transmission of the signaling information, a signaling type field of 2 bits may be located behind the packet type element. The signaling type field may indicate a format of the signaling information to be transmitted. The remaining 3-bit part of the fixed header subsequent to the signaling type field and the extended header may be decided.

If the signaling type field according to an embodiment denotes '0013', this means that the signaling type is a section table. In case of the section table, information regarding section separation and the section_length information are contained in the field of the table, such that the link layer packet may indicate only the packet type and the signaling type without additional processing, and then transmit the packet type and the signaling type. If the signaling type has a section table format, the remaining 3 bits other than the packet type element and the signaling type field of the fixed header part are not in use, and may be reserved for a subsequent use. If the signaling type has a section table format, the extended header is not used. If there is a need to indicate the length of the link layer packet, the extended header of 1 or 2 bytes may be added and may be used as a length field.

If the signaling type field according to the embodiment denotes '01B', this means that the signaling type has a descriptor format. Generally, the descriptor is used as some parts of the section table. If only the descriptor needs to be transmitted through simple signaling, the descriptor may be transmitted as the corresponding signaling type. The descriptor may be shorter in length than the section table, so that several descriptors may be contained in one link layer packet and then transmitted. 3 bits corresponding to the indicator part of the fixed header according to the embodiment may be used to indicate how many descriptors are contained in one link layer packet. If the signaling type is a descriptor format and the extended header is not in use, the length of the link layer packet can be displayed using the corresponding descriptor length information contained in the descriptor without using the extended header. If it is necessary to separately display the link layer packet length, the extended header of 1 or 2 bytes is added, and may be used as the length field.

The signaling type field value (10B) according to an embodiment may be reserved to support other kinds of signaling.

If the signaling type field according to the embodiment indicates the value of 11B, this means that the signaling type is GSE-LLC. The GSE-LLC signaling may be segmented as necessary. Therefore, if the signaling type is GSE-LLC, the remaining 3 bits other than the packet type element and the signaling type field of the fixed header part may be used as the segment ID. If the signaling type is GSE-LLC, the extended header of 2 bytes may be added, and may also be composed of Seg_SN (Segment Sequence Number) of 4 bits and the length field of 12 bits.

GSE-LLC according to an embodiment is an abbreviation of Generic Stream Encapsulation Logical Link Control, and may indicate one of two affiliated layers of the data link layer of the OSI model.

FIG. 64 shows the meaning of values denoted by the signaling type field, and contents of a fixed header and an extended header located behind the signaling type field.

If the signaling type field according to an embodiment indicates '00B', the field subsequent to the signaling type field may not be present.

If the signaling type field according to an embodiment indicates '01B', the Concatenation Count (Count) field may be located behind the signaling type field. The Concatenation Count (Count) field may be present only when the descriptor instead of the section table is transmitted as signaling information. The Concatenation Count (Count) field may indicate how many descriptors are contained in payload of the link layer packet. A detailed description of the Concatenation Count (Count) will hereinafter be disclosed.

If the signaling type field according to an embodiment indicates '11B', the Seg_ID (Segment ID) field, the Seg_SN (Segment Sequence Number) field, and/or the length field may be located subsequent to the signaling type field. In case of LLC signaling data capable of being transmitted using DVB GSE, the LLC signaling data may be autonomously segmented. When LLC data is segmented, the Seg_ID (Segment ID) field may indicate an ID for identifying the segmented data. If segments of the transmitted LLC data are integrated into one, the receiver may recognize that the segments of individual LLC data pieces are constituent elements of the same LLC data using the Seg_ID (Segment ID) field. The Seg_ID (Segment ID) field is 3 bits long, and may identify 8 segments (or 8 segmentations). If the Seg_SN (Segment Sequence Number) field is segmented, it may also indicate the order of respective segments. Since the index of the corresponding data table is contained in the front part of LLC data, individual segments generated when the receiver receives the packet must be sequentially aligned at all times. Although the link layer packets having payload segmented from one LLC data have the same Seg_ID, the link layer packets may have different segment sequence numbers (Seg_SN), and may be 4 longs long. One LLC data may be divided into a maximum of 16 segments. The length field may indicate the length of LLC data corresponding to the payload of the current link layer packet in bytes. Accordingly, a total length of the link layer packet may be denoted by "header length (3 bytes)+Value denoted by the length field".

DVB_GSE is an abbreviation of DVB-Genneric Stream Encapsulation, and may indicate the data link layer protocol defined by DVB.

FIG. 65 shows the number of descriptors contained in payload of the link layer packet according to a concatenation count field value according to an embodiment of the present invention.

As many descriptors as the number of specific numerals each being denoted by "Concatenation Count (Count) field value+1" may construct payload of a single link layer packet. Accordingly, since the number of bits allocated to the Concatenation Count (Count) field is 3, a maximum of 8 descriptors may be composed of one link layer packet.

FIG. 66 is a conceptual diagram illustrating a process for encapsulating the section table into payload when signaling information input to the payload of the link layer packet is a section table.

In accordance with one embodiment of the present invention, one section table may be used as the payload of the link layer packet without change. In this case, a value indicated by the packet type element may be 110B (signaling), and a value indicated by the signaling type field may be 00B (section table). The remaining 3 bits other than the packet type element and the signaling type field of the fixed header may be reserved for subsequent use.

The field contained in the section table according to an embodiment may include a field indicating the length of the corresponding section. The field indicating the length of the corresponding section may always be located at the same position, and the field shifted from the beginning of the payload of the link layer packet by a predetermined offset is confirmed, so that the payload length can be confirmed. In case of the section table, the section_length (section_length) field of 12 bits may be present at a specific position corresponding to movement of 12 bits on the basis of the beginning part of payload. The section_length_field may indicate the length from a part subsequent to the section_length_field to the last part of the section. Therefore, a specific part not contained in the section_length_field and the header length of the link layer packet are added to a specific value indicated by the section_length_field, so that the length of a total link layer packet can be derived. In this case, the part (3 bytes) not contained in the section_length_field may include a length of the table ID field (table_id field) and a length of the section_length_field (section_length_field) of the section table. The header length of the link layer packet may be 1 byte long. That is, the total length of the link layer packet may be identical to "4 bytes+Value denoted by the section_length_field".

If the receiver according to the embodiment receives the link layer packet including the section table, the receiver may obtain/use information regarding the corresponding section table through the table ID field (table_id field) of 8 bits located subsequent to the fixed header of the link layer packet.

FIG. 67 is a conceptual diagram illustrating a syntax of a network information table (NIT) according to an embodiment of the present invention.

In accordance with the embodiment of the present invention, if the section table for signaling is contained in payload of the link layer packet and the resultant section able is transmitted, a network information table indicating information related to the current broadcast network may be contained as the section table in the payload of the link layer packet.

The network information table according to the embodiment may include a table_id field, a section_syntax_indicator field, a section_length_field, a network_id field, a version_number field, a current_next_indicator field, a section_number field, a last_section_number field, a network_descriptors_length_field, a descriptor( ) field, a transport_stream_loop_length_field, a broadcast_id field, an original_network_id field, a delivery_system_descriptor_length_field, and/or a delivery_system_descriptor( ) field.

From among a plurality of fields contained in the network information table according to the embodiment, some fields having the same titles as the fields described in the drawing showing a general format of the above-mentioned section table may be replaced with the above-mentioned description.

The network_id field may indicate a unique ID of the broadcast network being currently used.

The network_descriptors_length_field may indicate the length of descriptor indicating the network associated information at the network level.

The descriptor( ) may indicate a descriptor showing the network associated information at a network level.

The transport_stream_loop_length_field may indicate the length of stream associated information that is transmitted on the broadcast network.

The broadcast_id field may indicate a unique ID of a broadcast station existing in the broadcast network.

The original_network_id_field may indicate a unique ID of the broadcast network having been originally used. If the originally used broadcast network is different from the current broadcast network, NIT may include information regarding the broadcast network that has been originally used through the original_network_id_field.

The delivery_system_descriptor_length_field may indicate the length of the descriptor indicating detailed information related to the delivery_system (delivery_system) on the current broadcast network.

The delivery_system_descriptor( ) may indicate a descriptor including detailed information associated with the delivery_system (delivery_system) on the current broadcast network.

FIG. 68 is a conceptual diagram illustrating a syntax of a delivery_system_descriptor contained in a network information table (NIT) according to an embodiment of the present invention.

Referring to FIG. 68, the delivery_system_descriptor according to the embodiment may include information of Physical Layer Pipe (PLP) configured to transmit signaling data related to data transferred from a specific broadcast station on the transmit (Tx) system.

The delivery system descriptor may include a descriptor_tag field, a descriptor length_field, a delivery_system_id field, a base_PLP_id field, a base_PLP_version field, and/or a delivery_system_parameters( ) field.

The descriptor_tag field may indicate an identifier for indicating that the corresponding descriptor is a delivery system descriptor.

The descriptor_length field may indicate the length of the corresponding descriptor.

The delivery_system_id field may indicate a unique delivery system ID of the broadcast network.

The base_PLP_id field may indicate a representative PLP (Physical Layer Pipe) for decoding components of the broadcast service transmitted from a specific broadcast station identified by 'broadcast_id'. In this case, PLP may indicate a data pipe of a physical layer, and may include PSI/SI information or the like in a broadcast service transmitted from a specific broadcast station.

The base_PLP_version field may indicate version information according to variation of data transmitted through PLP identified by 'base_PLP_id'. For example, if service signaling such as PSI/SI is transferred through base_PLP, the base_PLP_version field value may be increased by one whenever the service signaling is changed.

The delivery_system_parameters( ) field may include parameters for indicating characteristics of the broadcast delivery system. The parameters may include a bandwidth, a guard interval, a transmission mode, a center frequency, etc.

FIG. 69 is a conceptual diagram illustrating a syntax of a fast information table (FTT) according to an embodiment of the present invention.

In accordance with one embodiment, if the section table for signaling is contained in payload of the link layer packet and is then transmitted, a fast information table (FIT) may be contained as a section table in the payload of the link layer packet. The receiver according to an embodiment may quickly and easily scan and obtain the broadcast service through the fast information table (FIT).

The fast information table (FIT) may include a table_id field, a private_indicator field, a section_length field, a table_id_extension field, a FIT_data_version field, a current_ next_indicator field, a section_number field, a last_ section_ number field, a num_broadcast field, a broadcast_id field, a delivery_system_id_field, a base_PLP_id field, a base_PLP_version field, a num_service field, a service_id field, a service_category field, a service_hidden_flag field, an SP_indicator field, a num_component field, a component_ id field, and/or a PLP_id field.

From among a plurality of fields contained in the fast information table (FIT) according to the embodiment, some fields having the same titles as the fields described in the drawing showing a general format of the above-mentioned section table may be replaced with the above-mentioned description.

The table_id field may indicate that the corresponding table includes information related to quick scanning of the service and the corresponding table corresponds to the fast information table (FIT).

The private_indicator field may always be set to 1.

The table_id_extension field may correspond to some parts of the table_id_field, and provide a scope for the remaining fields.

The FIT_data_version field may indicate version information of the syntax and semantics contained in the fast information table (FIT). The receiver according to the embodiment may decide whether signaling information contained in the corresponding table is processed using the FIT_data_version field.

The num_broadcast field may indicate the number of broadcast stations configured to transmit a broadcast service or content through a frequency or a transmitted transport frame.

The broadcast_id field may indicate a unique ID of the broadcast station configured to transmit a broadcast service or content through a field frequency or a transmitted transport frame. In case of the broadcast station configured to transmit MPEG-2 TS based data, the broadcast_id field may include the same value as in 'transport_stream_id" of MPEG-2 TS.

The delivery_system_id_field may indicate an identifier of the broadcast delivery system configured to use the same transmit parameter on the broadcast network.

The base_PLP_id field may indicate an identifier of PLP configured to transmit the broadcast service signaling information transferred from a specific broadcast station identified by 'broadcast_id'. The base_PLP_id field may indicate a representative PLP for decoding components of the broadcast service transmitted from a specific broadcast station identified by 'broadcast_id'. In this case, PLP may indicate a data pipe of the physical layer, and may include PSI/SI information in the broadcast service transferred from a specific broadcast station.

The base_PLP_version field may indicate version information according to variation of data transmitted through PLP identified by 'base_PLP_id'. For example, if service signaling information such as PSI/SI is transferred through 'base_PLP', the base_PLP_version field value may be increased by one whenever the service signaling information is changed.

The num_service field may indicate the number of broadcast services transferred from a broadcast station identified by 'broadcast_id' within the corresponding frequency or a transport frame.

The service_id field may indicate an ID for identifying the broadcast service.

The service_category field may indicate a category of the broadcast service. For example, if the service_category field value is 0x01, this means Basic TV. If the service_category field value is 0x02, this means Basic Radio. If the service_ category field value is 0x03, this means RI service. If the service_category field value is 0x08, this means Service Guide. If the service_category field value is 0x09, this means Emergency Alerting.

The service_hidden_flag field may indicate whether the corresponding broadcast service is hidden or not. If the corresponding broadcast service is hidden, the corresponding service may correspond to a test service or a service being autonomously used, so that the receiver according to the embodiment may disregard the above-mentioned hidden broadcast service or may allow the hidden broadcast service to be hidden from the service list.

The SP_indicator field may indicate whether service protection is applied to one or more components of the corresponding broadcast service.

The num_component field may indicate the number of components contained in the corresponding broadcast service.

The component id_field may indicate an ID for identifying the corresponding component of the broadcast service.

The PLP_id field may indicate an identifier for identifying PLP through which the corresponding component is transmitted within the broadcast service.

FIG. 70 is a conceptual diagram illustrating a process for encapsulating a descriptor into payload when signaling information input to payload of the link layer packet is a descriptor.

In accordance with one embodiment, one or more descriptors may be contained in the payload of the link layer packet. In this case, a value indicated by the packet type element is set to 110B (signaling), and a value indicated by the signaling type field may be set to 01B (descriptor). In FIG. 70, the remaining 3 bits other than the packet type element and the signaling type field of the fixed header may indicate a count field that indicates how many descriptors are contained in the payload of a single link layer packet. The payload of the single link layer packet may include a maximum of 8 descriptors.

In accordance with one embodiment, all descriptors may include a descriptor tag field of 1 byte and a descriptor_ length field of 1 byte in the beginning part of the descriptor. In accordance with one embodiment, the length of a concatenated packet can be calculated using the descriptor_ length field. The descriptor_length field is always located at the same position within the descriptor, such that a field located at a specific position shifted from the beginning part of the payload of the link layer packet by a predetermined offset is confirmed and therefore the payload length can be confirmed. In case of the descriptor, the descriptor_length field of 8 bits at a specific position shifted from the beginning part of the payload by 8 bits may be present. The descriptor length_field may indicate the length from a part located behind the corresponding field to the last part of the descriptor. Therefore, "the length (1 byte) of the descriptor_tag field not contained in the descriptor_length field+the length (1 bytes) of the descriptor_length field" are added to a specific value denoted by the descriptor_length field, so that the length of one descriptor can be derived. As many descriptor lengths as the number of descriptors indicated by the count field are added so that the length of a total link layer packet can be derived. For example, a second descriptor contained in the payload of the link layer packet according to an embodiment may start from a specific position shifted from the beginning part of the payload by the length of a first descriptor, the descriptor_length field of the second descriptor is located at a specific position shifted from the beginning part of the second descriptor by a predetermined offset, and the descriptor_length field field is confirmed, so that the total length of the second descriptor can be derived. By the above-mentioned processes, the length of each descriptor contained in the payload of the link layer packet may be calculated, and the header length of the link layer packet is added to the sum of the lengths of individual descriptors, so that a total length of the link layer packet can be calculated.

If the receiver receives the link layer packets including one or more descriptors, the receiver may obtain/use the signaling information contained in each descriptor through the 8-bit descriptor_tag field value contained in each descriptor.

FIG. 71 is a conceptual diagram illustrating a syntax of a fast information descriptor according to an embodiment of the present invention.

In accordance with the embodiment, if the descriptor for signaling is contained in the payload of the link layer packet and then transmitted, the fast information descriptor may be contained in the payload of the link layer packet. The receiver may quickly and easily scan and obtain the broadcast service through the fast information descriptor.

The fast information descriptor according to an embodiment may include a descriptor_tag field, a descriptor_length field, a num_broadcast field, a broadcast_id field, a delivery_system_id field, a base_PLP_id field, a base_PLP_version field, a num_service field, a service_id field, a service_category field, a service_hidden_flag field, and/or an SP_indicator field.

From among a plurality of fields contained in the fast information descriptor according to the embodiment, some fields having the same titles as the fields described in the drawing showing a general format of the above-mentioned section table may be replaced with the above-mentioned description.

The descriptor_tag field may indicate a fast information descriptor indicating that the corresponding descriptor includes information related to quick service scanning The descriptor_length field may indicate the length of the corresponding descriptor.

FIG. 72 is a conceptual diagram illustrating a delivery system descriptor according to an embodiment of the present invention.

In accordance with one embodiment, if the descriptor for signaling is contained in the payload of the link layer packet and then transmitted, the delivery system descriptor may be contained in the payload of the link layer packet. The delivery system descriptor may include information regarding PLP (Physical Layer Pipe) configured to transmit signaling data related to data transferred from a specific broadcast station on the transmit (Tx) system.

The delivery system descriptor according to the embodiment may include a descriptor_tag field, a descriptor_length field, a delivery_system_id field, a num_broadcast field, a base_PLP_id field, a base_PLP_version field, a delivery_system_parameters_length_field, and/or a delivery_system_parameters( ) field.

The descriptor_tag may indicate that the corresponding descriptor is a delivery system descriptor.

The descriptor_length field may indicate the length of the corresponding descriptor.

The delivery_system_id field may indicate an ID for identifying a delivery system configured to transmit the same transmit (Tx) parameters on the broadcast network.

The num_broadcast field may indicate the number of broadcast stations configured to transmit a broadcast service or content through a frequency or a transmitted transport frame.

The base_PLP_id field may indicate a representative PLP (Physical Layer Pipe) for decoding constituent components of the broadcast service transferred from a specific broadcast station identified by 'broadcast_id'. In this case, PLP may denote a data pipe of the physical layer, and may include PSI/SI information in the broadcast service transferred from a specific broadcast station.

The base_PLP_version field may indicate version information according to variation of data transferred through PLP identified by base_PLP_id. For example, if service signaling such as PSI/SI is transferred through base_PLP, the base_PLP_version field value may be increased by one whenever the service signaling is changed.

The delivery_system_parameters_length field may indicate the length of delivery_system_parameters( ) subsequent to the corresponding field.

The delivery_system_parameters( ) field may include parameters for indicating characteristics of the broadcast delivery system. The parameters may include a bandwidth, a guard interval, a transmission mode, a center frequency, etc.

The delivery system descriptor according to the embodiment may be contained in the network information table (NIT) and then transmitted.

If the delivery system descriptor is contained in the network information table (NIT) and then transmitted, a syntax of the delivery system descriptor has already been disclosed in the detailed description of the network information table (NIT).

FIG. 73 is a conceptual diagram illustrating a process for encapsulating one GSE-LLC datum into payload of one link layer packet when signaling information input to payload of the link layer packet has a GSE-LLC format used in DVB-GSE.

LLC data according to one embodiment may be classified into an index part and a record part. The record part may also be classified into a few tables. In this case, the table constructing the record part may have a GSE table structure, and may also have a general section table structure.

In FIG. 73, one LLC datum may be used as payload of a single link layer packet. In this case, a value indicated by the packet type element may be 110B (signaling), and a value indicated by the signaling type field may be 11B (GSE-LLC). If GSE-LLC formatted signaling information is transferred, the link layer packet may have an extended header of 2 bytes. The extended header of 2 bytes may be composed of the Seg_SN (segment sequence number) of 4 bytes and the length field of 12 bits. The length field may be assigned a specific value indicating a total length of the link layer packet according to a system structure, or may also be assigned a value indicating the payload length of the link layer packet.

FIG. 74 is a conceptual diagram illustrating a process for encapsulating one GSE-LLC datum into payload of several link layer packets when signaling information input to payload of the link layer packet has a GSE-LLC format used in a DVB-GSE standard.

If LLC data is segmented, the Seg_ID fields indicating segmentation from LLC data may have the same value.

The Seg_SN field may include the order of segments in such a manner that the receiver according to the embodiment receives and recombines the segmented LLC data. If one LLC datum is contained in the payload of the single link layer packet, the Seg_SN field may be set to zero (0).

The receiver according to the embodiment may recognize the number of segments of LLC data related to the corresponding Seg_ID through the LLC index part.

FIG. 75 illustrates a header of a link layer packet for Robust Header Compression (RoHC) transmission according to the present invention.

In an Internet Protocol (IP)-based broadcast environment, an IP packet may be compressed into the above-described link layer packet and be transmitted. When streaming is performed in an IP-based broadcast system, information about a header of the IP packet may be rarely changed and maintained. Based on this fact, the header of the IP packet may be compressed.

An RoHC scheme is mainly used to compress the header of the IP packet (which is also referred to as an IP header). The present invention proposes a compression (encapsulation) scheme for a case in which an RoHC packet is input to a link layer.

When the RoHC packet is input to the link layer, the above-described packet type element may have a value $010_B$. The value indicates that a packet delivered from the higher layer to the link layer is a compressed IP packet as described above.

When the RoHC packet is input, the header of the link layer packet may include a fixed header and/or an extended header similarly to the other packets described above.

The fixed header may include a packet type field and/or a packet configuration (PC) field. The fixed header may have a size of 1 byte in total. Here, the packet type field corresponds to a case of the compressed IP packet and thus may have a value of 010. The extended header may have a size which is fixed or varies according to a given embodiment.

The PC field of the fixed header may be a field indicating a form in which the RoHC header included in a payload of the link layer packet is processed. The PC field has a value that may determine information about a remaining portion of the fixed header and the extended header following the PC field. In addition, the PC field may contain length information of the extended header based on the form in which the RoHC header is processed. The PC field may have a size of 1 bit.

A case in which the PC field has a value $0_B$ will be described.

The case in which the PC field has the value $0_B$ corresponds to a case in which the payload of the link layer packet includes one RoHC packet or a concatenation of two or more RoHC packets. The concatenation indicates that several packets having short lengths are connected to each other to form the payload of the link layer packet.

When the PC field has the value $0_B$, the PC field may be followed by a 1-bit common CID indicator (CI) field and a 3-bit count field. In this way, the extended header may be additionally provided with common CID information and a length part. The length part may be a part indicating a length of the RoHC packet.

The CI field may be set to 1 when RoHC packets included in a payload of one link layer packet have the same context ID (CID), and be set to 0 otherwise. When the CI field has a value 1, an overhead processing scheme for a common CID may be applied. The CI field may correspond to 1 bit.

The count field may indicate the number of RoHC packets included in the payload of the one link layer packet. When a concatenation of RoHC packets is included, the number of the RoHC packets may be indicated by the count field. The count field may correspond to 3 bits. Thus, a maximum of eight RoHC packets may be included in the payload of the one link layer packet as shown in Table 34 below. When the count field has a value 000, one RoHC packet rather than the concatenation of RoHC packets is included in the payload of the link layer packet.

TABLE 34

| Count (3bits) | No. of Concatenated RoHC packets |
|---|---|
| 000 | 1 |
| 001 | 2 |
| 010 | 3 |
| 011 | 4 |
| 100 | 5 |
| 101 | 6 |
| 110 | 7 |
| 111 | 8 |

As described in the foregoing, the length part may be a part indicating a length of the RoHC packet. The RoHC packet has an RoHC packet header excluding length information. Thus, it is impossible to use a length field in the RoHC packet header. Therefore, the header of the link layer packet may include the length part to enable a receiver to be aware of a length of the RoHC packet.

When a maximum transmission unit (MTU) is not determined, the IP packet has a maximum length of 65,535 bytes. Thus, 2-byte length information is required to support up to a maximum length of the RoHC packet. When a concatenation of several RoHC packets is included, length fields corresponding to the number designated in the count field may be additionally provided. In this case, the length part may include a plurality of length fields. However, when one RoHC packet is included in the payload, only one length field may be included. The length fields may be arranged in an order of the RoHC packets included in the payload of the link layer packet. Each of the length fields may have a value in bytes.

A common CID field may be a field for transmission of the common CID. The RoHC packet may include a CID for verification of a relation between compressed headers in a header part. The CID may retain the same value in a stable link state. Therefore, all the RoHC packets included in the payload of the one link layer packet may include the same CID. In this case, to reduce overhead, CIDs may be removed from header parts of contiguous RoHC packets included in the payload, and an associated value may be displayed in the common CID field and be transmitted to the header of the link layer packet. The receiver may recombine the CIDs of the RoHC packets using the common CID field. When the common CID field is present, the above-described CI field has a value of 1.

A case in which the PC field has a value $1_B$ will be described.

The case in which the PC field has the value $1_B$ corresponds to a case in which the payload of the link layer packet includes a segmented packet of the RoHC packet. Here, the segmented packet may correspond to a configuration in which the RoHC packet, which is long, is divided into a plurality of segments, and one of the segments is included in the payload of the link layer packet.

When the PC field has the value $1_B$, the PC field may be followed by a 1-bit last segment indicator (LI) field and a 3-bit segment ID field. In addition, to additionally provide information about segmentation, a segment sequence number field, a segment length ID field, a last segment length field, and the like may be additionally provided to the extended header.

The LI field is a field used when the RoHC packet is segmented. The RoHC packet may be divided into a plurality of segments. When an LI has a value 1, a segment currently included in the link layer packet may be a last segment corresponding to one of the segments divided from one RoHC packet. When the LI has a value 0, a segment currently included in the link layer packet may not be the last segment. The LI field may be used to determine whether all the segments are received when the receiver collects the segments to recombine one RoHC packet. The LI field may correspond to 1 bit.

The segment ID (Seg_ID) field may be a field indicating an ID assigned to the RoHC packet when the RoHC packet is segmented. All segments derived from one RoHC packet may have segment IDs corresponding to the same value. When the receiver combines respective transmitted segments into one entity, it is possible to determine whether the segments correspond to elements of the same RoHC packet using the segment IDs. The segment ID field may correspond to 3 bits. Therefore, it is possible to simultaneously support segmentations of eight RoHC packets.

The segment sequence number (Seg_SN) field may be a field used to verify an order of respective segments when the RoHC packet is segmented. That is, link layer packets having segments derived from one RoHC packet as payloads may have the same Seg_ID and have different Seg_SNs. Therefore, the one RoHC packet may be divided into a maximum of 16 segments.

The segment length ID (Seg_Len_ID) field may be used to express a length of each of the segments. However, the segment length ID field may be used to express lengths of a plurality of segments except for the last segment. The length of the last segment may be indicated by the last segment length field to be described below. The segment length ID field may be present when the payload of the link layer packet does not correspond to the last segment of the RoHC packet, that is, the LI has a value 0.

To reduce overhead of the header, a segment may have a length limited to 16. An input size of a packet may be determined based on a code rate of forward error correction (FEC) processed in a physical layer. The segment length may be determined based on the input size and be designated as a Seg_Len_ID. When the physical layer operates irrespective of the segment length, the segment length may be determined as below.

MathFigure 12

$$\text{Segment Length} = \text{Seg\_Len\_ID} \times \text{Len\_Unit} + \text{min\_Len} \quad [bytes] \quad [\text{Math.12}]$$

Here, Len_Unit (Length Unit) is a basic unit for expression of the segment length, and min_Len may refer to a minimum value of the segment length. A transmitter and a receiver have the same values of Len_Unit and min_Len. It is efficient for a system operation when the values do not change after being determined. In addition, Len_Unit and min_Len may be determined based on an FEC processing ability of the physical layer in a system initialization process.

Table 35 summarizes segment lengths expressed based on values of Seg-Len_ID. A length assigned to Seg-Len_ID corresponds to an example and thus the length may be changed according to intent of a designer. In this example, a Len_Unit value is 256, and a min_Len value is 512.

TABLE 35

| Seg_Len_ID | Segment Length (Byte) | Seg_Len_ID | Segment Length (Byte) |
|---|---|---|---|
| 0000 | 512 (= min_Len) | 1000 | 2560 |
| 0001 | 768 | 1001 | 2816 |
| 0010 | 1024 | 1010 | 3072 |
| 0011 | 1280 | 1011 | 3328 |
| 0100 | 1536 | 1100 | 3584 |
| 0101 | 1792 | 1101 | 3840 |
| 0110 | 2048 | 1110 | 4096 |
| 0111 | 2304 | 1111 | 4352 |

The last segment length (L_Seg_Len) field is a field used when a segment included in the payload of the link layer packet is the last segment of the RoHC packet. That is, the last segment length_field is a field used when the LI field has a value 1. The RoHC packet may be divided equally from the front part using Seg_Len_ID. In this case, the last segment may not have a size indicated by Seg_Len_ID. Therefore, the last segment may have a length directly indicated by the L_Seg_Len field. The L_Seg_Len field may indicate 1 to 4,095 bytes. This may be changed depending on an embodiment.

FIG. 76 illustrates Embodiment #1 of a method of transmitting an RoHC packet using a link layer packet, according to the present invention.

The present embodiment corresponds to a case in which RoHC packets are within a processing range of a physical layer and thus one RoHC packet is included in a payload of the link layer packet. In this case, the RoHC packets are concatenated and may not be segmented.

In this case, the one RoHC packet may become the payload of the link layer packet without change. A packet type may have a value $010_B$, a PC field may have a value $0_B$, and a CI field may have a value $0_B$. The above-described count field may have a value $000_B$ as described in the foregoing since the one RoHC packet forms the (one) payload without change. The count field may be followed by a 2-byte length field indicating a length of an RoHC packet. Only one packet is included in the payload and thus a length part may include only one length field.

In the present embodiment, a link layer header corresponding to 3 bytes in total may be additionally provided. Therefore, when the RoHC packet has a length of L bytes indicated by the length field, the link layer packet has a length of L+3 bytes in total.

FIG. 77 illustrates Embodiment #2 of a method of transmitting an RoHC packet using a link layer packet, according to the present invention.

The present embodiment corresponds to a case in which RoHC packets are out of a processing range of a physical layer and thus a plurality of RoHC packets are concatenated and included in a payload of the link layer packet.

In this case, a PC field and a CI field have values corresponding to a case in which one RoHC packet is included in the payload. The PC field and the CI field are followed by a count field. As described in the foregoing, the count field may have a value in a range of $001_B$ to $111_B$ depending on the number of RoHC packets included in the payload.

Thereafter, 2-byte length fields corresponding to the number indicated by the count field may be positioned. Each of the length fields may indicate a length of each of the RoHC packets. The length fields may be referred to as a length part.

Here, when the number indicated by the count field is n, RoHC packets $R_1$, $R_2$, . . . , and $R_n$ having lengths $L_1$, $L_2$, . . . , and $L_n$, respectively, may be concatenated in the payload of the link layer packet.

An extended header may have a length of 2n bytes in total. A total length $L_T$ of the link layer packet may be expressed by the following Equation.

MathFigure 13

$$L_T = 1 + 2n + \sum_{k=1}^{n} L_k \quad \text{[bytes]} \qquad \text{[Math. 13]}$$

FIG. 78 illustrates Embodiment #3 of a method of transmitting an RoHC packet using a link layer packet, according to the present invention.

The present embodiment corresponds to a case in which a plurality of RoHC packets are connected to each other (concatenated) to form a payload of the link layer packet, and the concatenated RoHC packets have the same CID.

When the RoHC packets have the same CID, and a CID is indicated and transmitted once, a receiver may restore the RoHC packets and headers of the RoHC packets. Therefore, a CID common to the RoHC packets may be extracted and transmitted once. In this instance, overhead may be reduced.

In this case, the above-described CI field has a value 1, which indicates that the same CID is processed. The RoHC packets having the same CID are indicated by [$R_1$, $R_2$, $R_3$, . . . , $R_n$]. The CID common to the RoHC packets may be referred to as a common CID. A packet corresponding to an RoHC packet excluding a CID from a header is indicated by R'k (k is 1, 2, . . . , or n).

The payload of the link layer packet may include R'k (k is 1, 2, . . . , or n). A common CID field may be additionally provided to a tail of an extended header of the link layer packet. The common CID field may be a field for transmission of the common CID. The common CID field may be transmitted as a portion of the extended header or as a portion of the payload of the link layer packet. Depending on a system operation, the common CID field may be appropriately rearranged at a portion for verification of a position.

The common CID field may have a size varying according to a configuration of the RoHC packet.

When the configuration of the RoHC packet corresponds to a small CID configuration, the RoHC packet may have a CID size of 4 bits. When rearrangement is performed by extracting a CID from the RoHC packet, the entire add-CID octet may be processed. That is, the common CID field may have a length of 1 byte. Alternatively, after extracting a 1-byte add-CID octet from the RoHC packet, only a 4-bit CID may be assigned to the common CID field, and the remaining 4-bit CID may be reserved to be used later.

When the configuration of the RoHC packet corresponds to a large CID configuration, the RoHC packet may have a CID size of 1 byte or 2 bytes. The CID size is determined in an RoHC initialization process. Depending on the CID size, the common CID field may have a length of 1 byte or 2 bytes.

In the present embodiment, the payload of the link layer packet may have a length calculated as below. Lengths of n RoHC packets $R_1$, $R_2$, . . . , and $R_n$ having the same CID may be referred to as $L_1$, $L_2$, . . . , and $L_n$, respectively. When the header of the link layer packet has a length $L_H$, the common CID field has a length $L_{CID}$, and the link layer packet has an entire length $L_T$, $L_H$ is as below.

MathFigure 14

$$L_H = 1 + 2n + L_{CID} \text{ bytes} \qquad \text{[Math.14]}$$

In addition, $L_T$ may be calculated as below.

MathFigure 15

$$L_T = L_H + \sum_{k=1}^{n} (L_k - L_{CID}) \quad \text{bytes} \qquad \text{[Math. 15]}$$

As described in the foregoing, $L_{CID}$, may be determined based on a CID configuration of the RoHC packet. That is, $L_{CID}$ may be 1 byte for the small CID configuration, and may be 1 byte or 2 bytes for the large CID configuration.

FIG. 79 illustrates Embodiment #4 of a method of transmitting an RoHC packet using a link layer packet, according to the present invention.

The present embodiment corresponds to a case in which respective divided segments are compressed (encapsulated) into a payload of a link layer packet when an input RoHC packet is out of a processing range of a physical layer.

A PC field has a value $1_B$ to report that the payload of the link layer packet includes a divided RoHC packet. An LI field has a value $1_B$ only when a segment corresponding to a last portion of the RoHC packet is included as the payload, and has a value $0_B$ for all the other segments. The LI field value reports information about an extended header of the link layer packet. That is, an extended header having a length of 1 byte may be additionally provided when the LI field has a value $0_B$, and an extended header having a length of 2 bytes may be additionally provided when the LI field has a value $1_B$.

All Seg_IDs have the same value to indicate segments divided from the same RoHC packet. Successively increasing Seg_SN values may be recorded in a header to indicate order information of segments for normal recombination of the RoHC packet in a receiver.

When the RoHC packet is divided, segmentation may be performed by determining lengths of segments as described above. A value of a Seg_Len_ID matching a length may be recorded in the header. As described in the foregoing, a length of a last segment may be directly recorded in an L_Seg_Len field having 12 bits.

Length information indicated using the Seg_Len_ID and the L_Seg_Len field may indicate only information about a segment, that is, the payload of the link layer packet. Therefore, length information of the entire link layer packet may be obtained by adding a header length of the link layer packet which may be obtained using the LI field.

In a process of recombining the segments of the RoHC packet at a receiving side, integrity of the recombined RoHC packet needs to be verified. To this end, cyclical redundancy check (CRC) may be additionally provided at a tail of an IP packet in a segmentation process. In general, CRC is additionally provided in a last part of the RoHC packet and thus CRC may be included in the last segment after the segmentation process.

FIG. 80 illustrates a header of a link layer packet for RoHC transmission according to an embodiment of the present invention when an MTU is 1,500.

In general, an RoHC scheme may be applied during video and audio streaming. In this instance, an MTU of an IP packet may be set to 1,500 bytes, which indicates that an RoHC packet has a length less than 1,500 bytes.

As described in the foregoing, a PC field of a fixed header may be a field that indicates a form in which an RoHC packet included in a payload of the link layer packet is processed. Information about a remaining portion of the fixed header and an extended header following the PC field may be determined based on a value of the PC field. In addition, the PC field may include length information of the extended header based on the form in which the RoHC packet is processed. The PC field may have a size of 1 bit.

A case in which the PC field has a value $0_B$ will be described.

The case in which the PC field has the value $0_B$ corresponds to a case in which the payload of the link layer packet includes one RoHC packet or segmented packets of the RoHC packet. The PC field may be followed by an SI field. The SI field may indicate whether the payload of the link layer packet includes one RoHC packet or segments of the RoHC packet. The fixed header and the extended header may have fields determined based on a value of the SI field.

As described in the foregoing, the SI field may be a field which indicates whether the payload of the link layer packet includes one RoHC packet or segments of the RoHC packet. The SI field having a value 0 may indicate that the payload of the link layer packet includes one RoHC packet, and the SI field having a value 1 may indicate that the payload of the link layer packet includes segments of the RoHC packet. The SI field may correspond to 1 byte.

A Seg_ID field may be a field which indicates an ID assigned to the RoHC packet when the RoHC packet is segmented. This field is the same as the Seg_ID field described above.

A Seg_SN field may be a field used to verify an order of respective segments when the RoHC packet is segmented. This field is the same as the Seg_SN field described above.

An LI field may be a field which indicates whether a segment included in a current link layer packet is a last segment among segments divided from the RoHC packet when the RoHC packet is segmented. This field is the same as the LI field.

A Seg_Len_ID field may be used to express lengths of respective segments. This field is the same as the Seg_Len_ID field described above. However, unlink the case described above, the segments may restrictively have 8 lengths rather than 16 lengths. In this case, lengths of the segments expressed based on values of Seg_Len_ID may be summarized as Table 36 below. A length assigned to Seg_Len_ID is merely an example, and may be changed according to intent of a designer. In the present embodiment, a Len_Unit value is 64, and a min_Len value is 256.

TABLE 36

| Seg_Len_ID | Segment Length (Byte) | Seg_Len_ID | Segment Length (Byte) |
|---|---|---|---|
| 0000 | 256 (= min_Len) | 100 | 512 |
| 0001 | 320 | 101 | 576 |
| 0010 | 384 | 110 | 640 |
| 0011 | 448 | 111 | 704 |

An L_Seg_Len field may be used to express a length of the last segment. This field is the same as the L_Seg_Len field described above. However, unlink the case described above, the L_Seg_Len field may indicate 1 to 2,048 bytes. This may be changed according to an embodiment.

A case in which the PC field has a value $1_B$ will be described.

The case in which the PC field has the value $1_B$ corresponds to a case in which the payload of the link layer packet includes a concatenation of two or more RoHC packets. The PC field may be followed by a 1-bit CI field and a 3-bit count field. In this way, the extended header may be additionally provided with common CID information and a length part.

The CI field is a field which indicates whether RoHC packets included in a payload of one link layer packet have the same CID. The CI field is as described above.

The count field may indicate the number of RoHC packets included in the payload of the one link layer packet. Unlike the count field described above, a value 000 is assigned to indicate a concatenation of two RoHC packets. When the count field has a value 111, a concatenation of nine of more RoHC packets may be indicated. Count field values are summarized as the following Table 37.

TABLE 37

| Count (3bits) | No. of Concatenated RoHC packets (MTU = 1500 bytes) |
|---|---|
| 000 | 2 |
| 001 | 3 |
| 010 | 4 |
| 011 | 5 |
| 100 | 6 |
| 101 | 7 |
| 110 | 8 |
| 111 | 9 or more packets, Extended length field is used |

The length part may be a part for indication of a length of the RoHC packet. The length part may include a plurality of length fields as described above. Each of the length fields may indicate a length of each RoHC packet.

In the present embodiment, an MTU corresponds to 1,500 bytes and thus 11 bits corresponding to a minimum bit for indication of the MTU may be assigned to a length field. Since 11 bits may indicate up to 2,048 bytes, a scheme proposed in the present invention may be used even when the MTU is extended up to 2,048 bytes as necessary. The length field may directly indicate a length, and indicate the length by mapping the length to a separate value. As described in the foregoing, length fields corresponding to the number designated in the count field may be additionally provided.

An extended length part may be used to indicate a length of a ninth RoHC packet or an RoHC packet after the ninth RoHC packet when nine of more RoHC packets are concatenated. That is, the extended length part may be used when the count field has a value $111_B$. The extended length part may include an 11-bit length field and a 1-bit X field. The two fields may be alternately positioned.

A common CID field may be a field for transmission of a common CID. This field may be the same as the common CID field described above.

FIG. 81 illustrates Embodiment #1 of a method of transmitting an RoHC packet using a link layer packet when an MTU is 1,500 according to the present invention.

The present embodiment may correspond to a case in which a PC field has a value 1 and a count field has a value other than $111_B$ when the MTU is 1,500.

In this case, a length part may have length fields corresponding to the number designated by a count field value as described above. Since one length field corresponds to 11 bits, a padding bit may be additionally provided depending on the number of the length fields. That is, when the number designated by the count field is set to k, and a size of the one length field is set to s (bits), a length $L_{LP}$ of the entire length part may be calculated as below.

MathFigure 16

$$L_{LP} = \left\lceil \frac{k \times s}{8} \right\rceil \text{ [Bytes]} \qquad \text{[Math. 16]}$$

In addition, a size of the padding bit additionally provided to the length part may be calculated as below.

MathFigure 17

$$L_{padding} = (8 \times L_{LP})(k \times s)\text{[Bits]} \qquad \text{[Math.17]}$$

As described in the foregoing, the length s of the length field may be 11 bits, which may be used to summarize the sizes of the length part and the padding bit as below.

TABLE 38

| Count (3bits) | No. of Concatenated RoHC packets (MTU = 1500 bytes) | Size of Length Part (Bytes) | Size of Padding (bits) |
|---|---|---|---|
| 000 | 2 | 3 | 2 |
| 001 | 3 | 5 | 7 |
| 010 | 4 | 6 | 4 |
| 011 | 5 | 7 | 1 |
| 100 | 6 | 9 | 6 |
| 101 | 7 | 10 | 3 |
| 110 | 8 | 11 | 1 |

FIG. 82 illustrates Embodiment #2 of a method of transmitting an RoHC packet using a link layer packet when an MTU is 1,500 according to the present invention.

The present embodiment may correspond to a case in which a PC field has a value 1 and a count field has a value $111_E$ when the MTU is 1,500. In this case, an extended length part may be additionally provided as described above.

A length part positioned in front of the extended length part includes eight 11-bit length fields and thus may have a length of 11 bytes in total. Since the count field has the value 111, the extended length part needs to include at least one length field.

As described in the foregoing, the extended length part may include an 11-bit length field and a 1-bit X field. The two fields may be alternately positioned. The length field of the extended length part may be operated similarly to the length fields of the length part.

The X field may be a field which indicates whether the X field is additionally followed by a length field. When the X field has a value 0, no length field may be additionally provided. When the X field has a value 1, the X field may be followed by at least one length field and an X field. Therefore, the extended length part may continuously increase until the X field has the value 0. RoHC packets equal in number to X fields may be additionally positioned in a payload.

When the number of X fields having the value 1 is set to m and a size of one length field is set to s (bits) in the extended length part, a length $L_{ELP}$ of the extended length part may be calculated as below.

MathFigure 18

$$L_{ELP} = \left\lceil \frac{(m+1) \times (s+1)}{8} \right\rceil \text{ [Bytes]} \qquad \text{[Math. 18]}$$

The extended length part may also have a padding bit for processing in bytes. The padding bit additionally provided in the extended length part may have a size calculated as below.

MathFigure 19

$$L_{e\_padding} = (8 \times L_{ELP}) - ((m+1) \times (s+1))\text{[Bits]} \qquad \text{[Math.19]}$$

A padding bit of 4 bits may be additionally provided when the number of length fields is an odd number, and no padding bit may be additionally provided when the number of length fields is an even number.

FIG. 83 illustrates Embodiment #3 of a method of transmitting an RoHC packet using a link layer packet when an MTU is 1,500 according to the present invention.

The present embodiment may correspond to a case in which RoHC packets are within a processing range of a physical layer and thus one RoHC packet is included in a payload of the link layer packet.

In this case, the one RoHC packet may be the payload of the link layer packet without change. A packet type may have a value $010_B$, a PC field may have a value $0_B$, and an SI field may have a value $0_B$. The above-described length part may follow the PC and SI fields. Here, the length part may have one length field. The length field may correspond to 11 bits. 3 bits of a fixed header and 1 byte of an extended header may be used for the one 11-bit length field.

In this case, a link layer header having 2 bytes in total is additionally provided. Therefore, when the RoHC packet indicated by the length field has a length of L bytes, the link layer packet has a total length of L+2 bytes.

FIG. 84 illustrates Embodiment #4 of a method of transmitting an RoHC packet using a link layer packet when an MTU is 1,500 according to the present invention.

The present embodiment may correspond to a case in which respective divided segments are compressed (encapsulated) into a payload of the link layer packet when the MTU is 1,500 and an input RoHC packet is out of a processing range of a physical layer.

An SI field may have a value 1 to indicate segmentation.

As described in the foregoing, Seg_IDs have the same value, and Seg_SNs have successively increasing values. An LI field has a value 1 for a last segment and has a value 0 otherwise. In addition, Seg_Len_ID and L_Seg_Len fields may be used to indicate a length of each segment. A detailed scheme of indicating a length may be similar to that described above.

Length information of the entire link layer packet may be obtained by adding a header length of the link layer packet which may be obtained using the LI field. In addition, CRC may be additionally provided to verify integrity in a process of recombining the segments of the RoHC packet at a receiving side. The CRC may be additionally provided to the last segment.

FIG. 85 illustrates Embodiment #5 of a method of transmitting an RoHC packet using a link layer packet when an MTU is 1,500, according to the present invention.

The present embodiment may correspond to a case in which RoHC packets are out of a processing range of a physical layer and thus a plurality of RoHC packets are concatenated and included in a payload of the link layer packet when the MTU is 1,500.

The present embodiment may correspond to a case in which eight or less RoHC packets are concatenated. In this case, an extended length part may not be needed. A PC field may have a value 1, and a CI field may have a value 0. A count field may have a value in a range of $000_B$ to $110_B$ as described above.

Here, when a value indicated by the count field is n, RoHC packets $R_1, R_2, \ldots,$ and $R_n$, having lengths $L_1, L_2, \ldots,$ and $L_n$, respectively, may be concatenated in the payload of the link layer packet. Each length field may have a length of 11 bits. A padding bit may be positioned at a tail of the length field as necessary.

A length $L_T$ of the entire link layer packet is as below.

MathFigure 20

$$L_T = 1 + L_{LP} + \sum_{k=1}^{n} L_k \quad \text{[bytes]} \qquad \text{[Math. 20]}$$

Here, $L_{LP}$ may denote a length of the entire length part, and $L_K$ may denote a length of each RoHC packet.

FIG. 86 illustrates Embodiment #6 of a method of transmitting an RoHC packet using a link layer packet when an MTU is 1,500, according to the present invention.

The present embodiment may correspond to a case in which RoHC packets are out of a processing range of a physical layer and thus a plurality of RoHC packets are concatenated and included in a payload of the link layer packet when the MTU is 1,500.

However, the present embodiment may correspond to a case in which nine or more RoHC packets are concatenated. In this case, an extended length part may be needed in addition to a length part. As described in the foregoing, a count field may have a value 111.

When the number of X fields, each of which has a value 1, is set to m in the extended length part, the number n of RoHC packets concatenated in the payload of the link layer packet is 8+(m+1). In this instance, a length $L_T$ of the entire link layer packet is as follows.

MathFigure 21

$$L_T = 1 + L_{LP} + L_{ELP} + \sum_{k=1}^{n} L_k \quad \text{[bytes]} \qquad \text{[Math. 21]}$$

Here, $L_{LP}$ may be a length of the entire length part, and $L_k$ may be a length of each of the RoHC packets. In addition, $L_{ELP}$ may be a length of the entire extended length part.

FIG. 87 illustrates Embodiment #7 of a method of transmitting an RoHC packet using a link layer packet when an MTU is 1,500, according to the present invention.

The present embodiment may correspond to a case in which a plurality of RoHC packets are concatenated to form a payload of the link layer packet when the MTU is 1,500. However, the present embodiment corresponds to a case in which the concatenated RoHC packets have the same CID.

In this case, the above-described CI field has a value 1, which indicates that the same CID is processed. The RoHC packets having the same CID are indicated by $[R_1, R_2, R_3, \ldots, R_n]$. The CID common to the RoHC packets may be referred to as a common CID. A packet corresponding to an RoHC packet excluding a CID from a header is indicated by R'k (k is 1, 2, . . . , or n).

The payload of the link layer packet may include R'k (k is 1, 2, . . . , or n). A common CID field may be additionally provided to a tail of an extended header of the link layer packet. The common CID field may be a field for transmission of the common CID. The common CID field may be transmitted as a portion of the extended header or as a portion of the payload of the link layer packet. Depending on a system operation, the common CID field may be appropriately rearranged at a portion for verification of a position.

The common CID field may have a size varying according to a configuration of the RoHC packet.

When the configuration of the RoHC packet corresponds to a small CID configuration, the RoHC packet may have a CID size of 4 bits. When rearrangement is performed by extracting a CID from the RoHC packet, the entire add-CID octet may be processed. That is, the common CID field may have a length of 1 byte. Alternatively, after extracting a 1-byte add-CID octet from the RoHC packet, only a 4-bit CID may be assigned to the common CID field, and the remaining 4-bit CID may be reserved for later use.

When the configuration of the RoHC packet corresponds to a large CID configuration, the RoHC packet may have a CID size of 1 byte or 2 bytes. The CID size is determined in an RoHC initialization process. Depending on the CID size, the common CID field may have a length of 1 byte or 2 bytes.

In this case, the entire length $L_T$ of the link layer packet may be calculated as below.

MathFigure 22

$$L_T = 1 + L_{LP} + L_{CID} + \sum_{k=1}^{n} (L_k - L_{CID}) \quad \text{[bytes]} \qquad \text{[Math. 22]}$$

Here, $L_{CID}$ may denote a length of the common CID field. As described in the foregoing, $L_{CID}$ may be determined based on a CID configuration of the RoHC packet.

Similarly, when n is greater than or equal to 9 (the count field has a value $111_B$), the entire length $L_T$ of the link layer packet may be calculated as below.

MathFigure 23

$$L_T = 1 + L_{LP} + L_{ELP} + L_{CID} + \sum_{k=1}^{n} (L_k - L_{CID}) \quad \text{[bytes]} \qquad \text{[Math. 23]}$$

Here, $L_{CID}$ may denote a length of the common CID field.

FIG. 88 illustrates a protocol stack for a hybrid-based next generation broadcast system according to another embodiment of the present invention.

In a hybrid-based broadcast system of a TS and an IP stream, a link layer may be used to transmit data having a TS or IP stream type. When various types of data are to be transmitted through a physical layer, the link layer may convert the data into a format supported by the physical layer and deliver the converted data to the physical layer. In this way, the various types of data may be transmitted through the same physical layer. Here, the physical layer may correspond to a step of transmitting data using an MIMO/MISO scheme or the like by interleaving, multiplexing, and/or modulating the data.

The link layer needs to be designed such that an influence on an operation of the link layer is minimized even when a configuration of the physical layer is changed. In other words, the operation of the link layer needs to be configured such that the operation may be compatible with various physical layers.

The present invention proposes a link layer capable of independently operating irrespective of types of an upper layer and a lower layer. In this way, it is possible to support various upper layers and lower layers. Here, the upper layer may refer to a layer of a data stream such as a TS stream, an IP stream, or the like. Here, the lower layer may refer to the physical layer. In addition, the present invention proposes a link layer having a correctable structure in which a function supportable by the link layer may be extended/added/deleted. Moreover, the present invention proposes a scheme of including an overhead reduction function in the link layer such that radio resources may be efficiently used.

In this figure, protocols and layers such as IP, UDP, TCP, ALC/LCT, RCP/RTCP, HTTP, FLUTE, and the like are as described above.

In this figure, a link layer t88010 may be another example of the above-described data link (encapsulation) part. The present invention proposes a configuration and/or an operation of the link layer t88010. The link layer t88010 proposed by the present invention may process signaling necessary for operations of the link layer and/or the physical layer. In addition, the link layer t88010 proposed by the present invention may encapsulate TS and IP packets and the like, and perform overhead reduction in this process.

The link layer t88010 proposed by the present invention may be referred to by several terms such as data link layer, encapsulation layer, layer 2, and the like. According to a given embodiment, a new term may be applied to the link layer and used.

FIG. 89 illustrates an operation in a normal mode corresponding to one of operation modes of a link layer according to an embodiment of the present invention.

The link layer proposed by the present invention may have various operation modes for compatibility between an upper layer and a lower layer. The present invention proposes a normal mode and a transparent mode of the link layer. Both the operation modes may coexist in the link layer, and an operation mode to be used may be designated using signaling or a system parameter. According to a given embodiment, one of the two operation modes may be implemented. Different modes may be applied according to an IP layer, a TS layer, and the like input to the link layer. In addition, different modes may be applied for each stream of the IP layer and for each stream of the TS layer.

According to a given embodiment, a new operation mode may be added to the link layer. The new operation mode may be added based on configurations of the upper layer and the lower layer. The new operation mode may include different interfaces based on the configurations of the upper layer and the lower layer. Whether to use the new operation mode may be designated using signaling or a system parameter.

In the normal mode, data may be processed through all functions supported by the link layer, and then delivered to a physical layer.

First, each packet may be delivered to the link layer from an IP layer, an MPEG-2 TS layer, or another particular layer t89010. In other words, an IP packet may be delivered to the link layer from an IP layer. Similarly, an MPEG-2 TS packet may be delivered to the link layer from the MPEG-2 TS layer, and a particular packet may be delivered to the link layer from a particular protocol layer.

Each of the delivered packets may go through or not go through an overhead reduction process t89020, and then go through an encapsulation process t89030.

First, the IP packet may go through or not go through the overhead reduction process t89020, and then go through the encapsulation process t89030. Whether the overhead reduction process t89020 is performed may be designated by signaling or a system parameter. According to a given embodiment, the overhead reduction process t89020 may be performed or not performed for each IP stream. An encapsulated IP packet may be delivered to the physical layer.

Second, the MPEG-2 TS packet may go through the overhead reduction process t89020, and go through the encapsulation process t89030. The MPEG-2 TS packet may not be subjected to the overhead reduction process t89020 according to a given embodiment. However, in general, a TS packet has sync bytes (0x47) and the like at the front and thus it may be efficient to eliminate such fixed overhead. The encapsulated TS packet may be delivered to the physical layer.

Third, a packet other than the IP or TS packet may or may not go through the overhead reduction process t89020, and then go through the encapsulation process t89030. Whether or not the overhead reduction process t89020 is performed may be determined according to characteristics of the corresponding packet. Whether the overhead reduction process t89020 is performed may be designated by signaling or a system parameter. The encapsulated packet may be delivered to the physical layer.

In the overhead reduction process t89020, a size of an input packet may be reduced through an appropriate scheme. In the overhead reduction process t89020, particular information may be extracted from the input packet or generated. The particular information is information related to signaling, and may be transmitted through a signaling region. The signaling information enables a receiver to restore an original packet by restoring changes due to the overhead reduction process t89020. The signaling information may be delivered to a link layer signaling process t89050.

The link layer signaling process t89050 may transmit and manage the signaling information extracted/generated in the overhead reduction process t89020. The physical layer may have physically/logically divided transmission paths for signaling, and the link layer signaling process t89050 may deliver the signaling information to the physical layer according to the divided transmission paths. Here, the above-described FIC signaling process t89060, EAS signaling process t89070, or the like may be included in the divided transmission paths. Signaling information not transmitted through the divided transmission paths may be delivered to the physical layer through the encapsulation process t89030.

Signaling information managed by the link layer signaling process t89050 may include signaling information delivered from the upper layer, signaling information generated in the link layer, a system parameter, and the like. Specifically, the signaling information may include signaling information delivered from the upper layer to be subsequently delivered to an upper layer of the receiver, signaling information generated in the link layer to be used for an operation of a link layer of the receiver, signaling information generated in the upper layer or the link layer to be used for rapid detection in a physical layer of the receiver, and the like.

Data going through the encapsulation process t89030 and delivered to the physical layer may be transmitted through a data pipe (DP) t89040. Here, the DP may be a physical layer pipe (PLP). Signaling information delivered through the above-described divided transmission paths may be delivered through respective transmission paths. For example, an FIC signal may be transmitted through an FIC t89080 designated in a physical frame. In addition, an EAS signal may be transmitted through an EAC t89090 designated in a physical frame. Information about presence of a dedicated channel such as the FIC, the EAC, or the like may be transmitted to a preamble area of the physical layer through signaling, or signaled by scrambling a preamble using a particular scrambling sequence. According to a given embodiment, FIC signaling/EAS signaling information may be transmitted through a general DP area, PLS area, or preamble rather than a designated dedicated channel.

The receiver may receive data and signaling information through the physical layer. The receiver may restore the received data and signaling information into a form processable in the upper layer, and deliver the restored data and signaling information to the upper layer. This process may be performed in the link layer of the receiver. The receiver may verify whether a received packet is related to the signaling information or the data by reading a header of the packet and the like. In addition, when overhead reduction is performed at a transmitter, the receiver may restore a packet, overhead of which has been reduced through the overhead reduction process, to an original packet. In this process, the received signaling information may be used.

FIG. 90 illustrates an operation in a transparent mode corresponding to one of operation modes of a link layer according to an embodiment of the present invention.

In the transparent mode, data may not be subjected to functions supported by the link layer or may be subjected to some of the functions, and then delivered to a physical layer. In other words, in the transparent mode, a packet delivered to an upper layer may be delivered to a physical layer without going through a separate overhead reduction and/or encapsulation process. Other packets may go through the overhead reduction and/or encapsulation process as necessary. The transparent mode may be referred to as a bypass mode, and another term may be applied to the transparent mode.

According to a given embodiment, some packets may be processed in the normal mode and some packets may be processed in the transparent mode based on characteristics of the packets and a system operation.

A packet to which the transparent mode may be applied may be a packet having a type well known to a system. When the packet may be processed in the physical layer, the transparent mode may be used. For example, a well-known TS or IP packet may go through separate overhead reduction and input formatting processes in the physical layer and thus the transparent mode may be used in a link layer step. When the transparent mode is applied and a packet is processed through input formatting and the like in the physical layer, an operation such as the above-described TS header compression may be performed in the physical layer. On the other hand, when the normal mode is applied, a processed link layer packet may be treated as a GS packet and processed in the physical layer.

In the transparent mode, a link layer signaling module may be included when signal transmission needs to be supported. As described above, the link layer signaling module may transmit and manage signaling information. The signaling information may be encapsulated and transmitted through a DP, and FIC signaling information and EAS signaling information having divided transmission paths may be transmitted through an FIC and an EAC, respectively.

In the transparent mode, whether information corresponds to signaling information may be displayed using a fixed IP address and port number. In this case, the signaling information may be filtered to configure a link layer packet, and then transmitted through the physical layer.

FIG. 91 illustrates a configuration of a link layer at a transmitter according to an embodiment of the present invention (normal mode).

The present embodiment is an embodiment presuming that an IP packet is processed. The link layer at the transmitter may largely include a link layer signaling part for processing signaling information, an overhead reduction part, and/or an encapsulation part from a functional perspective. The link layer at the transmitter may further include a scheduler t91020 for a control of the entire operation of the link layer and scheduling, input and output parts of the link layer, and/or the like.

First, upper layer signaling information and/or system parameter t91010 may be delivered to the link layer. In addition, an IP stream including IP packets may be delivered to the link layer from an IP layer t91110.

As described above, the scheduler t91020 may determine and control operations of several modules included in the link layer. The delivered signaling information and/or system parameter t91010 may be filtered or used by the scheduler t91020. Information corresponding to a part of the delivered signaling information and/or system parameter t91010 and necessary for a receiver may be delivered to the link layer signaling part. In addition, information corresponding to a part of the signaling information and necessary for an operation of the link layer may be delivered to an overhead reduction control block t91120 or an encapsulation control block t91180.

The link layer signaling part may collect information to be transmitted as signaling in the physical layer, and transform/configure the information in a form suitable for transmission. The link layer signaling part may include a signaling manager t91030, a signaling formatter t91040, and/or a buffer for channels t91050.

The signaling manager t91030 may receive signaling information delivered from the scheduler t91020, signaling delivered from the overhead reduction part, and/or context information. The signaling manager t91030 may determine paths for transmission of the signaling information with respect to delivered data. The signaling information may be delivered through the paths determined by the signaling manager t91030. As described in the foregoing, signaling information to be transmitted through divided channels such as an FIC, an EAS, and the like may be delivered to the signaling formatter t91040, and other signaling information may be delivered to an encapsulation buffer t91070.

The signaling formatter t91040 may format associated signaling information in forms suitable for respective divided channels so that the signaling information may be transmitted through separately divided channels. As described in the foregoing, the physical layer may include physically/logically divided separate channels. The divided channels may be used to transmit FIC signaling information or EAS-related information. The FIC or EAS-related information may be divided by the signaling manager t91030 and input to the signaling formatter t91040. The signaling formatter t91040 may format information such that the information is suitable for respective separate channels. Besides the FIC and the EAS, when the physical layer is designed to transmit particular signaling information through separately divided channels, a signaling formatter for the particular signaling information may be added. Through this scheme, the link layer may be compatible with various physical layers.

The buffer for channels t91050 may deliver signaling information delivered from the signaling formatter t91040 to designated dedicated channels t91060. The number and content of the dedicated channels t91060 may vary depending on an embodiment.

As described in the foregoing, the signaling manager t91030 may deliver signaling information which is not delivered to a dedicated channel to the encapsulation buffer t91070. The encapsulation buffer t91070 may function as a buffer that receives the signaling information not delivered to the dedicated channel.

An encapsulation for signaling information t91080 may encapsulate the signaling information not delivered to the dedicated channel. A transmission buffer t91090 may function as a buffer that delivers the encapsulated signaling information to a DP for signaling information t91100. Here, the DP for signaling information t91100 may refer to the above-described PLS area.

The overhead reduction part may allow efficient transmission by eliminating overhead of packets delivered to the link layer. It is possible to configure overhead reduction parts, the number of which is the same as the number of IP streams input to the link layer.

An overhead reduction buffer t91130 may receive an IP packet delivered from an upper layer. The delivered IP packet may be input to the overhead reduction part through the overhead reduction buffer t91130.

An overhead reduction control block t91120 may determine whether to perform overhead reduction on a packet stream input to the overhead reduction buffer t91130. The overhead reduction control block t91120 may determine whether to perform overhead reduction for each packet stream. When overhead reduction is performed on the packet stream, packets may be delivered to an RoHC compressor t91140 and overhead reduction may be performed. When overhead reduction is not performed on the packet stream, packets may be delivered to the encapsulation part and encapsulation may be performed without overhead reduction. Whether to perform overhead reduction on packets may be determined by signaling information t91010 delivered to the link layer. The signaling information t91010 may be delivered to the encapsulation control block t91180 by the scheduler t91020.

The RoHC compressor t91140 may perform overhead reduction on a packet stream. The RoHC compressor t91140 may compress headers of packets. Various schemes may be used for overhead reduction. Overhead reduction may be performed by schemes proposed in the present invention. The present embodiment presumes an IP stream and thus the compressor is expressed as the RoHC compressor. However, the term may be changed according to a given embodiment. In addition, an operation is not restricted to compression of an IP stream, and overhead reduction may be performed on all types of packets by the RoHC compressor t91140.

A packet stream configuration block t91150 may divide IP packets having compressed headers into information to be transmitted to a signaling region and information to be transmitted to a packet stream. The information to be transmitted to the packet stream may refer to information to be transmitted to a DP area. The information to be transmitted to the signaling region may be delivered to a signaling and/or context control block t91160. The information to be transmitted to the packet stream may be transmitted to the encapsulation part.

The signaling and/or context control block t91160 may collect signaling and/or context information and deliver the collected information to the signaling manager t91030. In this way, the signaling and/or context information may be transmitted to the signaling region.

The encapsulation part may encapsulate packets in suitable forms such that the packets may be delivered to the physical layer. The number of configured encapsulation parts may be the same as the number of IP streams.

An encapsulation buffer t91170 may receive a packet stream for encapsulation. Packets subjected to overhead reduction may be received when overhead reduction is performed, and an input IP packet may be received without change when overhead reduction is not performed.

An encapsulation control block t91180 may determine whether to perform encapsulation on an input packet stream. When encapsulation is performed, the packet stream may be delivered to segmentation/concatenation t91190. When encapsulation is not performed, the packet stream may be delivered to a transmission buffer t91230. Whether to perform encapsulation of packets may be determined based on the signaling information t91010 delivered to the link layer. The signaling information t91010 may be delivered to the encapsulation control block t91180 by the scheduler t91020.

In the segmentation/concatenation t91190, the above-descried segmentation or concatenation operation may be performed on packets. In other words, when an input IP packet is longer than a link layer packet corresponding to an output of the link layer, one IP packet may be divided into several segments to configure a plurality of link layer packet payloads. In addition, when the input IP packet is shorter than the link layer packet corresponding to the output of the link layer, several IP packets may be combined to configure one link layer packet payload.

A packet configuration table t91200 may have information about a configuration of segmented and/or concatenated link layer packets. A transmitter and a receiver may have the same information of the packet configuration table t91200. The transmitter and the receiver may refer to the information of the packet configuration table t91200. An index value of the information of the packet configuration table t91200 may be included in headers of the link layer packets.

A link layer header information block t91210 may collect header information generated in an encapsulation process. In addition, the link layer header information block t91210 may collect information included in the packet configuration table t91200. The link layer header information block t91210 may configure header information according to a header configuration of a link layer packet.

A header attachment block t91220 may add headers to payloads of the segmented and/or concatenated link layer packets. The transmission buffer t91230 may function as a buffer for delivering a link layer packet to a DP t91240 of the physical layer.

Each block or module and parts may be configured as one module/protocol or a plurality of modules/protocols in the link layer.

FIG. 92 illustrates a configuration of a link layer at a receiver according to an embodiment of the present invention (normal mode).

The present embodiment is an embodiment presuming that an IP packet is processed. The link layer at the receiver may largely include a link layer signaling part for processing signaling information, an overhead processing part, and/or a decapsulation part from a functional perspective. The link layer at the receiver may further include a scheduler for a control of the entire operation of the link layer and scheduling, input and output parts of the link layer, and/or the like.

First, information received through a physical layer may be delivered to the link layer. The link layer may process the information to restore the information to an original state in which the information is not yet processed by a transmitter, and deliver the information to an upper layer. In the present embodiment, the upper layer may be an IP layer.

Information delivered through dedicated channels t92030 separated from the physical layer may be delivered to the link layer signaling part. The link layer signaling part may distinguish signaling information received from the physical layer, and deliver the distinguished signaling information to each part of the link layer.

A buffer for channels t92040 may function as a buffer that receives signaling information transmitted through the dedicated channels. As described above, when physically/logically divided separate channels are present in the physical layer, it is possible to receive signaling information transmitted through the channels. When the information received from the separate channels is in a divided state, the divided information may be stored until the information is in a complete form.

A signaling decoder/parser t92050 may check a format of signaling information received through a dedicated channel, and extract information to be used in the link layer. When the signaling information received through the dedicated channel is encoded, decoding may be performed. In addition, according to a given embodiment, it is possible to check integrity of the signaling information.

A signaling manager t92060 may integrate signaling information received through several paths. Signaling information received through a DP for signaling t92070 to be described below may be integrated by the signaling manager t92060. The signaling manager t92060 may deliver signaling information necessary for each part in the link layer. For example, context information for recovery of a packet and the like may be delivered to the overhead processing part. In addition, signaling information for control may be delivered to a scheduler t92020.

General signaling information not received through a separate dedicated channel may be received through the DP for signaling t92070. Here, the DP for signaling may refer to a PLS or the like. A reception buffer t92080 may function as a buffer for receiving the signaling information received from the DP for signaling t92070. The received signaling information may be decapsulated in a decapsulation for signaling information block t92090. The decapsulated signaling information may be delivered to the signaling manager t92060 through a decapsulation buffer t92100. As described in the foregoing, the signaling manager t92060 may collect signaling information and deliver the collected signaling information to a desired part in the link layer.

The scheduler t92020 may determine and control operations of several modules included in the link layer. The scheduler t92020 may control each part of the link layer using receiver information t92010 and/or information delivered from the signaling manager t92060. In addition, the scheduler t92020 may determine an operation mode and the like of each part. Here, the receiver information t92010 may refer to information previously stored by the receiver. The scheduler t92020 may use information changed by a user such as a channel change and the like for control.

The decapsulation part may filter a packet received from a DP t92110 of the physical layer, and separate the packet based on a type of the packet. The number of configured decapsulation parts may be the same as the number of DPs that may be simultaneously decoded in the physical layer.

A decapsulation buffer t92120 may function as a buffer that receives a packet stream from the physical layer to perform decapsulation. A decapsulation control block t92130 may determine whether to decapsulate the received packet stream. When decapsulation is performed, the packet stream may be delivered to a link layer header parser t92140. When decapsulation is not performed, the packet stream may be delivered to an output buffer t92220. The signaling information delivered from the scheduler t92020 may be used to determine whether to perform decapsulation.

The link layer header parser t92140 may identify a header of a received link layer packet. When the header is identified, it is possible to identify a configuration of an IP packet included in a payload of the link layer packet. For example, the IP packet may be segmented or concatenated.

A packet configuration table t92150 may include payload information of link layer packets configured through segmentation and/or concatenation. The transmitter and the receiver may have the same information as information of the packet configuration table t92150. The transmitter and the receiver may refer to the information of the packet configuration table t92150. A value necessary for reassembly may be found based on index information included in the link layer packets.

A reassembly block t92160 may configure payloads of the link layer packets configured through segmentation and/or concatenation as packets of an original IP stream. The reassembly block t92160 may reconfigure one IP packet by collecting segments, or reconfigure a plurality of IP packet streams by separating concatenated packets. The reassembled IP packets may be delivered to the overhead processing part.

The overhead processing part may perform a reverse process of overhead reduction performed by the transmitter. In the reverse process, an operation of returning packets experiencing overhead reduction to original packets is performed. This operation may be referred to as overhead processing. The number of configured overhead processing parts may be the same as the number of DPs that may be simultaneously decoded in the physical layer.

A packet recovery buffer t92170 may function as a buffer that receives an RoHC packet or an IP packet decapsulated for overhead processing.

An overhead control block t92180 may determine whether to perform packet recovery and/or decompression of decapsulated packets. When the packet recovery and/or decompression are performed, the packets may be delivered to a packet stream recovery t92190. When the packet recovery and/or decompression are not performed, the packets may be delivered to the output buffer t92220. Whether to perform the packet recovery and/or decompression may be determined based on the signaling information delivered by the scheduler t92020.

The packet stream recovery t92190 may perform an operation of integrating a packet stream separated from the transmitter and context information of the packet stream. The operation may correspond to a process of restoring the packet stream such that the packet stream may be processed by an RoHC decompressor t92210. In this process, signaling information and/or context information may be delivered from a signaling and/or context control block t92200. The signaling and/or context control block t92200 may distinguish signaling information delivered from the transmitter and deliver the signaling information to the packet stream recovery t92190 such that the signaling information may be mapped to a stream suitable for a context ID.

The RoHC decompressor t92210 may recover headers of packets of a packet stream. When the headers are recovered, the packets of the packet stream may be restored to original IP packets. In other words, the RoHC decompressor t92210 may perform overhead processing.

The output buffer t92220 may function as a buffer before delivering an output stream to an IP layer t92230.

The link layer of the transmitter and the receiver proposed in the present invention may include the blocks or modules described above. In this way, the link layer may independently operate irrespective of the upper layer and the lower layer, and efficiently perform overhead reduction. In addition, a function which is supportable depending on the upper and lower layers may be easily extended/added/deleted.

FIG. 93 illustrates a method of transmitting broadcast signals according to an embodiment of the present invention.

The method includes generating plural input streams, link layer processing the input packets, physical layer processing the link layer packets and/or transmitting the generated broadcast signals.

In step of generating plural input streams, the input streams including plural input packets can be generated in upper layer. Upper layer can be either TS layer, IP layer or other types of packet layer. Therefore, the input packets can be either TS packets, IP packets or other packets. Input stream includes consecutive input packets.

In step of link layer processing the input packets, the input packets can be processed by the link layer described above. The link layer can be the one suggested by the present invention. By processing input packets in the link layer, the link layer packets can be generated. By processing any types of input packets into the link layer packet, any input streams can be processed by the physical layer.

In step of physical layer processing the link layer packets, the link layer packets can be processed in physical layer. The link layer packets can go through interleaving, frame mapping, and/or modulating and so on. With this process, the broadcast signals can be generated.

In step of transmitting the generated broadcast signals, the broadcast signals can be transmitted by either SISO, MISO, or MIMO. The transmitting can be included in physical layer.

In a method of transmitting broadcast signals according to other embodiment of the present invention, the link layer processing includes link layer processing one of the plural input streams based on transparent mode. As described above, there can be two modes for link layer processing, normal and transparent. In link layer processing, some of input streams can be processed in transparent mode, while the others are processed in normal mode. In transparent mode, the link layer delivers the one of the plural input streams to the physical layer without encapsulating. Signaling information supposed to be transmitted in a dedicated channel, can be delivered to that channel in the physical layer. Some types of packets can go through encapsulating, even in the transparent mode, as described above.

In a method of transmitting broadcast signals according to another embodiment of the present invention, the link layer processing in normal mode includes encapsulating and/or delivering. The link layer processing one of the plural input streams includes encapsulating the input packets in the one of the plural input streams to generate the link layer packets. The generated link layer packets can be delivered to the physical layer.

In a method of transmitting broadcast signals according to another embodiment of the present invention, the link layer processing in normal mode includes overhead reduction processing the input packets before encapsulating. The overhead reduction process can be conducted after the encapsulating in other embodiments. The overhead reduction process can include compress headers of the input packets. Other method of overhead reduction can be used in link layer.

In a method of transmitting broadcast signals according to another embodiment of the present invention, the link layer processing in normal mode includes extracting a first signaling information and/or delivering. The first signaling information can be extracted from overhead reduction processed input packets. The first signaling information is a signaling information to be transmitted in a dedicated transmission channel. The above described EAS, FIC information can correspond to the first signaling information. The first signaling information can be delivered to the dedicated channel for the first signaling information, in the physical layer.

In a method of transmitting broadcast signals according to another embodiment of the present invention, the link layer processing in normal mode includes extracting a second signaling information, encapsulating the second signaling information and/or delivering. The second signaling information is for signaling data in the input packets. The second signaling information can be encapsulated as in the encapsulation of input packets. The second signaling information can be encapsulated into the link layer packets. The link layer packet generated by using the second signaling information can be delivered to the physical layer. The second signaling information can be transmitted in DP or PLS, as described above.

In a method of transmitting broadcast signals according to another embodiment of the present invention, the link layer packet includes a link layer payload generated by using a segment of one of the input packets, or by using concatenated input packets. As described above, the link layer payload can be encapsulated by segmentation or concatenation. Various methods of segmentation and concatenation have been described. Segmentation and concatenation methods for each types of input packets can be used in encapsulation. Whether the segmentation or the concatenation is used can be decided based on signaling information.

In a method of transmitting broadcast signals according to another embodiment of the present invention, the physical layer processing includes physical layer processing plural PLPs (Physical Layer Pipes). The PLP may correspond to the DP. The PLP can include data of the link layer packets, and be processed in physical layer. The link layer can be processed in physical layer as in forms of PLPs.

In a method of transmitting broadcast signals according to another embodiment of the present invention, the physical layer processing includes physical layer processing the first signaling information. The first signaling information can be processed into the dedicated transmission channel, to generate the broadcast signals.

In a method of transmitting broadcast signals according to another embodiment of the present invention, the input packets are one of TS (Transport Stream) packet, IP (Internet Protocol) packet or GS (Generic Stream) packet. The input packets can be some types of packets other than TS, IP or GS packets.

The above-described steps can be omitted or replaced by steps executing similar or identical functions according to design.

A module or a unit is a processor executing a sequence of instructions stored in a memory (or storage unit). The steps in above described embodiments can be operated in hardwares/processors. The first module, second module, third module and/or fourth module can be operated as hardwares/processors. In addition, a method of transmitting broadcast signals according to an embodiment of the present invention may be implemented as code that may be written on a processor readable recording medium and thus, read by a processor provided in the apparatus.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR THE INVENTION

Various embodiments have been described in the best mode for carrying out the invention.

INDUSTRIAL APPLICABILITY

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting broadcast signals, the method comprising:
   generating an input stream having plural input packets;
   link processing the input packets in the input stream to generate link layer packets,
   wherein the link processing further includes:
      generating a payload of a link layer packet of the generated link layer packets by encapsulating either a segment of one input packet of the input packets in the input stream or concatenated input packets of the input packets in the input stream,
      generating a header of the link layer packet including a base part, the base part including a packet configuration field which indicates whether the payload includes either the segment or the concatenated input packets, and
      inserting the header in front of the payload;
   physical processing the link layer packets into the broadcast signals; and
   transmitting the broadcast signals,
   wherein the generating the header further includes:
      determining whether to add either a segmentation header part or a concatenation header part to the header based on a value of the packet configuration field,
      adding the concatenation header part after the base part when the payload includes the concatenated input packets, by including length fields to the header in the same order as the concatenated input packets present in the payload, the length fields indicating length of each of the concatenated input packets, wherein the number of the length fields is determined based on the number of the concatenated input packets in the payload, and
      adding stuffing bits after the length fields when the number of the length fields is odd.

2. The method of claim 1, wherein the base part further includes a packet type field indicating a type of the input packets included in the payload.

3. The method of claim 1, wherein the generating the header further includes:
   adding the segmentation header part after the base part when the payload includes the segment by adding a segment sequence number field to the header, the segment sequence number field indicating an order of the segment in the payload.

4. An apparatus for transmitting broadcast signals, the apparatus comprising:
   a processor configured to:
      generate an input stream having plural input packets, and
      link process the input packets in the input stream to generate link layer packets,
   wherein, to link process, the processor is further configured to:
      generate a payload of a link layer packet of the generated link layer packets by encapsulating either a segment of one input packet of the input packets in the input stream or concatenated input packets of the input packets in the input stream,
      generate a header of the link layer packet including a base part, the base part including a packet configuration field which indicates whether the payload includes either the segment or the concatenated input packets, and
      insert the header in front of the payload,
   wherein the processor is further configured to physical process the link layer packets into the broadcast signals; and
   a transmitter configured to transmit the broadcast signals,
   wherein, to generate the header, the processor is further configured to:
      determine whether to add either a segmentation header part or a concatenation header part to the header based on a value of the packet configuration field, add the concatenation header part after the base part when the payload includes the concatenated input packets, by including length fields to the header in the same order as the concatenated input packets present in the payload, the length fields indicating length of each of the concatenated input packets, wherein the number of the length fields is determined based on the number of the concatenated input packets in the payload, and add stuffing bits after the length fields when the number of the length fields is odd.

5. The apparatus of claim 4, wherein the base part further includes a packet type field indicating a type of the input packets included in the payload.

6. The apparatus of claim 4, wherein, to generate the header, the processor is further configured to:

add the segmentation header part after the base part when the payload includes the segment by adding a segment sequence number field to the header, the segment sequence number field indicating an order of the segment in the payload.

* * * * *